(12) United States Patent
Zhai et al.

(10) Patent No.: US 12,502,767 B2
(45) Date of Patent: Dec. 23, 2025

(54) MASTER MANIPULATOR CONTROL APPARATUSES AND ROBOTS INCLUDING THE SAME

(71) Applicant: WUHAN UNITED IMAGING HEALTHCARE SURGICAL TECHNOLOGY CO., LTD., Hubei (CN)

(72) Inventors: Mingchun Zhai, Wuhan (CN); Wei Jiao, Wuhan (CN); Meng Qu, Wuhan (CN); Yuan Zhong, Wuhan (CN)

(73) Assignee: WUHAN UNITED IMAGING SURGICAL CO., LTD., Wuhan (CN)

( * ) Notice: Subject to any disclaimer, the term of this patent is extended or adjusted under 35 U.S.C. 154(b) by 0 days.

(21) Appl. No.: 18/456,490

(22) Filed: Aug. 26, 2023

(65) Prior Publication Data

US 2024/0058948 A1 Feb. 22, 2024

Related U.S. Application Data

(63) Continuation of application No. PCT/CN2022/078261, filed on Feb. 28, 2022.

(30) Foreign Application Priority Data

Feb. 26, 2021 (CN) .......................... 202110218291.1
Apr. 29, 2021 (CN) .......................... 202120920702.7

(51) Int. Cl.
*B25J 9/10* (2006.01)
*B25J 17/02* (2006.01)
*B25J 18/00* (2006.01)

(52) U.S. Cl.
CPC ............... *B25J 9/109* (2013.01); *B25J 17/02* (2013.01); *B25J 18/00* (2013.01)

(58) Field of Classification Search
CPC ..................................................... A61B 34/37
See application file for complete search history.

(56) References Cited

U.S. PATENT DOCUMENTS

| | | |
|---|---|---|
| 6,565,554 B1 | 5/2003 | Niemeyer |
| 6,714,839 B2 | 3/2004 | Salisbury, Jr. et al. |
| 2007/0156122 A1 | 7/2007 | Cooper |

(Continued)

FOREIGN PATENT DOCUMENTS

| | | |
|---|---|---|
| CN | 101444431 A | 6/2009 |
| CN | 102152314 A | 8/2011 |

(Continued)

OTHER PUBLICATIONS

Machine translation of CN-110811843-A (Year: 2020).*

(Continued)

*Primary Examiner* — Randell J Krug
(74) *Attorney, Agent, or Firm* — METIS IP LLC

(57) ABSTRACT

The present disclosure provides a master manipulator. The master manipulator may include an arm assembly including at least one arm joint mechanism and a wrist assembly movably connected with the arm assembly. The wrist assembly may allow an operator to perform a corresponding operation. The wrist assembly may include at least one wrist joint mechanism. The master manipulator may also include a support assembly configured to support at least one of the arm assembly and the wrist assembly.

19 Claims, 33 Drawing Sheets

(56) References Cited

U.S. PATENT DOCUMENTS

| | | | |
|---|---|---|---|
| 2012/0088963 A1 | 4/2012 | Yasunaga et al. | |
| 2016/0332312 A1 | 11/2016 | Song et al. | |
| 2018/0318020 A1 | 11/2018 | Thompson et al. | |
| 2018/0353246 A1* | 12/2018 | Ishihara | A61B 34/25 |
| 2020/0000670 A1 | 1/2020 | Xiong et al. | |
| 2020/0237461 A1 | 7/2020 | Kadokura | |
| 2021/0038336 A1* | 2/2021 | Ogata | A61B 34/76 |
| 2021/0106394 A1 | 4/2021 | Cooper et al. | |

FOREIGN PATENT DOCUMENTS

| | | | | |
|---|---|---|---|---|
| CN | 108378922 A | | 8/2018 | |
| CN | 109395940 A | | 3/2019 | |
| CN | 110811843 A | * | 2/2020 | A61B 34/37 |
| CN | 110934644 A | | 3/2020 | |
| CN | 111265303 A | | 6/2020 | |
| CN | 211381754 U | | 9/2020 | |
| CN | 112168359 A | | 1/2021 | |
| CN | 113017840 A | | 6/2021 | |
| CN | 215018879 U | | 12/2021 | |
| CN | 217488855 U | | 9/2022 | |
| WO | WO-0060421 A2 | * | 10/2000 | A61B 1/00149 |
| WO | 2020130559 A2 | | 6/2020 | |
| WO | 2020141487 A2 | | 7/2020 | |

OTHER PUBLICATIONS

Machine translation of WO-0060421-A2 (Year: 2000).*
The Extended European Search Report in European Application No. 22759002.3 mailed on Aug. 26, 2024, 9 pages.
International Search Report in PCT/CN2022/078261 mailed on May 10, 2022, 8 pages.
Written Opinion in PCT/CN2022/078261 mailed on May 10, 2022, 14 pages.
First Office Action in Chinese Application No. 202110218291.1 mailed on Dec. 16, 2021, 17 pages.

* cited by examiner

900

1000

MASTER MANIPULATOR CONTROL APPARATUSES AND ROBOTS INCLUDING THE SAME

CROSS-REFERENCE TO RELATED APPLICATIONS

This application is a continuation of International Application No. PCT/CN2022/078261, filed on Feb. 28, 2022, which claims priority to Chinese Patent Application No. 202110218291.1, filed on Feb. 26, 2021, and Chinese Patent Application No. 202120920702.7, filed on Apr. 29, 2021, the contents of each of which are incorporated herein by reference.

TECHNICAL FIELD

The present disclosure relates to the field of medical apparatus, and in particular, to a master manipulator control apparatus and a robot including the same.

BACKGROUND

Surgical robots can assist doctors in more precise operations during surgical operations. During a surgery operation using a surgical robot, a doctor needs to install a registration probe, a surgical instrument (e.g., a scalpel, a suture structure), or other terminal tools to a slave robotic arm of the surgical robot according to the needs of the current surgical process, and then the doctor operates the master manipulator, and the slave manipulator performs corresponding operations under the control of the master manipulator. In robotic surgery, the doctor needs to operate the master manipulator for a long time, and the operation of the master manipulator may directly affect the operation effect of the terminal tool. Therefore, it is desirable to provide a master manipulator and a robot that can be used for a doctor to operate and control one or more terminal tools, thereby improving the operation accuracy and efficiency.

SUMMARY

One aspect of the present disclosure provides a master manipulator. The master manipulator may include an arm assembly and a wrist assembly movably. The arm assembly may include at least one arm joint mechanism. The wrist assembly may be movably connected with the arm assembly. The wrist assembly may allow an operator to perform a corresponding operation. The wrist assembly may include at least one wrist joint mechanism. The master manipulator may also include a support assembly configured to support at least one of the arm assembly and the wrist assembly.

In some embodiments, the at least one arm joint mechanism may include a first joint mechanism including a first power member, a first driving member, and a first driven member. The first joint mechanism may correspond to a first rotation axis, and the first rotation axis may be parallel to a gravity direction of the wrist assembly.

In some embodiments, the at least one arm joint mechanism may include a connection assembly configured to connect the arm assembly and the wrist assembly. Some elements of the at least one arm joint mechanism may be sequentially connected in series to form at least a part of one or more first quadrilateral connection rod mechanisms. The connection assembly and some elements of the arm assembly may be sequentially connected in series to form at least a part of a second quadrilateral connection rod mechanism. Elements of the one or more first quadrilateral connection rod mechanisms and elements of the second quadrilateral connection rod mechanism may be arranged in a linkage manner to synchronously rotate around a rotation axis of the at least one joint mechanism. The rotation axis may be perpendicular to a gravity direction of the wrist assembly.

In some embodiments, the at least one arm joint mechanism may include a second joint mechanism. A first rotation axis corresponding to the second joint mechanism may be perpendicular to the gravity direction of the wrist assembly. The second joint mechanism may include a second power member, a second driving member, and three second driven members sequentially connected in series. Connecting lines of the three second driven members may be approximately a parallelogram to form at least a part of one of the one or more first quadrilateral connection rod mechanisms.

In some embodiments, the second power member may be installed on a first base of the support assembly and configured to drive the second driving member to rotate. One of the three second driven members may be movably connected with the base. Two non-adjacent second driven members of the three second driven members may be approximately parallel. The second driving member may be configured to drive the three second driven members to rotate around a second rotation axis.

In some embodiments, the at least one arm joint mechanism may further include a third joint mechanism corresponding to a third rotation axis. The third rotation axis may be perpendicular to the gravity direction of the wrist assembly.

In some embodiments, the third joint mechanism may include a third power member, a third driving member, and three third driven members sequentially connected in series. Connecting lines of the three third driven members sequentially connected in series may be approximately a parallelogram.

In some embodiments, the third power member may be installed on the first base and configured to drive the third driving member to rotate. One of the at least three third driven members may be movably connected with the first base. Two non-adjacent third driven members of the three third driven members may be approximately parallel. The third driving member may be configured to drive the three third driven members to rotate around the third rotation axis.

In some embodiments, the connection assembly may include a first connection member and a second connection member. The first connection member, the second connection member, one of the three second driven members, and one of the three third driven members may be sequentially connected in series to form the second quadrilateral connection rod mechanism.

In some embodiments, the second connection member may include a first portion and a second portion. The first portion may be parallel to the gravity direction of the wrist assembly and connected with the arm assembly. The second portion may be perpendicular to the gravity direction of the wrist assembly and connected with the wrist assembly.

In some embodiments, a plurality of wrist joint mechanisms of the wrist assembly may correspond to a plurality of rotation axes, and the plurality of rotation axes may intersect at one point.

In some embodiments, the plurality of wrist joint mechanisms may include a fourth joint mechanism. The fourth joint mechanism may correspond to a fourth rotation axis. The fourth rotation axis may be parallel to the gravity direction of the wrist assembly and connected with the connection assembly.

In some embodiments, the plurality of wrist joint mechanisms may include a fifth joint mechanism. The fifth joint mechanism may correspond to a fifth rotation axis. The fifth rotation axis may be perpendicular to the gravity direction of the wrist assembly. The fifth joint mechanism may include a balance assembly configured to balance a gravity torque caused by a self-weight of the wrist assembly at the fifth rotation axis.

In some embodiments, the master manipulator may further include a brake assembly including a brake controller and a brake. The at least one wrist joint mechanism may include a fourth joint mechanism connected with the arm assembly. A fourth rotation axis corresponding to the fourth joint mechanism may be parallel to a gravity direction of the wrist assembly.

In some embodiments, the brake may be connected with the fourth rotation axis. The brake controller may be configured to control operation of the fourth joint mechanism through the brake.

In some embodiments, an operation state of the brake may include a disconnected state and a closed state. The disconnected state may correspond to a locked state of the fourth joint mechanism, and the closed state may correspond to a released state of the fourth joint mechanism. The brake controller may be configured to: in response to a determination that the wrist assembly satisfies a first condition, generate a close instruction and send the close instruction the brake, the close instruction being used to instruct the brake to be in the closed state.

In some embodiments, the brake controller may be configured to: in response to a determination that the wrist assembly satisfies a second condition, generate a disconnecting instruction and send the disconnecting instruction to the brake, the open instruction being used to instruct the brake to be in the disconnected state.

In some embodiments, the wrist assembly may further include a fifth joint mechanism. A fifth rotation axis corresponding to the fifth joint mechanism may be perpendicular to the gravity direction of the wrist assembly. The fifth joint mechanism may be connected with the fourth joint mechanism through a second base (a connection rod 23) of the support assembly. The first condition may include that the second base is in a first region or a second region within a rotation range of the fourth rotation axis.

In some embodiments, the wrist assembly may further include a sixth joint mechanism connected with the fifth joint mechanism. A sixth rotation axis corresponding to the sixth joint mechanism may be parallel to the fourth rotation axis. The first condition may include: when a sixth rotation axis moves in a first direction, the second base may be in the first region within the rotation range of the fourth rotation axis; or, when the sixth rotation axis moves in a second direction, the second base may be in the second region within the rotation range of the fourth rotation axis.

In some embodiments, the wrist assembly may further include a sixth joint mechanism. A sixth rotation axis corresponding to the sixth joint mechanism may be parallel to the gravity direction of the wrist assembly. The first condition may include that a distance between the sixth rotation axis and a first limiter or a second limiter may be less than a first threshold. The second condition may include that a distance between the sixth rotation axis and the first limiter or the second limiter may be greater than a second threshold. The second threshold may be greater than or equal to the first threshold.

In some embodiments, the first condition may include that the master manipulator may be in a singular position.

In some embodiments, the master manipulator may further comprise: one or more balance assemblies. Each of the one or more balance assemblies may be configured to balance a torque of a self-weight of the arm assembly and/or the wrist assembly relative to a rotation axis of the arm assembly or a rotation axis of the wrist assembly.

In some embodiments, one of the one or more balance assemblies may include an elastic member. One end of the elastic member may be connected with one of the at least one arm joint mechanism or one of the at least one wrist joint mechanism. An angle between a direction of a torque of the elastic member to the rotation axis of the arm joint mechanism or the wrist joint mechanism and a direction of a gravity torque of gravity formed by the wrist assembly and/or the arm assembly to the rotation axis may be greater than 90 degrees.

In some embodiments, one of the one or more balance assemblies may further include a rope and a steering wheel. The elastic member may be connected with the arm joint mechanism or the wrist joint mechanism through the rope. One end of the rope may be connected with the elastic member, and another end of the rope may be connected with the arm joint mechanism or the wrist joint mechanism bypassing the steering wheel, so that the rope may form an angle with an axial direction of the elastic member.

In some embodiments, one of the at least one arm joint mechanism may include a power member, a driving member, and a driven member. The driven member may be configured to rotate around the rotation axis of the arm joint mechanism. The power member and/or the driving member and the wrist assembly may be arranged on two sides of the rotation axis. An angle between a direction of a gravity torque formed by the power member and/or the driving member to the rotation axis and a direction of a gravity torque formed by a gravity of the wrist assembly and/or the arm assembly to the rotation axis may be greater than 90 degrees.

In some embodiments, one of the at least one arm joint mechanisms may include a driven member. The driven member may include a plurality of connection rods sequentially connected in series to form a parallelogram connection rod mechanism. One of the connection rods may include an extension end relative to the parallelogram mechanism. The rotation axis of the arm assembly may be arranged on the extension end. At least a part of one of the one or more balance assemblies may be arranged on the extension end.

In some embodiments, the one or more balance assemblies may be connected with the rotation axis or the parallelogram mechanism.

In some embodiments, the one of the one or more balance assemblies may include an arm balance assembly. The arm balance assembly may include an elastic member. Both ends of the elastic member may be respectively connected with the extension end of the driven member and a support base of the arm joint mechanism.

In some embodiments, the arm balance assembly may further include a rope and a steering wheel. The steering wheel may be arranged on the support base of the arm joint mechanism. One end of the elastic member may be connected with the rope, another end of the elastic member may be connected with the support base of the arm joint mechanism, another end of the rope may be connected with the arm joint mechanism, and the rope may bypass the steering wheel to change an extension direction, so that the rope may form an angle with an axial direction of the elastic member.

In some embodiments, the arm joint mechanism may be driven by a driving member. The driving member may be in a transmission connection with the extension end. A gravity torque of the driving member relative to the rotation axis of the arm joint mechanism may at least partially balance a gravity torque of the wrist assembly and/or the arm assembly relative to the rotation axis of the arm joint mechanism; and an end of the rope away from the elastic member may be connected with an output shaft of the driving member.

In some embodiments, a stiffness coefficient of the elastic member and an extension length of the one of the connection rods may be set in a way that a potential energy of the master manipulator remains constant during an action process.

In some embodiments, the balance mechanism assembly may include a wrist balance assembly. The wrist balance assembly may be arranged on the wrist joint mechanism. The wrist balance assembly may include an elastic member. Both ends of the wrist elastic member may be respectively connected with the wrist joint mechanism and a support base of the wrist joint mechanism. An elastic force of the elastic member may at least partially balance a gravity torque of the wrist assembly to a rotation axis corresponding to the wrist joint mechanism.

In some embodiments, the wrist balance assembly may further include a rotation wheel and a rope. The rotation wheel may rotate synchronously with the rotation axis of the wrist joint mechanism. One end of the elastic member may be connected with the rope, another end of the elastic member may be connected with the support base of the wrist joint mechanism, and another end of the rope may be wound around the rotation wheel.

In some embodiments, the rotation wheel may be a cam. When the wrist joint mechanism rotates to a position forming any angle with the gravity direction, an angle between a direction of a gravity torque formed by the wrist assembly to the rotation axis of the wrist joint mechanism and a direction of torque formed by the cam and the elastic member may be greater than 90 degrees.

Another aspect of the present disclosure provides a clamping device. The clamping device may comprise a base. The clamping device may also comprise a clamping assembly rotatably disposed on the base and configured to be able to open and close within a working range. The clamping device may further comprise a feedback component connected with the base and the clamping component. The feedback component may be configured to feed a force state of an end effector back to the clamping assembly.

Another aspect of the present disclosure provides a master manipulator. The master manipulator may comprise the clamping device as described above.

One of the embodiments of the present disclosure provides a robot. The robot may comprise a robot body, an end effector, and the master manipulator. The end effector may be connected with the robot body. The robot body may be electrically connected with a communication device. The master manipulator may be electrically connected with the communication device and the end effector.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
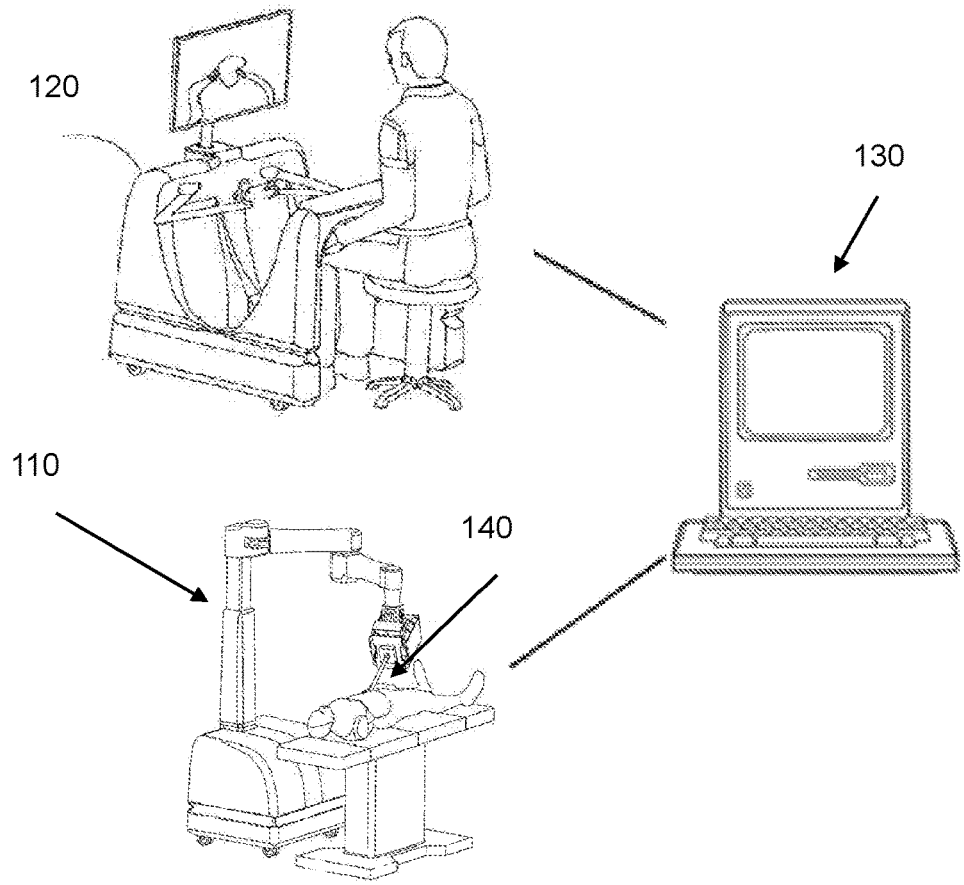
FIG. 1 is a diagram illustrating an application scenario of a robot according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

Based on the continuous advancement of technical research and product development of medical robots, surgical robots have become one of the important fields in the domain of medical robots. Surgical robots are medical devices integrating many disciplines including clinical medicine, biomechanics, mechanics, computer science, microelectronics, etc. A surgical robot assists a doctor to perform complex surgical operations in the form of a minimally invasive surgery through a clear imaging system and a flexible robotic arm, and complete operations including intraoperative positioning, cutting, puncture, hemostasis, suturing, etc. Under the guidance of a CT device, a medical staff can use a surgical robot to assist surgical treatment. However, the surgery performed near the CT device will expose the medical staff to the radiation environment for a long time, which causes a great threat to health of the medical staff. Therefore, an image-guided robot may be controlled to perform a surgical operation through a remote operation using a master-slave telerobot. The current robots often cannot accurately simulate the operation process of a medical staff, and cannot feedback the magnitude of force. The lack of force perception by the medical staff may increase the risk and uncertainty of the surgery, and affect the efficiency of the surgery. At the same time, the current master manipulator may include an arm assembly and a wrist assembly. The arm assembly may provide a position degree of freedom, and the wrist assembly may provide a posture degree of freedom. However, changes in the position of the arm assembly may affect the posture of the end of the wrist, which in turn affect the operation of the end effector.

FIG. 1 is a diagram illustrating an application scenario of a surgical robot system according to some embodiments of the present disclosure. As shown in FIG. 1, a robot system 100 may include a robot body 110, a console 120, a communication device 130, and an end effector 140. The robot body 110 may be connected with the end effector 140 (e.g., disposed at an end of a robotic arm of the robot body 110). The robot body 110 may be electrically connected with the communication device 130. The console 120 may be electrically connected with the communication device 130 and the end effector 140 to control the end effector 140 to perform a synchronous operation. In some embodiments, the robot system 100 may include an imaging device, such as an endoscope.

The robot body 110 may support the end effector 140 and/or a camera arm of an imaging device. For example, the end effector 140 may be disposed on the robot body 110 and configured to perform corresponding operations (e.g., puncturing, suturing, etc.). In some embodiments, the robot body 110 may include a robotic arm (also referred to as a slave robotic arm) capable of driving the end effector 140 installed at an end of the slave robotic arm to move to adjust an action/posture of a functional component disposed at the end of the robotic arm. In some embodiments, in practical application, the robot body 110 may be located in a scanning room (e.g., a position where a patient is located). A control room may be arranged adjacent to or separated from the scanning room. The console 120 may be arranged in the control room. A doctor may complete a master-slave teleoperation by controlling the robot body 110 and the end effector 140 in the scanning room through the console 120 in the control room. In some embodiments, an operating table of the imaging device may be arranged in the control room, and a concrete wall may be arranged between the control room and the scanning room to shield rays.

The console 120 may include a master manipulator. An operator may make the end effector 140 perform an operation by manipulating the master manipulator. For example, the operator may perform a synchronous operation (e.g., puncturing, suturing, etc.) by manipulating the master manipulator to control the robot body 110 to drive the end effector 140 installed at the end of the slave robotic arm to move. The master manipulator may include a master manipulation arm (also referred to as a master robotic arm), and a clamping device (also referred to as an end manipulator or a clamping control device). The master manipulation arm may provide a degree of freedom (DoF) of position and/or posture for the clamping device. In some embodiments, the master manipulation arm may include an arm assembly, a wrist assembly, a balance assembly, a brake assembly, or the like. The arm assembly may provide a DoF of position for the end clamping device. For example, the arm assembly may include at least one arm joint rotation mechanism (also referred to as at least one arm joint mechanism) (e.g., 2, 3, 4, etc.), and each of the at least one arm joint rotation mechanism may provide a DoF of position. The arm assembly may provide 2-DoF of positions, 3-DoF of positions, or 4-DoF of positions. The wrist assembly may provide a DoF of posture for the clamping device. For example, the wrist assembly may include at least one wrist joint rotation mechanism (also referred to as a wrist joint mechanism) (e.g., 2, 3, 4, etc.). Each of the at least one wrist joint rotation mechanism may provide a DoF of posture. The balance assembly may be configured to balance a force torque of a self-weight of the arm assembly and/or the wrist assembly relative to a rotation axis of the arm assembly or a rotation axis of the wrist assembly. The wrist assembly may provide 2-DoF of postures, 3-DoF of postures, or 4-DoF of postures. The brake assembly may include a brake controller and a brake. The brake controller may brake an operation (e.g., locking or releasing) of the at least one joint mechanism of the wrist assembly or the arm assembly. More descriptions regarding the master manipulator may be found in the detailed descriptions of FIGS. 2-25.

The clamping device may be used for the operator to directly operate and control the end effector 140 to perform a corresponding operation, e.g., puncturing, suturing, etc. For example, the clamping device may send a control signal to the slave robotic arm of the robot body 110 based on the operation of the operator on the clamping device, and the control signal may control the end effector 140 to perform the corresponding operation. In some embodiments, the clamping device may be a hollow columnar structure for easy handling. In some embodiments, the end clamping device may be adaptively designed based on operating habits of doctors and a structure of the end effector 140 to facilitate use. For example, the clamping device may be set as a puncture needle assembly, a surgical scissors assembly, or a suturing needle assembly, etc., based on different end effectors 140 (e.g., a puncture needle, surgical scissors, a suturing needle, etc.), and a shape of the clamping device may be set to correspond to a shape of a functional component, or other shapes facilitating the operation, which are not limited here. More descriptions regarding the clamping device may be found in the detailed descriptions of FIGS. 26-40.

In some embodiments, the master manipulator may be electrically connected with the communication device 130 and the end effector 140. The communication device 130 may be electrically connected with the robot body 110. Merely by way of example, the master manipulator may transmit an action force received by the clamping device to the robot body 110 through the communication device 130, and the robot body 110 may control the end effector 140 to perform the corresponding operation based on information of the action force. As another example, resistance information received by the end effector 140 may be transmitted to the robot body 110; and the robot body 110 may send corresponding force feedback information to a master manipulator through the communication device 130 based on the resistance information, thereby realizing signal transmission. In some embodiments, a connection mode of the communication device 130, the master manipulator 200, and the robot body 110 may be a wired connection, a wireless connection, or a combination thereof. The wired connection may include: a connection via an electrical cable, a fiber optic cable, or a telephone line, or the like, or any combination thereof. The wireless connection may include: a connection via Bluetooth, Wi-Fi, WiMax, WLAN, ZigBee, a mobile network (e.g., 3G, 4G or 5G, etc.), or the like, or any combination thereof.

Figure 2:
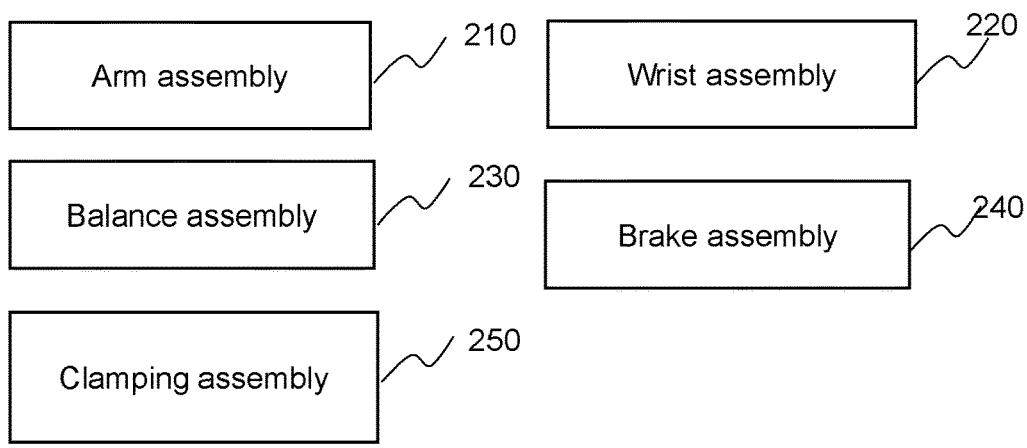
FIG. 2 is a schematic diagram illustrating modules of a master manipulator according to some embodiments of the present disclosure.

FIG. 2 is a schematic block diagram illustrating a master manipulator according to some embodiments of the present disclosure. As shown in the figure, the master manipulator 200 may include an arm assembly 210, a wrist assembly 220, a balance assembly 230, a brake assembly 240, and a clamping device 250.

The arm assembly 210 may be provided with a mounting end and a connecting end. The mounting end may be fixedly connected with a support base (or a base, i.e., a first base) of the master manipulator 200. The arm assembly 210 may have at least one DoF of movement (e.g., 2, 3, 4, etc.). The arm assembly 210 may include at least one arm joint mechanism. For example, the arm assembly 210 may include a first joint mechanism, a second joint mechanism, and a third joint mechanism. The first joint mechanism may correspond to a first rotation axis, and the first rotation axis may be parallel to the gravity direction of the wrist assembly 220. The second joint mechanism may correspond to a second rotation axis, and the second rotation axis may be perpendicular to the gravity direction of the wrist assembly 220. The third joint mechanism may correspond to a third rotation axis, and the third rotation axis may be perpendicular to the gravity direction of the wrist assembly 220. The first joint mechanism, the second joint mechanism, and the third joint mechanism may be sequentially connected in series.

In some embodiments, the arm assembly 210 may at least include at least one of the second joint mechanism and the third joint mechanism.

In some embodiments, some elements of the at least one arm joint mechanism may be sequentially connected in series to form one or more first quadrilateral connection rod mechanisms. For example, at least some elements of the second joint mechanism may be sequentially connected in series to form a first quadrilateral connection rod mechanism (or a parallelogram connection rod mechanism). As another example, at least some elements of the third joint mechanism may be sequentially connected in series to form a first quadrilateral connection rod mechanism (or a parallelogram connection rod mechanism).

In some embodiments, the master manipulator 200 may include a connection assembly configured to connect the arm assembly 210 and the wrist assembly 220. The connection assembly may be sequentially connected in series with some elements of the arm assembly 210 (e.g., elements of the second joint mechanism and/or elements of the third joint mechanism) to form a second quadrilateral connection rod mechanism. In some embodiments, elements of the one or more first quadrilateral linkage mechanisms and elements of the second quadrilateral mechanism may be arranged in a linkage manner to synchronously rotate around or follow a rotation axis of at least one joint mechanism (e.g., the second rotation axis). The rotation axis may be perpendicular to the gravity direction of the wrist assembly. More descriptions regarding the one or more first quadrilateral connection rod mechanisms and the second quadrilateral connection rod mechanism of the arm assembly 210 may be found in the detailed descriptions of FIGS. 3-8.

The wrist assembly 220 may be movably disposed at the connecting end of the arm assembly 210. The wrist assembly 220 may be installed on the arm assembly 210 to facilitate an operator to operate according to an actual working condition. The wrist assembly 220 may allow the operator to perform the corresponding operation, such as turning, clamping, etc. The wrist assembly 220 may have at least one DoF of movement (e.g., 2, 3, 4, etc.). The wrist assembly 220 may include at least one wrist joint mechanism. For example, the wrist assembly 220 may include a fourth joint mechanism, a fifth joint mechanism, a sixth joint mechanism, and a seventh joint mechanism. The fourth joint mechanism may correspond to a fourth rotation axis, and the fourth rotation axis may be parallel to the gravity direction of the wrist assembly 220. The fifth joint mechanism may correspond to a fifth rotation axis, and the fifth rotation axis may be perpendicular to the gravity direction of the wrist assembly 220. The sixth joint mechanism may correspond to a sixth rotation axis, and the sixth rotation axis may be parallel to the gravity direction of the wrist assembly 220. The seventh joint mechanism may correspond to a seventh rotation axis, and the seventh rotation axis may be perpendicular to the gravity direction of the wrist assembly 220. The fourth joint mechanism, the fifth joint mechanism, the sixth joint mechanism, and the seventh joint mechanism may be sequentially connected in series. The fourth joint mechanism may be connected with the arm assembly 210. The seventh joint mechanism may be connected with the clamping device 250.

In some embodiments, the wrist assembly 220 may at least include at least one of the fourth joint mechanism and the seventh joint mechanism.

The balance assembly 230 may include an arm balance assembly and/or a wrist balance assembly. The arm balance assembly and the wrist balance assembly may be respectively disposed at rotation joints (e.g., rotation axes) of the arm assembly 210 and the wrist assembly 200. During an action process of the master manipulator 200, the balance assembly 230 may be configured to balance a joint gravity torque caused by a self-weight of the arm assembly 210 and/or the wrist assembly 220 at the rotation joint (e.g., the rotation axis). As used herein, "balancing a joint gravity torque caused by a self-weight of the arm assembly 210 and/or the wrist assembly 220" refers to that an angle between a torque provided by the balance assembly relative to a certain rotation axis and a gravity torque of the self-weight of the arm assembly 210 or the wrist assembly 220 relative to a certain rotation axis is greater than 90 degrees to reduce a total torque at the rotation axis.

The balance assembly may be installed on the arm assembly 210 and/or the wrist assembly 220, or the balance assembly 230 may be installed between the arm assembly 210 and the wrist assembly 220, so that a gravity torque caused by the self-weight of the arm assembly 210 and/or the wrist assembly 220 to the rotation joint may be balanced, thereby relieving or avoiding the fatigue of doctors who operate for a long time, and improve the operation efficiency.

In some embodiments, the movement of the arm assembly 210 and/or the wrist assembly 220 may be a translation movement, a rotation movement, or other movement types. Correspondingly, the balance assembly 230 may also perform an adaptive change based on the movement type of the arm assembly 210 and/or the wrist assembly 220. The embodiments of the present disclosure are only described by taking the rotation of internal joints of the arm assembly 210 and the rotation of internal joints of the wrist assembly 220 as examples. It can be understood that when the arm assembly 210 and/or the wrist assembly 220 perform other movement types, the balance assembly 230 may be obtained by reasonable modification based on the forms in the following embodiments.

In some embodiments, an arm rotation joint of the arm assembly 210 may be disposed between the mounting end and the connecting end, and the arm rotation joint may drive the connecting end and the wrist assembly 220 to rotate synchronously when the arm rotation joint rotates. The arm rotation joint may be provided with an arm rotation axis. An axial direction of at least one arm rotation axis may be perpendicular to the gravity direction of the wrist assembly 220, and then a gravity of the wrist assembly 2200 may form a certain gravity torque relative to the at least one arm rotation axis.

The arm balance assembly may be disposed on the arm assembly 210. The arm balance assembly may include an elastic member. Two ends of the elastic member may be respectively connected with the arm rotation joint (e.g., the arm rotation axis or a driven member) and a support base of the arm rotation joint. A balance torque of an elastic force of the elastic member to the arm rotation axis may at least partially balance the gravity torque of the wrist assembly 220 to the arm rotation axis. The elastic member may have advantages of simple structure, long service life, low weight, and stable elastic force, and may effectively balance the gravity torque of the wrist assembly 220 to the arm rotation axis without significantly increasing a structural complexity and an overall weight of the master manipulator 200. It can be understood that the balance assembly 230 may balance the gravity of the wrist assembly 220 through the elastic force of the elastic member. The elastic member may include a spring, a rubber, an elastic cord, or the like. An angle between a torque formed by the elastic member to the rotation axis of the arm joint mechanism and a gravity torque of a gravity formed by the wrist assembly and/or the arm assembly to the rotation axis may be greater than 90 degrees. For example, the angle may be equal to 120 degrees, or equal to 150 degrees, or equal to 180 degrees.

In some embodiments, the arm balance assembly may further include a rope and a steering wheel. The steering wheel may be arranged on the support base of the arm rotation joint. One end of the elastic member may be connected with the rope, and another end of the elastic member may be connected with the support base of the arm rotation joint. Another end of the rope may be connected with the arm rotation joint. The rope may bypass the steering wheel to change an extension direction, so that the arm balance assembly may adapt to a more complex structure of the master manipulator 200. It can be understood that the rope may be a steel wire rope, a wire rope, or the like. The spring and the steel wire rope may cooperate to form a zero-free-length spring. A tension force on the steel wire rope may also be zero when the spring of the zero-free-length spring is not subjected to tension, a part of the steel wire rope between an end of the steel wire rope away from the spring and the steering wheel may be regarded as a zero-length rope. When the spring is tensioned, the part of the steel wire rope between the end of the steel wire rope away from the spring and the steering wheel may be regarded as a part of the length of the spring (bears a certain tension).

A structure of the wrist balance assembly may be similar to a structure of the arm balance assembly, which is not repeated here.

In some embodiments, the master manipulator 200 may balance the gravity of the wrist assembly 220 for each arm rotation joint and/or each wrist rotation joint whose rotation axes are perpendicular to the gravity direction, so that the fatigue caused by self-power overcoming the gravity of the wrist assembly 220 during a process of operating the master manipulator 200 may be avoided.

In some embodiments, each arm rotation joint may include a rotation member and a power member (also referred to as a power member). In some embodiments, the rotation member may include a driving member (e.g., a driving wheel) and a driven member (e.g., a driven wheel). The driven member may be rotatably arranged on the corresponding arm rotation axis. The power member may be in a transmission connection with the rotation member. The power member may be configured to drive the rotation member to rotate around or along with the corresponding arm rotation axis. A gravity torque of the at least one power member relative to the corresponding arm rotation axis may at least partially balance the gravity torque of the wrist assembly 220 relative to the corresponding arm rotation axis. For example, the power member and/or the driving member and the wrist assembly 220 may be arranged on two sides of the rotation axis, and an angle between the gravity torque formed by the power member and/or the driving member to the rotation axis and the gravity torque formed by the gravity of the wrist assembly and/or the arm assembly to the rotation axis may be greater than 90 degrees. For example, the angle may be 120 degrees, or be 150 degrees, or be 180 degrees. The gravity of the wrist assembly 220 may be further balanced by reasonably arranging the position of the driving member, thereby further improving the gravity balance effect of the master manipulator 200. More descriptions regarding the balance assembly 230 and balancing the gravity torque may be found in the detailed descriptions of FIGS. 11-25.

The brake assembly 240 may include a brake controller and a brake. In some embodiments, the brake assembly 240 may be configured to control an operation state of arm assembly 210 and/or the wrist assembly 220. In some embodiments, the brake may be disposed at any joint mechanism (e.g., the rotation axis of the wrist joint mechanism or the arm joint mechanism). For example, the brake may be connected with the fourth rotation axis of the wrist assembly 220, and the brake controller may be configured to control the operation of the fourth joint mechanism through the brake. The fourth joint mechanism may be connected with the arm assembly 210, and the fourth rotation axis corresponding to the fourth joint mechanism may be parallel to the gravity direction of the wrist assembly 220. More descriptions regarding the brake assembly 240 may be found in the detailed descriptions of FIGS. 9A-10.

The clamping device 250 may include a clamping assembly and a feedback assembly. The feedback assembly may include a transmission element and a power element. The clamping assembly may be opened and closed within a working range. The feedback component may be configured to feed a force state of a remote instrument back to the clamping component 250. In some embodiments, the clamping assembly 250 may send a control signal to a slave robotic arm through the power member to control the operation of an end effector. More descriptions regarding the clamping device 250 may be found in the detailed descriptions of FIGS. 26-40.

The above descriptions are only for illustrative purposes. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements, and corrections are suggested in the present disclosure, so such modifications, improvements, and corrections still belong to the spirit and scope of the exemplary embodiments of the present disclosure. For example, the master manipulator 200 may not include the brake assembly 240 or the balance assembly 230. As another example, the master manipulator 200 may further include a control assembly. The control assembly may include a controller capable of obtaining a position and a speed of each joint mechanism, and calculating and outputting a torque required by each joint motor.

Figure 3:
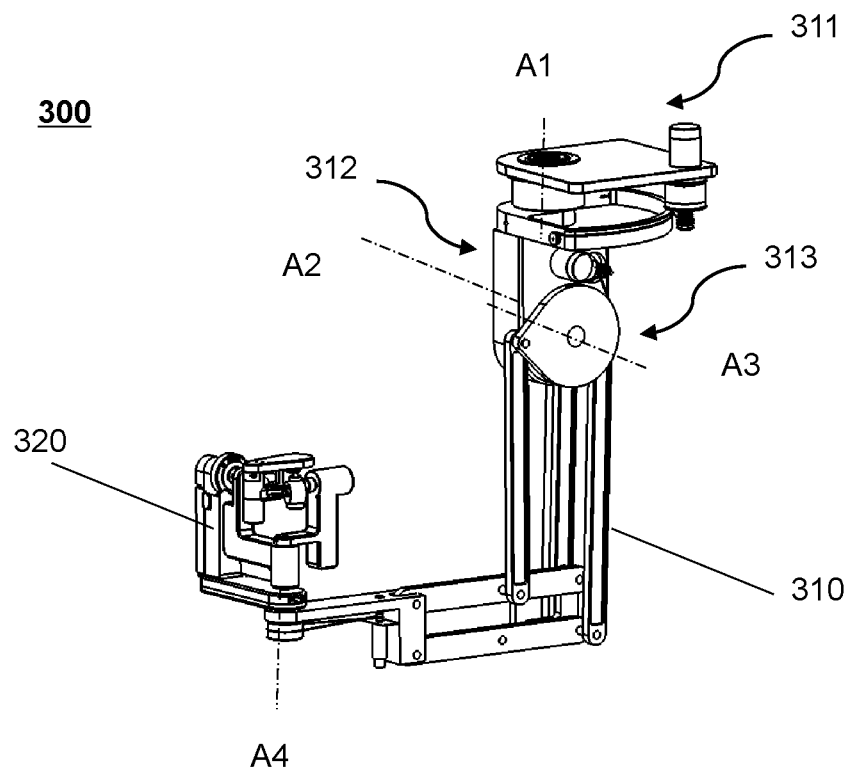
FIGS. 3-8 are schematic diagrams illustrating an exemplary master manipulator according to some embodiments of the present disclosure.

FIGS. 3-6 are schematic diagrams illustrating an exemplary master manipulator 300 according to some embodiments of the present disclosure. The master manipulator 300 may be an exemplary embodiment of the master manipulator of the console 120 described in FIG. 1, or I master manipulator 200. As shown in FIG. 3, the master manipulator 300 may include an arm assembly 310 and a wrist assembly 320. In some embodiments, the master manipulator 300 may further include a clamping device, a balance assembly, a brake assembly, or the like. More descriptions regarding the clamping device may be found in the detailed descriptions of FIGS. 26-40 of the present disclosure. More descriptions regarding the brake assembly may be found elsewhere in the present disclosure (e.g., FIGS. 9A-10). More descriptions regarding the balance assembly may be found in the detailed descriptions elsewhere in the present disclosure (e.g., FIGS. 11-25).

As shown in FIG. 3, the arm assembly 310 may provide 3-DoF of positions. Specifically, the arm assembly 310 may include a first joint mechanism 311, a second joint mechanism 312, and a third joint mechanism 313, and each joint mechanism may provide a DoF of position. The wrist assembly 320 may provide at least one DoF of posture. For example, the wrist assembly 320 may provide 2-DoF of postures, 3-DoF of postures, or 4-DoF of postures, etc. It should be noted that 3-DoF positions of the arm assembly 310 shown in FIG. 3 are for illustrative purposes only, and do not limit the scope of protection of the present disclosure. For example, the arm assembly 310 may include 2-DoF positions. As a further example, the arm assembly 310 may only include the first joint mechanism 311 and the third joint mechanism 313, or only include the first joint mechanism 311 and the second joint mechanism 312, or only include the second joint mechanism 312 and the third joint mechanism 313. As another example, the arm assembly 310 may provide at least 4-DoFs.

In some embodiments, the master manipulator 300 may further include a support assembly configured to support and install the arm assembly 310 and the wrist assembly 320.

Figure 4:
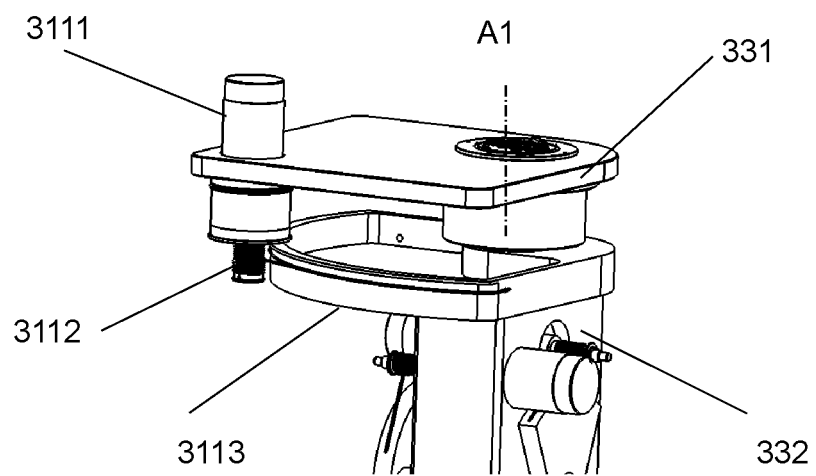

Referring to FIG. 4, FIG. 4 is a schematic diagram illustrating a structure of the first joint mechanism 311 of the master manipulator 300 shown in FIG. 3. As shown in the figure, the first joint mechanism 311 may correspond to a first rotation axis (a dotted line A1 in the figure shows an axis where the first rotation axis is located). Some elements of the first joint mechanism 311 may rotate around or along with the first rotation axis. An axial direction of the first rotation axis may be parallel to a gravity direction of the arm assembly 310. As described herein, a plane parallel to the gravity direction of the arm assembly 310 is also referred to as a vertical plane; and a plane perpendicular to the gravity direction of the arm assembly 310 is referred to as a horizontal plane. For example, some elements of the first joint mechanism 311 may rotate around or along with the first rotation axis in the horizontal plane.

The first joint mechanism 311 may include a power member 3111 (also referred to as a first power member), a driving member 3112 (also referred to as a first driving member), and a driven member 3113 (also referred to as a first driven member). The power member 3111 may provide power (e.g., mechanical energy) for the rotation of elements of the first joint mechanism 311. The power member 3111 may include a motor. In some embodiments, the power member 3111 may be installed on a substrate 331 of the support assembly. The driven member 3113 may be movably connected with the substrate 331. The driving member 3112 may be installed on an output shaft of the power member 3111 (i.e., a motor shaft) to receive the mechanical energy provided by the power member 3111. The power member 3111 may transmit the mechanical energy to the driving member 3112 through the output shaft to make the driving member 3112 rotate around or along with the output shaft of the power member 3111. The driven member 3113 may be connected with the driving member 3112 through a transmission mode (also referred to as a first transmission mode). The driving member 3112 may transmit the mechanical energy to the driven member 3113 through the first transmission mode to drive the driven member 3113 to rotate. The rotation of the driven member 3113 may drive other elements connected with the driven member 3113 (e.g., another joint mechanism of the arm assembly 310, and a base of the support assembly) to rotate around or along with the output shaft of the driven member 3113. The output shaft of the driven element 3113 may be the rotation axis of the first joint mechanism 311. The first transmission mode may include a gear transmission mode, a threaded transmission mode, a chain transmission mode, a rope transmission mode, or the like. In some embodiments, in order to ensure reverse drive performance, the first transmission mode may be the rope transmission mode. For example, the driving member 3112 may include a winding wheel (i.e., a driving wheel), and the driven member 3113 may include a driven wheel or a driven plate. When the driven member 3113 is the driven plate, at least part of an edge of the driven plate may form an arc structure or a fan-shaped structure (i.e., include an outer circular surface), and the driving member 3112 and the driven member 3113 may be coupled through a rope (e.g., a steel wire rope), so that the driven member 3113 may rotate with the rotation of the driving member 3112. In some embodiments, the driven member 3113 may be an annular structure.

A base 332 (i.e., a first base or an arm base) of the support assembly may be fixed on the driven member 3113, and rotate around or along with the first rotation axis. The base 332 may be configured to support and install elements of other joint mechanisms.

Figure 5:
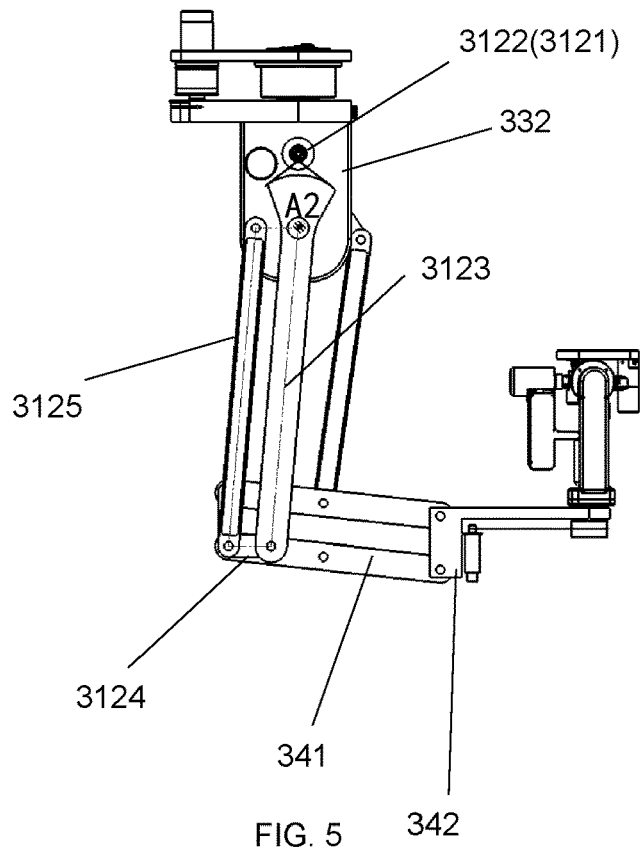

Referring to FIG. 5 and FIG. 3, FIG. 5 is a schematic diagram illustrating a structure of a second joint mechanism 312 of the master manipulator 300 shown in FIG. 3. As shown in FIG. 3 and FIG. 5, the second joint mechanism 312 may correspond to the second rotation axis (a dotted line A2 in FIG. 3 shows an axis where the second rotation axis is located). Referring to FIG. 5, a direction of the second rotation axis may be perpendicular to paper. Some elements of the second joint mechanism 312 may rotate around or along with the second rotation axis. An axial direction of the second rotation axis may be perpendicular to the gravity direction of the arm assembly 310, i.e., some elements of the second joint mechanism 312 may rotate around or along with the second rotation axis in a vertical plane. In some embodiments, a structure of the second joint mechanism may also be similar to the structure of the first joint mechanism 311. For example, the second rotation axis of the second joint mechanism may be parallel to the first rotation axis of the first joint mechanism 311.

The second joint mechanism 312 may include a power member 3121 (also referred to as a second power member), a driving member 3122 (also referred to as a second driving member), and one or more driven members (also referred to as second driven members).

The power member 3121 may provide power (i.e., mechanical energy) for the rotation of elements of the second joint mechanism 312. The power member 3121 may include a motor. In some embodiments, the power member 3121 may be installed on the base 332 of the support assembly. The driving member 3122 may be installed on an output shaft of the power member 3121. The power member 3121 and the driving member 3122 may be installed on two sides of the base 332. The power member 3121 may transmit the power (i.e., the mechanical energy) to the driving member 3122 through the output shaft of the power member 3121 to make the driving member 3122 rotate around or along with the second rotation axis.

As shown in FIG. 5, the second joint mechanism 312 may include three driven members 3123, 3124, and 3125. In some embodiments, the three driven members 3123, 3124, and 3125 may be arranged in a linkage manner to rotate around or along with the second rotation axis synchronously. For example, the three driven members 3123, 3124, and 3125 may be sequentially and movably connected in series to form a part (e.g., three sides) of a first quadrilateral connection rod mechanism. Further, one end of the driven member 3123 may be movably installed on the base 332, another end of the driven member 3123 may be movably connected with the driven member 3124. One end of the driven member 3124 may be movably connected with the driven member 3123, and another end of the driven member 3124 may be connected with the driven member 3125. The driven member 3125 may be movably connected with the base 332, and the driven member 3124 may be connected with a first connection member 341 of a connection assembly. More descriptions regarding the connection assembly may be found in FIG. 7. As used herein, "two elements are movably connected" means that the two elements may move relative to each other (e.g., rotate) while remaining connected. A movable connection manner may include a hinge connection, a bearing connection, or the like. When the driven member 3123 rotates with the rotation of the driving member 3122 around or along with the second rotation axis, the driven member 3123 may drive the driven member 3124 and the driven member 3125 to rotate around or along with the second rotation axis synchronously. During a rotation process, the driven member 3123 and the driven member 3125 may maintain a substantially parallel state due to a movable connection between the adjacent driven members and a movable connection between the driven member and the base. Since connecting lines of the three driven members 3123, 3124 and 3125 are similar to a parallelogram (as shown by the dotted line in FIG. 5), the first quadrilateral connection rod mechanism may also be referred to as a first parallelogram connection rod mechanism. The driven member 3123 may also be referred to as an input member of the first parallelogram connection rod mechanism.

In some embodiments, the driven member 3123 may be connected with the driving member 3122 through a transmission mode (also referred to as a second transmission mode). The driving member 3122 may drive the driven member 3123 to rotate through the second transmission mode. The driven member 3123 may rotate to drive other elements connected with the driven member 3123 (e.g., the driven member 3124, 3125) to rotate around or along with the rotation axis of the driven member 3123. The rotation axis of the driven member 3123 may be the rotation axis of the second joint mechanism 312. The second transmission mode may include a gear transmission mode, a threaded transmission mode, a chain transmission mode, a rope transmission mode, or the like. In some embodiments, in order to ensure the reverse drive performance, the second transmission mode may be the rope transmission mode. For example, the driving member 3122 may include a winding wheel (i.e., a driving wheel), and the driven member 3123 may include a driven wheel, a driven plate, or a driven rod (also referred to as a connection rod). When the driven member 3123 is the plate or rod structure, at least part of an edge of the driven rod or the driven plate may form an arc structure or a fan-shaped structure (i.e., an outer circular surface). The driving member 3122 and the outer circular surface of the driven member 3123 may be coupled through a rope (e.g., a steel wire rope), so that the driven member 3123 may rotate with the rotation of the driving member 3112. It should be noted that, the description about the second joint mechanism 312 in FIG. 5 is only an example, and does not limit the scope of protection of the present disclosure. For example, in some embodiments, the driven member 3123 may be directly connected with the output shaft of the power member 3121, i.e., the second joint mechanism 312 may not include the driving member 3122. In some embodiments, a count of the driven members of the second joint mechanism 312 may be only one, i.e., the second joint mechanism 312 may provide the first parallelogram connection rod mechanism.

Figure 6:
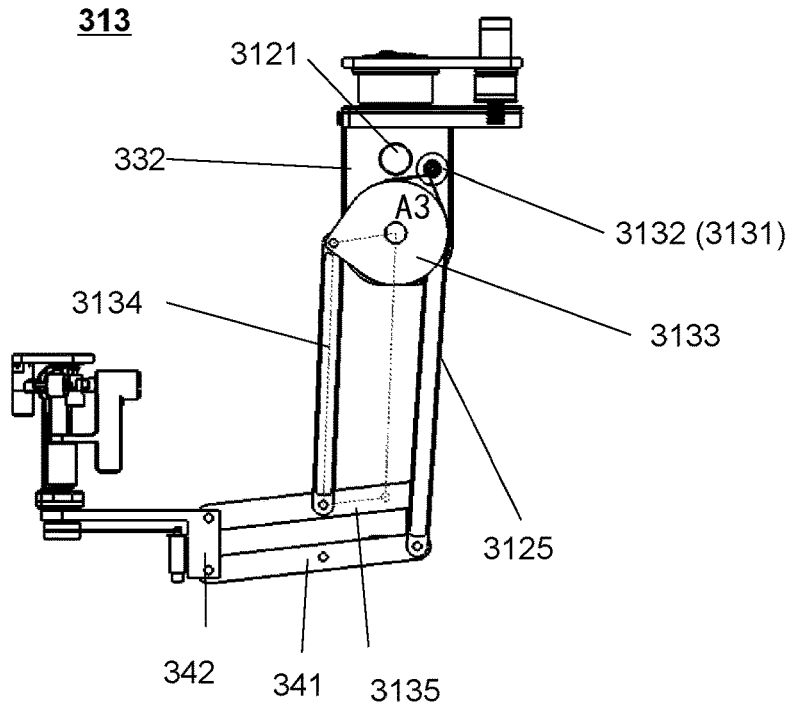

Referring to FIG. 6 and FIG. 3, FIG. 6 is a schematic diagram illustrating a structure of the third joint mechanism 313 of the master manipulator 300 shown in FIG. 3. As shown in FIGS. 3 and 6, the third joint mechanism 313 may correspond to a third rotation axis (a dotted line A3 in FIG. 3 shows an axis where the third rotation axis is located). Some elements of the third joint mechanism 313 may rotate around or along with the third rotation axis. An axial direction of the third rotation axis may be perpendicular to the gravity direction of the arm assembly 310, i.e., some elements of the third joint mechanism 313 may rotate around or along with the third rotation axis in a vertical plane. In some embodiments, a structure of the third joint mechanism may also be similar to the structure of the first joint mechanism 311. For example, the third rotation axis of the third joint mechanism may be parallel to the first rotation axis of the first joint mechanism 311.

The third joint mechanism 313 may include a power member 3131 (also referred to as a third power member), a driving member 3132 (also referred to as a third driving member), and one or more driven members (also referred to as third driven members).

The power member 3131 may provide power for the rotation of the elements of the third joint mechanism 313. The power member 3131 may include a motor. In some embodiments, the power member 3131 may be installed on the base 332 of the support assembly. For example, the power member 3131 of the third joint mechanism 313 and the power member 3121 of the second joint mechanism 312 may be installed on two sides of the base 332. The driving member 3132 may be installed on the output shaft of the power member 3121. In some embodiments, the driving member 3132 and the power member 3121 may be installed on two sides of the base 332. The driving member 3132 of the third joint mechanism 313 and the power member 3121 of the second joint mechanism 312 may be installed on a same side of the base. The power member 3131 of the third joint mechanism 313 and the driving member 3122 of the second joint mechanism 312 may be installed on a same side of the base. The power member 3131 may transmit power to the driving member 3132 through the output shaft of the power member 3131 to make the third rotation axis rotate The third joint mechanism 313 may include three driven members 3133, 3134 and 3135. In some embodiments, the three driven members 3133, 3134 and 3135 may be arranged in a linkage manner to rotate around or along with the third rotation axis synchronously. For example, the three driven members 3133, 3134 and 3135 may be sequentially and movably connected in series to form a part (e.g., three sides of the quadrilateral connection rod mechanism) of a quadrilateral connection rod mechanism (i.e., another first quadrilateral connection rod mechanism). Further, a part (e.g., an end region or center region) of the driven member 3133 may be movably installed on the base 332. An end of the driven member 3133 may be movably connected with the driven member 3134. An end of the driven member 3134 may be movably connected with the driven member 3133. Another end of the driven member 3134 may be connected with the driven member 3135. The driven member 3135 may be connected with a second connection member 342 of the connection assembly.

In some embodiments, the driven member 3135 includes an extension end relative to the first quadrilateral connection rod mechanism of the third joint mechanism 313. The extension end may be movably connected with the second connection member 342 of the connection assembly. More descriptions regarding the connection assembly may be found in FIG. 7. The driven member 3133 may be substantially parallel to the driven member 3135. When the driven member 3133 rotates around or along with the third rotation axis by the driving member 3132, the driven member 3133 may drive the driven member 3123 and the driven member 3135 to rotate synchronously with or along with the third rotation axis. During the rotation process, the driven member 3133 and the driven member 3135 may maintain a substantially parallel state due to a movable connection between the adjacent driven members and a movable connection between the driven member and the base. Since connecting lines of the three driven members 3133, 3134 and 3135 are similar to a parallelogram (e.g., a dotted line shown in FIG. 6), the first quadrilateral connection rod mechanism may also be referred to as a first parallelogram connection rod mechanism.

In some embodiments, the driven member 3133 may be connected with the driving member 3132 through a transmission mode (also referred to as a third transmission mode). The driving member 3132 may drive the driven member 3133 to rotate through the third transmission mode. The rotation of the driven member 3133 may drive other elements connected with the driven member 3133 (e.g., the driven members 3134, 3135) to rotate around or along with the third rotation axis. A part of the driven element 3133 movably connected with the base 332 may be the rotation axis of the third joint mechanism 313. The driven member 3133 may also be referred to as an input member of the first parallelogram connection rod mechanism of the third joint mechanism 313. The third transmission mode may include a gear transmission mode, a threaded transmission mode, a chain transmission mode, a rope transmission mode, or the like. In some embodiments, in order to ensure the reverse drive performance, the third transmission mode may be the rope transmission mode. For example, the driving member 3132 may include a winding wheel (i.e., a driving wheel), and the driven member 3133 may include a driven wheel, a driven plate, or a driven rod (also referred to as a connection rod). If the driven member 3133 is a rod or plate structure, at least a part of an edge of the rod or the plate may form an arc structure or a fan-shaped structure (i.e., an outer circular surface). The driving member 3132 and the outer circular surface of the driven member 3133 may be coupled through a rope (e.g., a steel wire rope), so that the driven member 3133 may rotate with the rotation of the driving member 3132. It should be noted that, in some embodiments, the driven member 3133 may be directly connected with the output shaft of the power member 3131, i.e., the third joint mechanism 313 may not include the driving member 3132. In some embodiments, a count of the driven members of the third joint mechanism 313 may be only one, i.e., the third joint mechanism 313 may not provide the first parallelogram connection rod mechanism.

Figure 7:
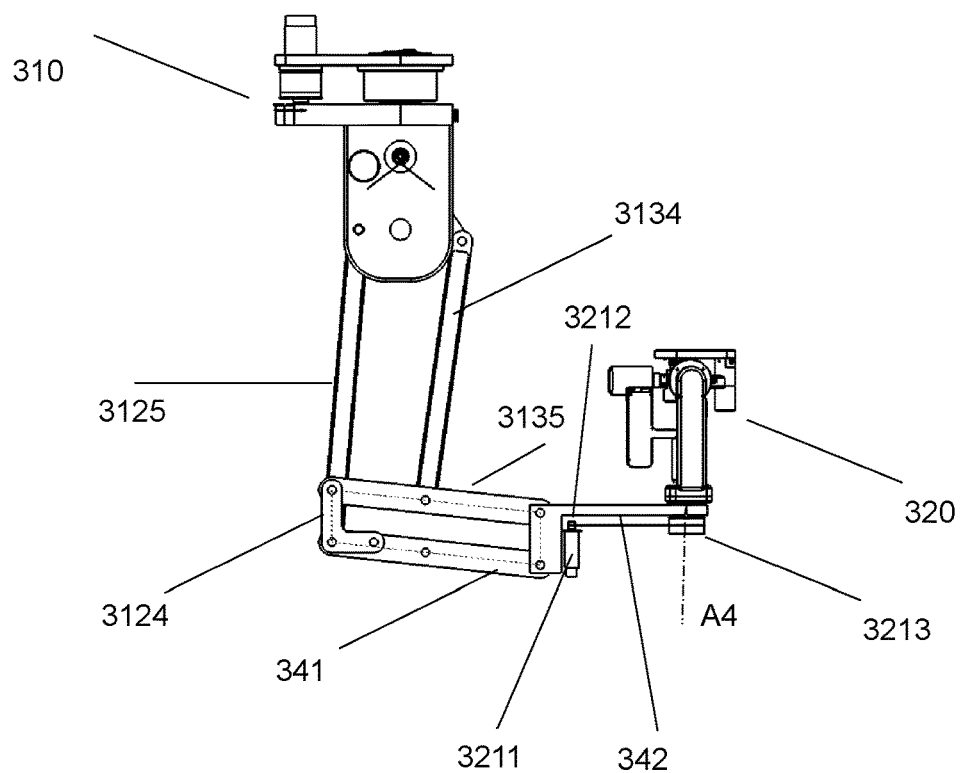

Referring to FIG. 7, FIG. 7 is a schematic diagram illustrating a structure of a connection assembly of the master manipulator 300 shown in FIG. 3.

The connection assembly may connect the arm assembly 310 and the wrist assembly 320 in a transmission mode. The connection assembly may include a connection member 341 (also referred to as a first connection member) and a connection member 342 (also referred to as a second connection member). The connection member 341 may be movably connected with the driven member 3124 of the second joint mechanism 312. The connection member 342 may be movably connected with the driven member 3135 of the third joint mechanism 313. The driven member 3124, the connection member 341, the connection member 342, and the driven member 3135 may be arranged in a linkage manner, i.e., when the driven member 3124 and/or the driven member 3135 rotates, the connection member 341 and the connection member 342 may rotate synchronously, thereby driving the wrist assembly 320 to rotate. For example, the driven member 3124, the connection member 341, the connection member 342, and the driven member 3135 may be sequentially connected in series, so that when the driven member 3124 and/or the driven member 3135 rotates, the connection member 341 and the connection member 342 may rotate synchronously. In some embodiments, connecting lines of the driven member 3124, the connection member 341, the connection member 342, and the driven member 3135 may be approximately a parallelogram, so that the driven member 3124, the connection member 341, the connection member 342, and the driven member 3135 sequentially connected in series may form a second quadrilateral linkage mechanism, i.e., a second parallelogram connection rod mechanism. In the rotation process of each element of the second parallelogram connection rod mechanism, two non-adjacent elements (e.g., a part of the connection member 342 and a part of the driven member 3124, or the driven member 3135 and the connection member 341) may maintain parallel or approximately parallel to each other due to the movable connection of the connection member 341, the driven member 3124, the driven member 3135, and the connection member 342.

In some embodiments, the driven member 3124 may include two portions (e.g., a right-angled rod structure). Two ends of a first portion of the driven member 3124 may be respectively connected with the driven member 3123 and the driven member 3125. A second portion of the driven member 3124 may be connected with the driven member 3125. An intersection position between the first portion and the second portion of the driven member 3124 may be a connection point with the connection member 341, i.e., the second portion of the driven member 3124 may form a side of the second parallelogram connection rod mechanism, and the first portion of the driven member 3124 may overlap with the connection member 341.

In some embodiments, the connection member 342 may include two portions (e.g., a right-angled rod structure). A first portion of the connection member 342 may be connected with the connection member 341 and an extension end of the driven member 3135. For example, upper and lower ends of the first portion of the connection member 342 may be provided with grooves, respectively, and rotation shafts may be arranged in the grooves. Each of one end of the connection member 341 and one end of the driven member 3135 may be provided with a circular hole. The circular holes may penetrate through the rotation shafts in the grooves, so that the first portion of the connection member 342 may be movable connected with the connection member 341 and the extension end of the driven member 3135. The second portion of the connection member 342 may be connected with the wrist assembly 320. The wrist assembly 320 may be movably arranged on the second portion of the connection member 342.

The wrist assembly 320 may include a fourth joint mechanism. The fourth joint mechanism may correspond to a fourth rotation axis (a dotted line A4 in FIG. 7 shows an axis where the fourth rotation axis is located). The fourth rotation axis may be parallel to the gravity direction of the wrist assembly 320. In some embodiments, the fourth joint mechanism may include a power member 3211, a driving member 3212, and a driven member 3213. The power member 3211 may provide power for the rotation of elements of the fourth joint mechanism. The power member 3211 may include a motor. In some embodiments, the power element 3211 may be installed on the first portion of the connection element 342. The driving member 3212 may be installed on an output shaft of the power member 3211. The power member 3211 may transmit the power to the driving member 3212 through the output shaft of the power member 3211 to make the driving member 3212 rotate. The driven member 3213 may be movably mounted on the second portion of the connection member 342. In some embodiments, the driven member 3213 may be connected with the driving member 3212 through a transmission mode (also referred to as a fourth transmission mode), so that the driving member 3212 may drive the driven member 3213 to rotate through the fourth transmission mode. Other joint mechanisms of the wrist assembly 320 may be installed on the output shaft of the driven member 3213, so that the other joint mechanisms of the wrist assembly 320 may rotate around or along with the output shaft of the driven member 3213 (i.e., the fourth rotation axis). The fourth transmission mode may include a gear transmission, a threaded transmission mode, a chain transmission mode, a rope transmission mode, or the like. In some embodiments, in order to ensure reverse drive performance, the fourth transmission mode may be the rope transmission mode. For example, the driving member 3212 may include structures such as a winding wheel and a plate, and the driven member 3213 may include a driven wheel, a driven plate, or a driven rod (also referred to as a connection rod).

In some embodiments, the first transmission mode, the second transmission mode, the third transmission mode, and the fourth transmission mode may be the same or different.

Figure 8:
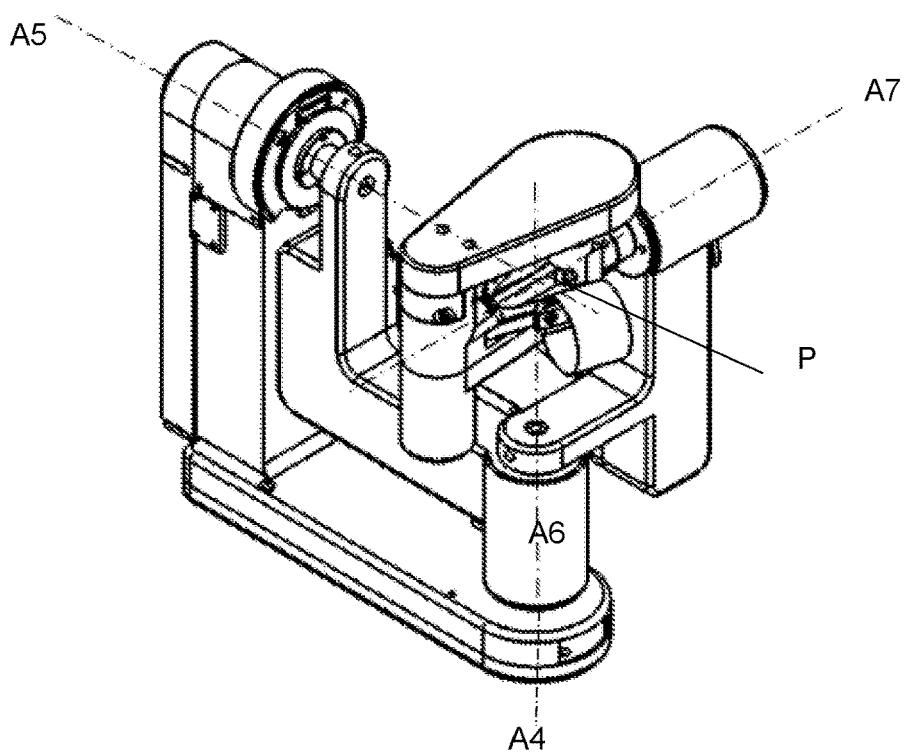

In some embodiments, in addition to the fourth joint mechanism, the wrist assembly 320 may further include one or more joint mechanisms, e.g., 2 or 3 joint mechanisms, etc. Each joint mechanism may provide a DoF of posture. Each joint mechanism may correspond to a rotation axis. The rotation axes of a plurality of joint mechanisms of the wrist assembly 320 may be configured to intersect at one point. Referring to FIG. 8, FIG. 8 is a schematic diagram illustrating a structure of the wrist assembly 320 of the master manipulator 300 shown in FIG. 3. The wrist assembly 320 may further include a fifth joint mechanism corresponding to a fifth rotation axis, a sixth joint mechanism corresponding to a sixth rotation axis, and a seventh joint mechanism corresponding to a seventh rotation axis. The fourth rotation axis, the fifth rotation axis, the sixth rotation axis, and the seventh rotation axis may intersect at a point P. Through the design of the above three parallelogram connection rod mechanisms (i.e. two first parallelogram connection rod mechanisms and the second parallelogram connection rod mechanism), due to the movable connection between connection rods mutually connected of the first parallelogram connection rod mechanisms and the second parallelogram connection rod mechanism, when the joint mechanisms of the master manipulator rotate, a posture of a wrist may remain constant when the position of the point P changes, i.e., the second portion of the connection member 342 may always maintain a horizontal state, thereby ensuring that a position change may not affect the orientation of the wrist, and realizing decoupling of the position and the orientation. It should be noted that the descriptions about the master manipulator in FIGS. 3-8 are only exemplary illustrations, and do not limit the scope of protection of the present disclosure. In some embodiments, the master manipulator may at least include a first parallelogram connection rod mechanism and a second parallelogram connection rod mechanism, and may also realize decoupling of the position and the orientation.

The above description is only an illustration, and obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in the present disclosure so such modifications, improvements and corrections still belong to the spirit and scope of the exemplary embodiments of the present disclosure. For example, the master manipulator may not include the first joint mechanism 311 and/or the second joint mechanism 312, then the connection assembly may further include a third connection member in addition to the connection member 341 and the connection member 342, and the third connection member may be connected with the driven member 3135 and the connection member 341. As another example, the master manipulator may not include the first joint mechanism 311 and/or the third joint mechanism 313, then the connection assembly may further include a third connection member in addition to the connection member 341 and the connection member 342. The third connection member may be connected with the driven member 3124 and the connection member 342.

Figure 9A:
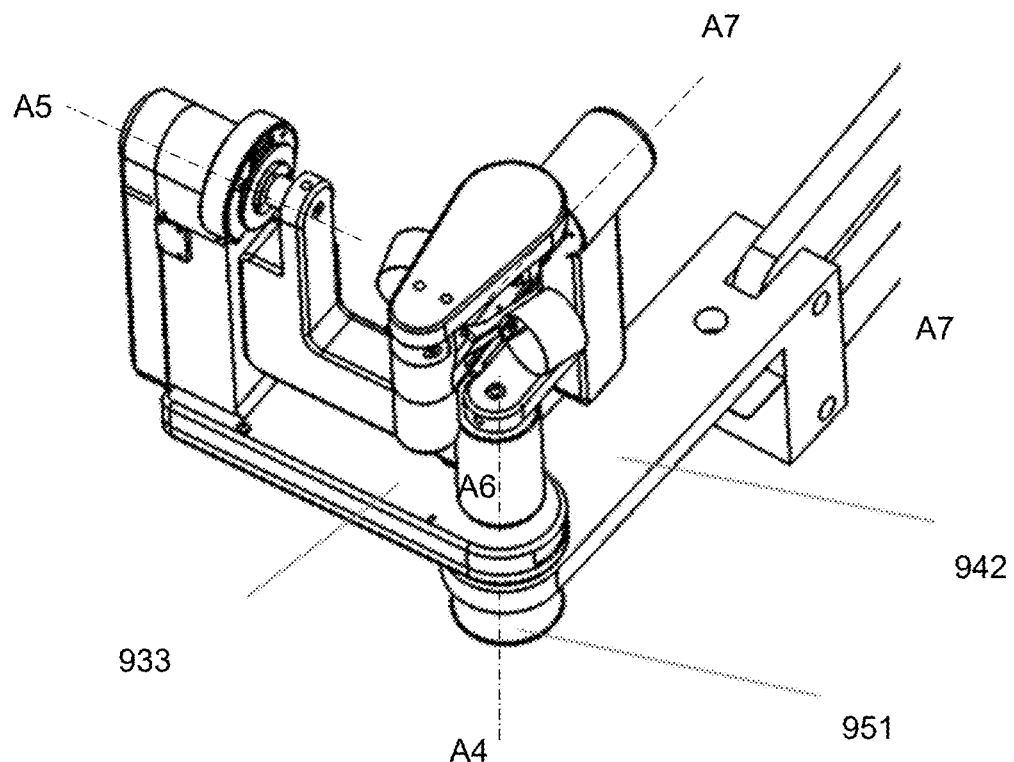
FIG. 9A is a schematic diagram illustrating an exemplary wrist assembly of a master manipulator according to some embodiments of the present disclosure.

FIG. 9A is a schematic diagram illustrating an exemplary wrist assembly of a master manipulator according to some embodiments of the present disclosure. A wrist assembly 900 may be an exemplary wrist assembly of a master manipulator shown elsewhere herein (e.g., the master manipulator 300, the master manipulator 200, and the master manipulator of the console 120 in FIG. 1).

The master manipulator may include an arm assembly (e.g., the arm assembly 310, and an arm assembly 1110, etc.). Detailed descriptions regarding the arm assembly and the wrist assembly may be found elsewhere. In some embodiments, the wrist assembly 900 may be similar to the wrist assembly 320 or a wrist assembly 1120. For example, the wrist assembly 900 may include a fourth joint mechanism. The fourth joint mechanism may correspond to a fourth rotation axis (a dotted line A4 in FIG. 9A shows an axis where the fourth rotation axis is located). The fourth rotation axis may be parallel to a gravity direction of the wrist assembly 900. As another example, in addition to the fourth joint mechanism, the wrist assembly 900 may further includes one or more wrist joint mechanisms, e.g., 2, 3, or 4, etc. Each joint mechanism may provide a DoF of posture. Each joint mechanism may correspond to a rotation axis. The rotation axes of a plurality of joint mechanisms of the wrist assembly 900 may be configured to intersect at one point. For example, the wrist assembly 900 may include a fifth joint mechanism corresponding to a fifth rotation axis, a sixth joint mechanism corresponding to a sixth rotation axis, and a seventh joint mechanism corresponding to a seventh rotation axis. The fourth joint mechanism, the fifth joint mechanism, the sixth joint mechanism, and the seventh joint structure may be sequentially connected in series. The fourth rotation axis, the fifth rotation axis, the sixth rotation axis, and the seventh rotation axis may intersect at one point. The fourth rotation axis may be parallel to the sixth rotation axis, and the fifth rotation axis may be parallel to the seventh rotation axis and perpendicular to the fourth rotation axis. As another example, the wrist assembly 900 may be provided with a wrist balance assembly. More descriptions regarding the balance assembly be found in the detailed descriptions of FIGS. 11-25. As another example, the wrist assembly 900 may be connected with a clamping device. More descriptions regarding the clamping device may be found the detailed descriptions of FIGS. 26-30.

In some embodiments, the fourth joint mechanism may include a power member, a driving member, and a driven member (not shown in the figure). In some embodiments, the fourth joint mechanism may be similar or same as the fourth joint mechanism in FIG. 7. For example, the power member may be installed on a first portion of a connection member 942 between the arm assembly and the wrist assembly. The driving member (e.g., a driving wheel) may be rotatably installed on an output shaft of the power member (e.g., a motor). The driven member (e.g., a driven wheel) may be movably installed on a second portion of the connection member 942. The driven member and the driving member may be connected through a transmission mode (also referred to as a fourth transmission mode), so that the driving member may drive the driven member to rotate through the fourth transmission mode. Other joint mechanisms (e.g., the fifth joint mechanism) of the wrist assembly 900 may be connected with the output shaft (i.e., the fourth rotation axis) of the driven member through a base 933 (e.g., a horizontal portion, which may also be referred to as a second base of the support assembly or a wrist base) of the wrist assembly 900, so that the other joint mechanisms of the wrist assembly 900 may rotate around or along with the output shaft (i.e., the fourth rotation axis) of the driven member in a horizontal plane along with the base 933 of the wrist assembly 900. In some embodiments, the fourth joint mechanism may be similar to or the same as the fourth joint mechanism in FIGS. 11-16. In some implementations, the fourth joint mechanism may include a power member, and the other joint mechanisms (e.g., the fifth joint mechanism) of the wrist assembly 900 may be connected with the output shaft (i.e., the fourth rotation axis) of the power member through the base 933 (e.g., the horizontal portion) of the wrist assembly 900, so that the other joint mechanisms of the wrist assembly 900 may rotate round or along with the output shaft (i.e., the fourth rotation shaft) of the power member along with the base 933 of the wrist assembly 900 in the horizontal plane.

Figure 9B:
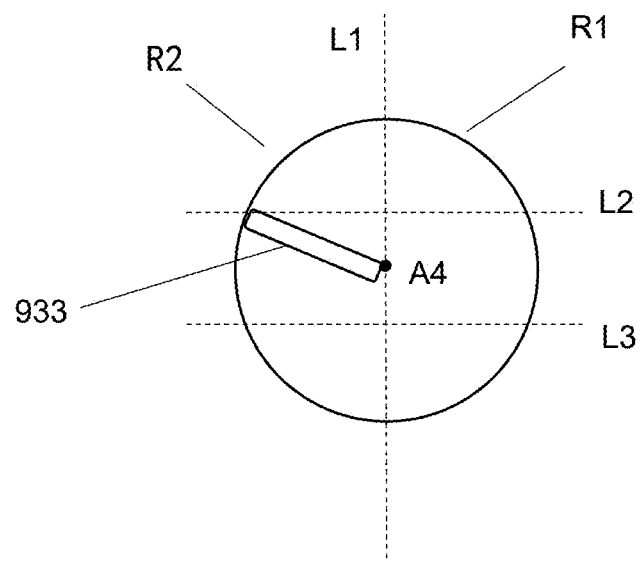
FIG. 9B is a schematic diagram illustrating a rotation range of a wrist assembly of a master manipulator according to some embodiments of the present disclosure.

A rotation angle of the wrist assembly 900 relative to the fourth rotation axis (also referred to as a rotation range of the fourth rotation axis or a rotation range of the fourth joint mechanism) may be a rotation range of the base 933 (e.g., the horizontal portion of the base 933) around the fourth rotation axis. In some embodiments, the base 933 may rotate 120 degrees, 180 degrees, or 360 degrees around the fourth rotation axis. As shown in FIG. 9B, when the base 933 rotates 360 degrees around the fourth rotation axis, the rotation range of the fourth rotation axis may be similar to a circular region. It should be noted that if the other joint mechanisms (e.g., the fifth joint mechanism) of the wrist assembly 900 are not arranged at an end region of the horizontal portion of the base 933, the length of the horizontal portion of the base 933 may be distance between a position of the fifth joint mechanism located at the horizontal portion of the base 933 and the fourth rotation axis.

The master manipulator may further include a brake assembly. The brake assembly may include a brake controller (not shown in the figure) and a brake 951. The brake controller may be configured to control operation of one or more joint mechanisms of the wrist assembly 900 through the brake 951. The brake 951 may include a friction brake (e.g., a disc brake, an external block brakes), a non-friction brake (e.g., a magnetic eddy current brake), or the like. In some embodiments, the brake 951 may include a brake member, a transmission member, and an energy supply device. The energy supply device may provide energy required for braking. The brake member (e.g., a brake pad, a brake block, etc.) may generate a force that hinders the rotation of the fourth rotation axis. The transmission member may transmit the braking energy provided by the energy supply device to the brake member. The brake controller may obtain a rotation speed and a rotation direction of the fourth rotation axis, and control the energy supply device to provide the corresponding braking energy according to the rotation speed and the rotation direction of the fourth rotation axis. The brake assembly may receive the braking energy through the transmission member and generate a force (i.e., braking force) that hinders the rotation of the fourth rotation axis. In some embodiments, the braking assembly may be configured to control releasing and locking of a certain joint mechanism of the wrist assembly 900. As shown in FIG. 9A, the brake 951 may be connected with the fourth rotation axis to control locking and releasing of the fourth joint mechanism. As described herein, a released state of the joint mechanism means that the power member and/or a rotation member (e.g., the driving member or the driven member) of the joint mechanism may be in a rotational state; a locked state of the joint mechanism means that the rotation member (e.g., the driving member or the driven member) of the joint mechanism may be in a non-rotational state. In some embodiments, the brake 951 may be physically connected with the power member, the driving member, and/or the driven member of the fourth joint mechanism. In some embodiments, the brake 951 may be physically connected with the fourth rotation axis of the fourth joint mechanism.

An operation state of the brake 951 may include a disconnected state and a closed state. In some embodiments, when the brake 951 is in the disconnected state, the corresponding fourth joint mechanism may be in the locked state; and when the brake 951 is in the closed state, the corresponding fourth joint mechanism may be in the released state.

In some embodiments, in response to a determining that the wrist assembly 900 satisfies a first condition, the brake controller may generate and send a release instruction to the brake 951. The release instruction may be used to instruct the brake 951 to be in the closed state. For example, the release instruction may instruct the brake 951 to switch from the disconnected state to the closed state.

In some embodiments, in response to a determining that the wrist assembly 900 satisfies a second condition, the brake controller may generate and send a locking instruction to brake 951. The locking instruction may be used to instruct the brake 951 to be in a locked state. For example, the locking instruction may instruct the brake 951 to switch from the closed state to the disconnected state.

In some embodiments, the first condition may include that the horizontal portion of the base 933 may be in a first region of the rotation range of the fourth rotation axis; and the second condition may include that the horizontal portion of the base 933 may not be in the first region of the rotation range of the fourth rotation axis. In some embodiments, the first condition may include that when the sixth rotation axis rotates in a first direction, the horizontal portion of the base 933 may be in the first region of the rotation range of the fourth rotation axis; and the second condition may include that when the sixth rotation axis rotates in the first direction, the horizontal portion of the base 933 may not be in the first region of the rotation range of the fourth rotation axis.

In some embodiments, the first condition may include that the horizontal portion of the base 933 may be in a second region of the rotation range of the fourth rotation axis; and the second condition may include that the horizontal portion of the base 933 may not be in the second region of the rotation range of the fourth rotation axis. As described herein, the first region refers to a region, on a right side of an operator acting as a reference object, of the rotation range formed by the operator operating the master manipulator to make the wrist assembly 900 rotate around or along with the fourth rotation axis. The second region refers to a region, on a left side of the operator acting as a reference object, of the rotation range formed by the operator operating the master manipulator to make the wrist assembly 900 rotate around or along with the fourth rotation axis. As shown in FIG. 9B, if the wrist assembly 900 rotates 360 degrees around the fourth rotation axis, the rotation range of the fourth rotation axis may be a circular region, and a region R1 on a right side of a dotted line $L_1$ in the circular region is the first region; and a region R2 on a left side of the dotted line $L_1$ in the circular region is the second region.

In some embodiments, the first condition may include that when the sixth rotation axis rotates in a second direction, the horizontal portion of the base 933 may be in the second region of the rotation range of the fourth rotation axis; and the second condition may include that when the sixth rotation axis rotates in the second direction, the horizontal portion of the base 933 may not be in the second region of the rotation range of the fourth rotation axis. The first direction means that the operator operates the master manipulator to make the wrist assembly 900 rotate clockwise with the operator as the reference object; and the second direction means that that the operator operates the master manipulator to make the wrist assembly 900 rotate counterclockwise with the operator as the reference object. As described herein, the rotation of the rotation axis of the joint mechanism may drive the rotation of other structures or elements connected with the rotation axis In order to make the base 933 in the middle region of the rotation range of the fourth rotation axis as much as possible (e.g., a position between dotted lines L2 and L3 in FIG. 9B), when the operator controls the master manipulator and the sixth rotation axis rotates to the left, if the base 933 is in the right region of the rotation range of the fourth rotation axis, the brake controller may control the brake 951 to close, i.e., the fourth rotation axis is in the released state, which may make the base 933 rotate to the middle region. Similarly, when the operator controls the master manipulator and the sixth rotation axis rotates to the right, if the base 933 is in the left region of the rotation range of the fourth rotation axis, the brake controller may control the brake 951 to close, i.e., the fourth rotation axis is in the released state, which may make the connection rod 23 to rotate to the middle region.

In some embodiments, the first condition may include that a distance between the sixth rotation axis and a first limiter or a second limiter is smaller than a first threshold. The first threshold may be 1 mm, 2 mm, etc. The second condition may include that a distance between the sixth rotation axis and the first limiter or the second limiter is greater than a second threshold. The second threshold may be 1 mm, 2 mm, etc. The second threshold may be greater than or equal to the first threshold. When the brake 951 is in the disconnected state, i.e., the fourth rotation axis (i.e., the fourth joint mechanism) is in the locked state, in other words, the horizontal portion of the base 933 may not rotate. When the operator controls the master manipulator and the sixth rotation axis rotates close to a left (i.e. the first limiter)/right limiter (i.e. the second limiter), the brake controller may issue an instruction to control the brake 951 to close, i.e. the fourth rotation axis is in the released state, and may rotate. The rotation range of the master manipulator may be significantly increased through this control, thereby achieving a larger operation space. The first limiter and the second limiter may be defined by a specific structure of the master manipulator.

In some embodiments, the first condition may include that the master manipulator may be in a singular position. For example, the singular position of the master manipulator means that the fourth rotation axis and the sixth rotation axis are on a same line. With this arrangement, when the master manipulator is close to the singular position, the brake controller may control the brake 951 to close, such that the master manipulator may avoided the singular position through the rotation of the fourth rotation axis.

Figure 10:
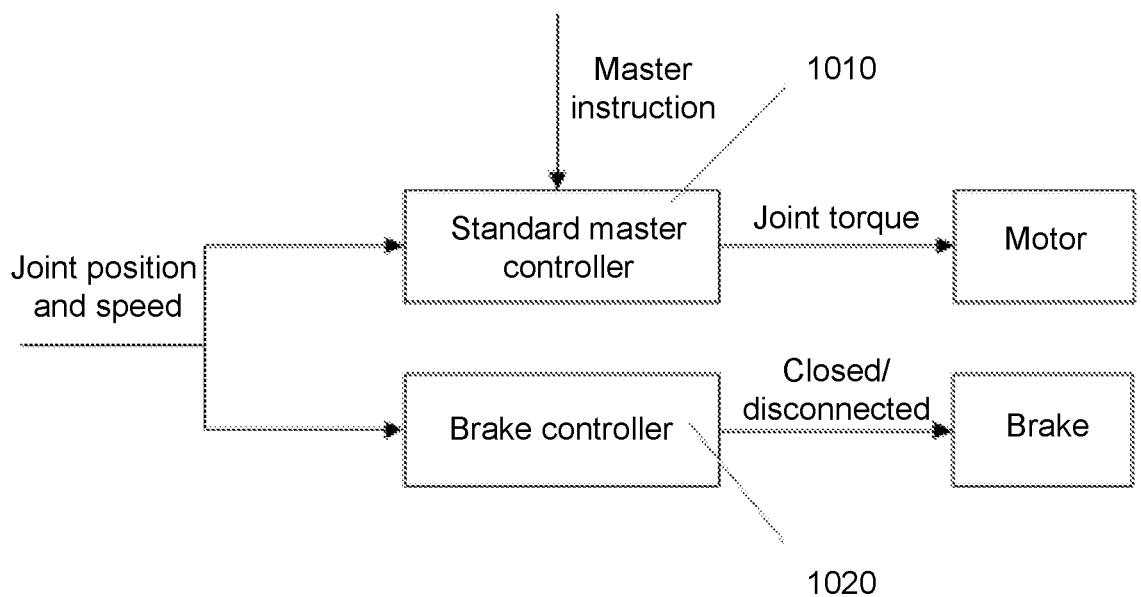
FIG. 10 is a block diagram illustrating an exemplary control assembly of a master manipulator according to some embodiments of the present disclosure.

FIG. 10 is a block diagram illustrating an exemplary control assembly of a master manipulator according to some embodiments of the present disclosure. A control assembly 1000 may be applied to the master manipulator as described elsewhere herein (e.g., the master manipulator 300, the master manipulator 200, and a master manipulator 1100).

The control assembly 1000 may include a standard master controller 1010 and a brake controller 1020.

The standard master controller refers to a main controller of the master manipulator, which may read a position and/speed of each joint to calculate and output a torque required by each joint motor, and control operation of each joint motor according to the torque.

The brake controller 1020 may read motion parameters such as a position, speed, a rotation direction, etc., of each joint mechanism of the master manipulator. An operation state of the brake may be controlled through the position and/or the speed of each joint mechanism. In some implementations, the brake controller 1020 may directly obtain the position and/or the speed of each joint mechanism from the master controller 1010. In some embodiments, the brake controller 1020 may obtain parameter information (e.g., the rotation speed, the torque, etc.) of the power member from the power member of each joint mechanism, and determine motion parameters such as the position, the speed, the rotation direction, etc., of each joint mechanism by calculating the parameter information of the power member. The position and/or the speed of each joint mechanism refers to a position and/or speed of a center of gravity of each joint mechanism. The rotation direction refers to a rotation direction of the rotation axis. For example, referring to the master manipulator in FIG. 9, the brake controller 1020 may determine whether the position of the sixth rotation axis is close to the left (i.e. the first limiter)/right limiter (i.e. the second limiter) by reading the position of the sixth rotation axis. If the position of the sixth rotation axis is close to the left (i.e. the first limiter)/right limiter (i.e. the second limiter), the brake controller 120 may issue the release instruction to control the brake 951 to close, so that the fourth rotation axis is in the released state, and may rotate. As another example, the brake controller 1020 may obtain the position of the master manipulator (e.g., the position of the center of gravity of each joint mechanism or the position of the intersection point of a plurality of axes of the wrist assembly), and the brake controller 1020 may determine whether the master manipulator is close to the singular position. If the master manipulator is close to the singular position, the brake controller may control the brake 951 to close, thereby releasing the fourth rotation axis, and avoiding the singular position through the rotation of the fourth rotation axis.

More descriptions regarding the brake controller may be found the detailed descriptions of FIG. 9A.

FIGS. 11-16 are schematic diagrams illustrating an exemplary master manipulator according to some embodiments of the present disclosure. The master manipulator may be an exemplary embodiment of the master manipulator described elsewhere herein (e.g., the master manipulator 200 and the master manipulator of the console 120).

As shown in FIGS. 11-16, the master manipulator may include an arm assembly 1110 and a wrist assembly 1120. The arm assembly 1110 may include three rotation joints, i.e., a first joint mechanism 10, a second joint mechanism 20, and a third joint mechanism 30, which may correspond to the first rotation axis, the second rotation axis, and the third rotation axis, respectively, (A1, A2, and A3 in the figure show axes where the first rotation axis, the second rotation axis, and the third rotation axis are located, respectively). Elements connected with the first rotation axis may rotate in a horizontal plane of a use state, and elements connected with the second rotation axis and the third rotation axis may rotate in a vertical plane of the use state. An extension axis of the second rotation axis and an extension axis of the third rotation axis may be respectively perpendicular to the gravity direction. It should be noted that the arm assembly 1110 including three rotation axes is only an example to explain the balance assembly, and does not limit the scope of protection of the present disclosure. In some embodiments, the arm assembly may include 2 rotation axes, 1 rotation axis, or more than 3 rotation axes. In other words, the arm assembly may provide 1-DoF of position, 2-DoF of positions, 3-DoF of positions, or more than 3-DoF of positions.

Figure 11:
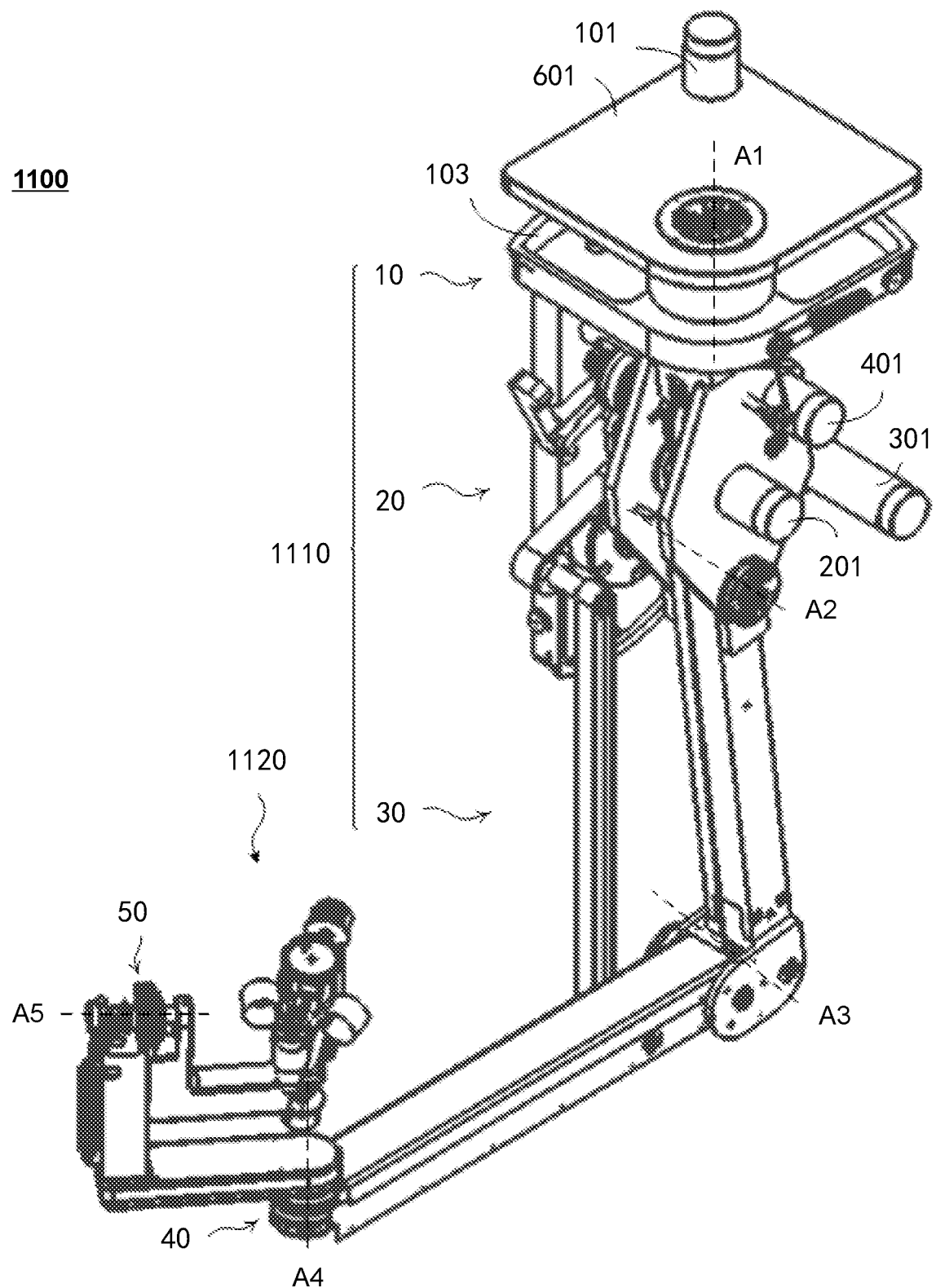
FIGS. 11-16 are schematic diagrams illustrating another exemplary master manipulator according to some embodiments of the present disclosure.
Figure 12:
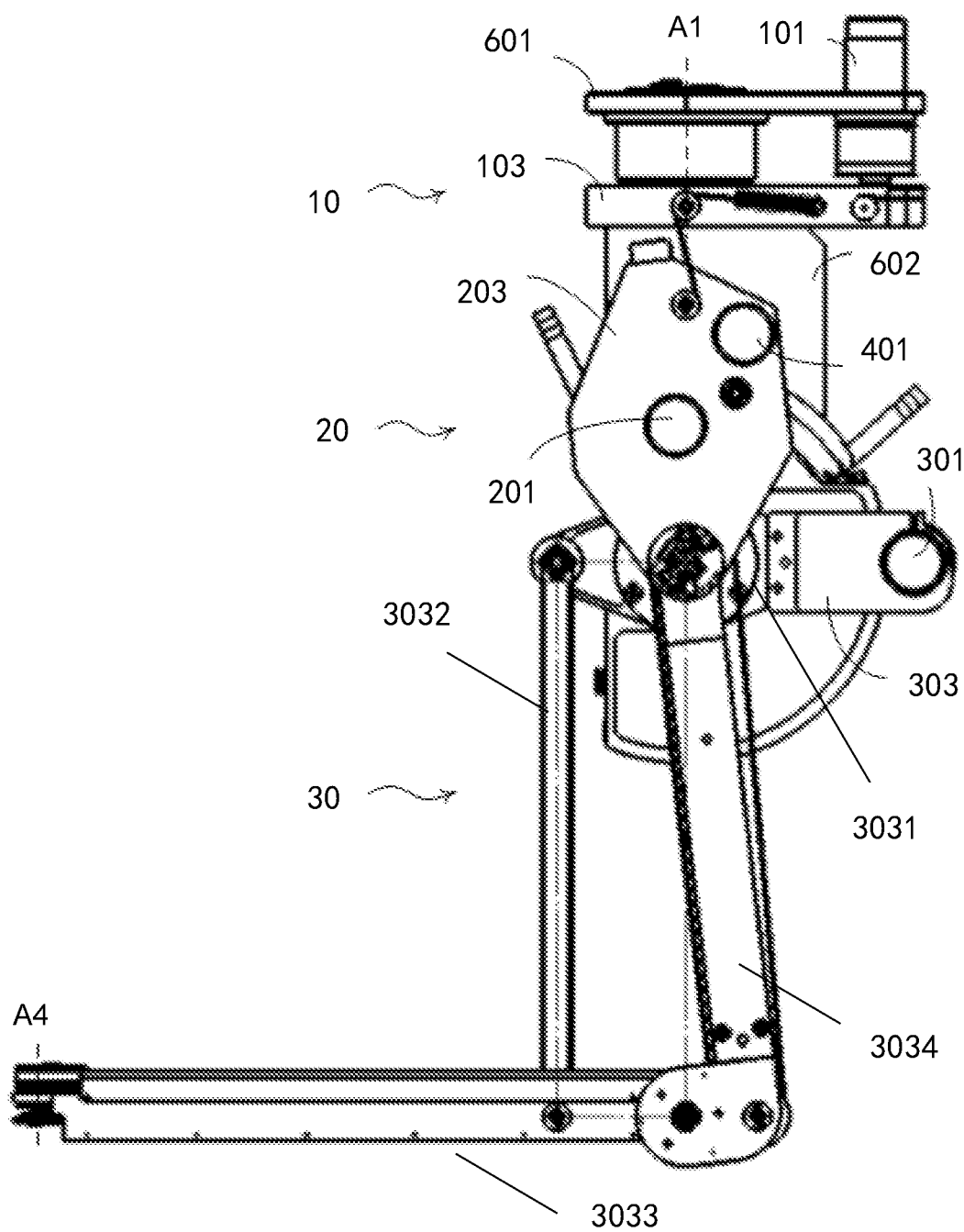
Figure 13:
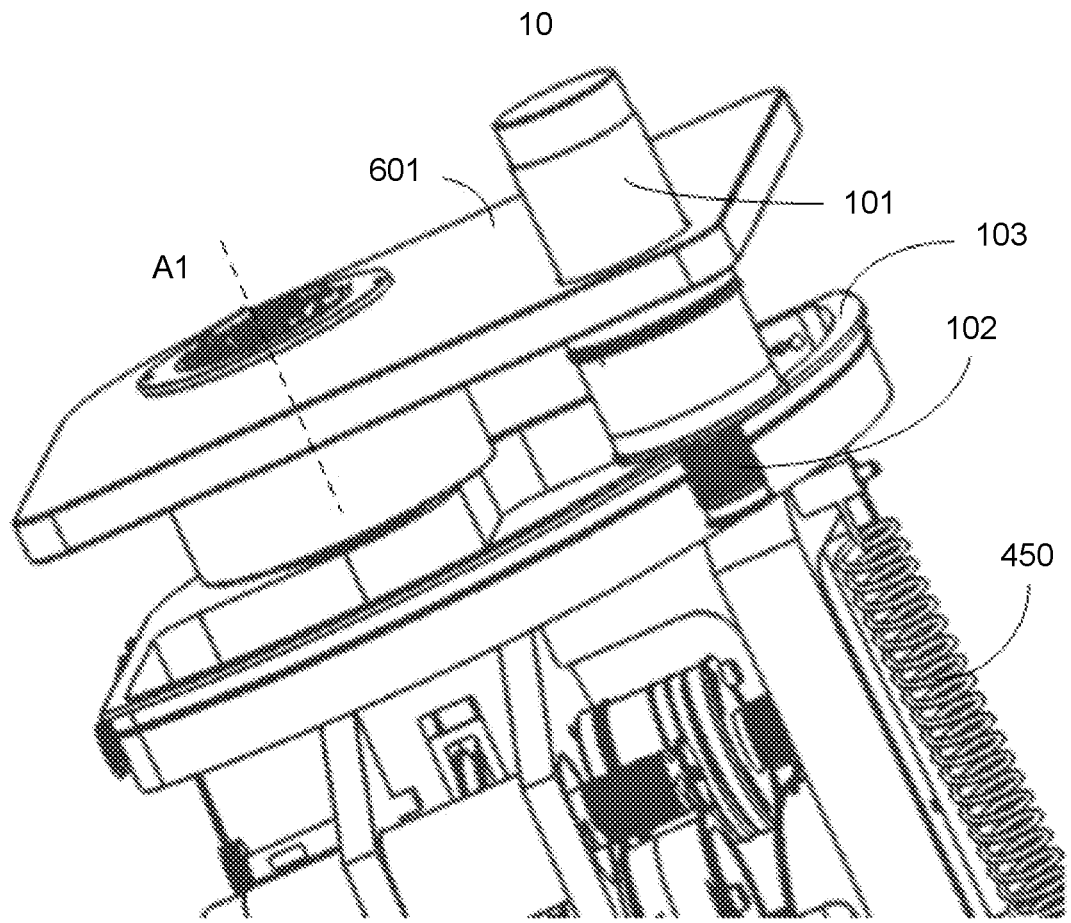
Figure 14:
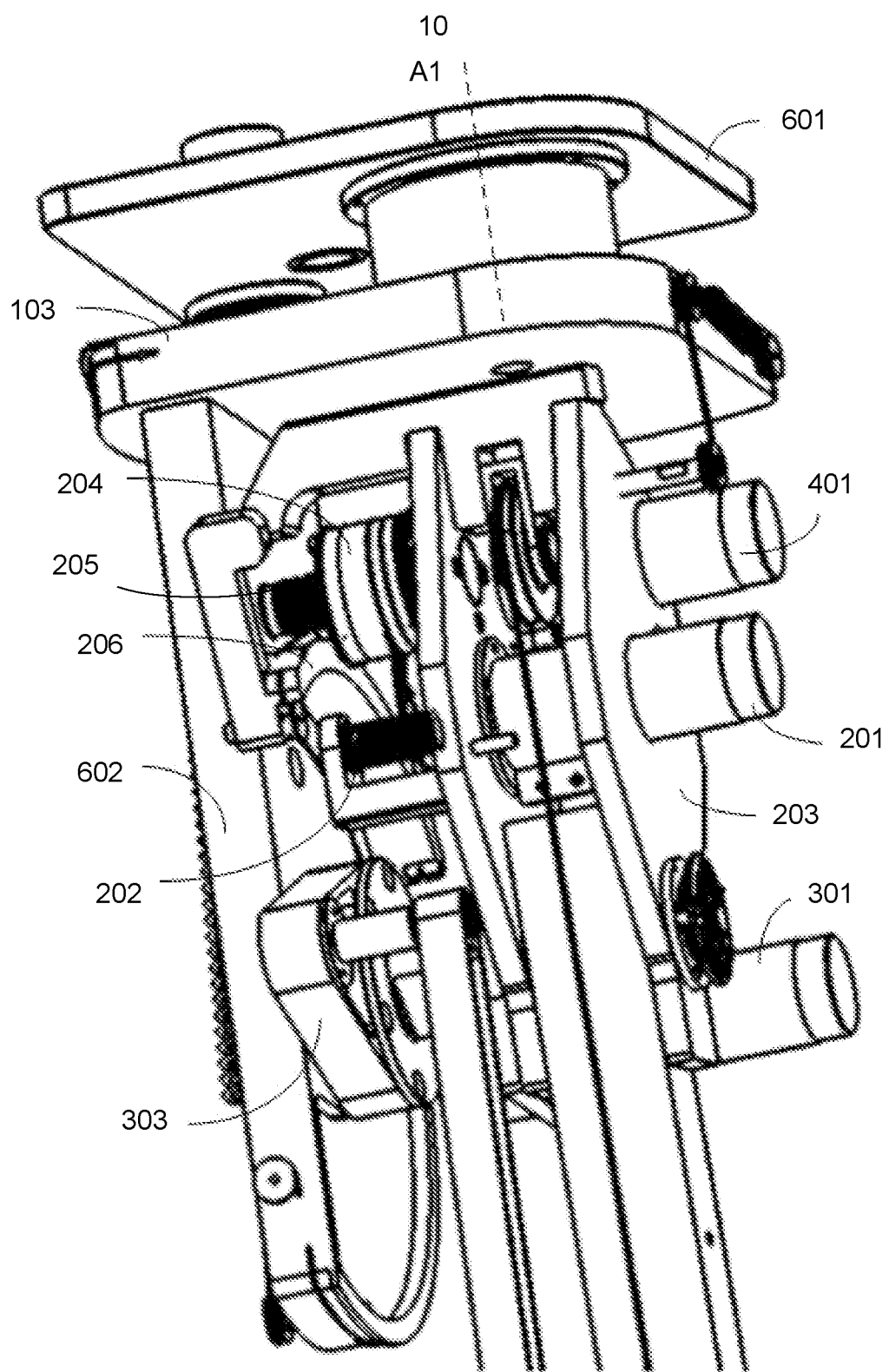
Figure 15:
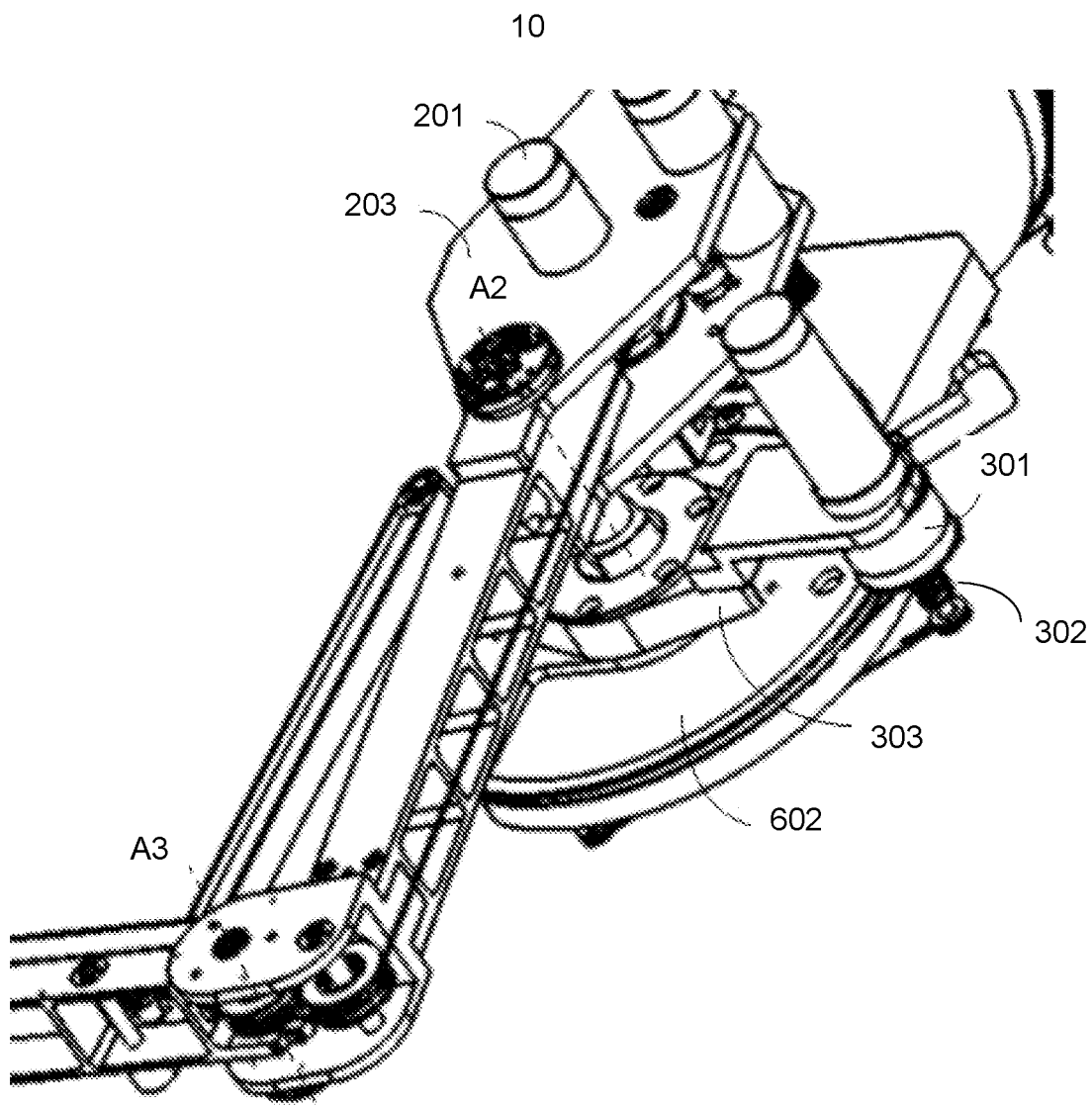

Referring to FIG. 11, the master manipulator 1100 may include a support assembly configured to support or fix other elements of the master manipulator 1100. The support assembly may include a substrate 601 (also referred to as a first substrate 601). The first substrate 601 may be a fixed plate of the entire master manipulator 1100. The first joint mechanism 10 may include a motor 101 (also referred to as a first motor or a first power member), a driving member 102 (also referred to as a first driving member), and a driven member 103 (also referred to as a first driven member). In some embodiments, the driving member 102 may include a winding wheel, a gear, or the like. The driven member 103 may include a winding wheel, a gear, a plate structure, or the like. The first joint mechanism 10 may be similar or same as the first joint mechanism 311 in FIGS. 3-7. More descriptions regarding the first joint mechanism may be found in the detailed descriptions of FIGS. 3-7.

In some embodiments, the driven member 103 of the first joint mechanism 10 may be rotatably installed on the substrate 601, and may rotate around or along with the first rotation axis. The motor 101 of the first joint mechanism 10 may be fixed on the substrate 601 through a sleeve. The driving member 102 and an output shaft (also referred to as a motor shaft) of the motor 101 may be relatively fixed. Spiral winding grooves (usually arc-shaped or V-shaped winding grooves) may be arranged on the driving member 102 (e.g., the winding wheel). A transmission rope (e.g., a steel wire rope) may be wound on the driving member 102 through the winding grooves. Two ends of the transmission rope may be fixed to the driven member 103 of the first joint mechanism 10. The first joint mechanism 10 may rotate and drive the driving member 102 to rotate, so that the transmission rope may be wound on the spiral winding grooves to pull the driven member 103 to rotate around or along with the first rotation axis relative to the substrate 601.

Further, as shown in FIGS. 11-16, the support assembly may further include a second substrate 602. The second substrate 602 may be arranged on the driven member 103. The second base plate 602 may rotate around or along with the first rotation axis along with the driven member 103.

In some embodiments, the second joint mechanism 20 may include a motor 201 (also referred to as a second motor), a driving member 202 (also referred to as a second driving member), and a driven member 203 (also referred to as a second driven member). In some embodiments, the motor 201 may make the driving member 202 rotate. The driving member 202 may drive the driven member 203 to rotate around or along with the second rotation axis. In some embodiments, driving member 202 may include a winding wheel, a gear, or the like. The driven member 203 may include a sliding wheel, a gear, a plate structure, a rod structure, or the like. The second joint mechanism 20 may be similar or same as the second joint mechanism 312 in FIGS. 3-7. More descriptions regarding the second joint mechanism may be found in the detailed descriptions of FIGS. 3-7.

In some embodiments, the motor 201 of the second joint mechanism 20 may be fixed on the driven member 203. The driving member 202 of the second joint mechanism 20 may be fixed on an output shaft of the second motor 201 and rotate along with the output shaft (i.e., a motor shaft) of the second motor 201. The driving member 202 may drive the driven member 203 to rotate together through a transmission mode. For example, spiral winding grooves (usually arc-shaped or V-shaped winding grooves) may be arranged on the driving member 202 (e.g., a winding wheel). A transmission rope (e.g., a steel wire rope) may be wound on the driving member 202 through the winding grooves. Two ends of the transmission rope may be fixed to the driven member 203 of the second joint mechanism 20. The second joint mechanism 20 may rotate and drive the driving member 202 to rotate, so that the transmission rope may be wound on the spiral winding grooves to pull the driven member 203 to rotate around or along with the second rotation axis relative to the second substrate 602. By arranging the motor 201 on the driven member 203, a gravity torque of the motor 201 relative to the second rotation axis may balance at least a part of a gravity torque of the wrist assembly 1120 relative to the second rotation axis.

In some implementations, the transmission mode between the driving member 202 and the driven member 201 may be secondary transmission. The second joint mechanism 20 may further include a large winding wheel 204 and a small winding wheel 205. The large winding wheel 204 and the driving member 202 of the second joint mechanism 20 may perform transmission through a rope, i.e., primary transmission of the second joint mechanism 20. A slave driven member 206 (e.g., a slave winding wheel) may be fixed on the second substrate 602, and a shape of the slave driven member 206 may be a part of an outer circular surface. The small winding wheel 205 and the slave driving member 206 (e.g., the slave winding wheel) may perform transmission through a rope, i.e., secondary transmission of the second joint mechanism 20. Two-stage transmission may be to obtain a greater joint output torque.

The third joint mechanism 30 may include a motor 301 (also referred to as a third motor), a driving member 302 (also referred to as a third driving member), and a driven member 303 (also referred to as a third driven member). In some embodiments, the motor 301 may make the driving member 302 rotate. The driving member 302 may drive the driven member 303 to rotate around or along with the second rotation axis. In some embodiments, the driving member 302 may include a winding wheel, a gear, or the like. The driven member 303 may include a sliding wheel, a gear, a plate structure, a rod structure, or the like. The third joint mechanism 30 may be similar or same as the third joint mechanism 313 in FIGS. 3-7. More descriptions regarding the third joint mechanism may be found in the detailed descriptions of FIGS. 3-7.

In some embodiments, the motor 301 of the third joint mechanism 30 may be arranged on the driven member 303, and the driving member 302 of the third joint mechanism 30 may be fixed on an output shaft of the third driving motor 301. An end of the second substrate 602 away from the driven member 103 may be provided with an arc-shaped outer circular surface. The driving member 302 and the arc-shaped outer circular surface of the second substrate 602 may perform transmission through a rope to transmit an output torque of the motor 301 to the driven member 303. In some embodiments, the driven member 303 may be a parallelogram connection rod structure (also referred to as a parallelogram connection rod mechanism) capable of rotating around or along with the third rotation axis. Referring to a quadrilateral connection rod mechanism (approximately parallelogram connection rod mechanism) shown by a dotted line in FIG. 12, the driven member 103 may include a first connection rod 3031, a second connection rod 3032, a third connection rod 3033, and a fourth connection rod 3034. The first connection rod 3031 may be movably connected with the driven member 203. The third connection rod 3033 may be connected with the wrist assembly 1120. The first connection rod 3031 may be approximately parallel to the third connection rod 3033. The second connection rod 3032 may be approximately parallel to the fourth connection rod 3034. The first connection rod 3031 may include an extension end relative to the parallelogram connection rod mechanism. The extension end of the first connection rod 3031 may be provided with a motor 301. The third rotation axis may be arranged at the extension end. The third connection rod 3033 may include an extension end relative to the parallelogram connection rod mechanism. The wrist assembly 1120 may be arranged on the extension end of the third connection rod 3033. By disposing the motor 301 on the driven member 303, a gravity torque of the motor 301 relative to the third rotation axis may balance at least a part of a gravity torque of the wrist assembly 1120 relative to the third rotation axis.

In some embodiments, as shown in FIGS. 11-16, the wrist assembly 1120 may further include a fourth joint mechanism 40. The fourth joint mechanism 40 may include a motor 401 (also referred to as a fourth motor), a driving member (also referred to as a fourth driving member), and a driven member. In some embodiments, the motor 401 may make the driving member rotate. The driving member may drive the driven member to drive other joint mechanisms connected with the fourth joint mechanism 40 of the wrist assembly 1120 to rotate around or along with the fourth rotation axis (a dotted line A4 in the figure shows an axis where the fourth joint mechanism is located) in a transmission mode. In some embodiments, the driving member may include a winding wheel, a gear, or the like. The driven member may include a winding wheel, a gear, or the like. In some embodiments, the fourth joint mechanism 40 may be similar or the same as the fourth joint mechanism 314 in FIGS. 3-7. More descriptions regarding the fourth joint mechanism may be found in the detailed description of FIGS. 3-7.

Figure 16:
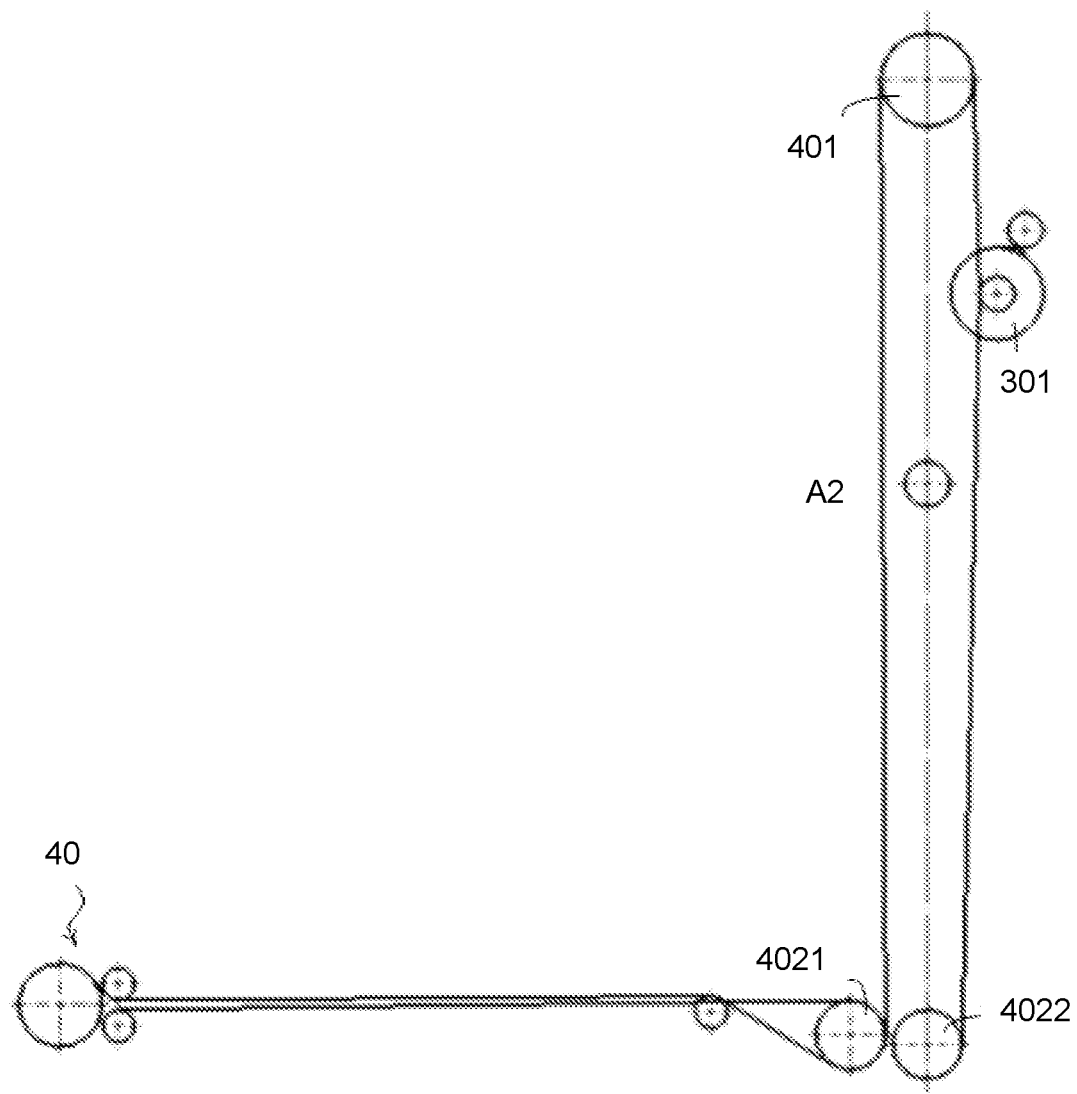

As shown in FIG. 16, the fourth driven member may include a plurality of winding wheels, e.g., a winding wheel 4021, a winding wheel 4022, and/or a driven wheel arranged at the fourth rotation axis. The motor 401 of the fourth joint mechanism 40 may be fixed on the driven member 203, and mechanical energy provided by the motor 401 may be transmitted to the fourth rotation axis of the fourth joint mechanism 40 through a rope. The rope may bypass the winding wheel 4021 and the winding wheel 4022, respectively. In some embodiments, the fourth driving member may further include a driving member (e.g., a winding wheel) arranged on an output shaft of the motor 401. The rope may be connected with the winding wheel arranged on the output shaft of the motor 401, the winding wheel 4021, the winding wheel 4022, and the driven wheel arranged at the fourth rotation axis, so as to transmit the torque from the motor 401 to the fourth rotation axis of the fourth joint mechanism 40. By disposing the motor 401 on the driven member 203, a gravity torque of the motor 401 relative to the fourth rotation axis may balance at least a part of a gravity torque of the wrist assembly 1120 relative to the fourth rotation axis.

In some embodiments, as shown in FIGS. 11-16, a weight of the wrist assembly 1120 may be balanced by using the motor, i.e., a gravity torque of the wrist assembly 1120 relative to a certain rotation axis may be balanced by a gravity torque of the motor relative to the rotation axis. For example, the motor and the wrist assembly 1120 may be arranged on two sides of a certain rotation axis, so that an angle between the gravity torque of the motor to the certain rotation axis and a direction of the gravity torque of the wrist assembly 1120 to the rotation axis may be greater than 90 degrees (e.g., 100 degrees, 150 degrees, and 180 degrees), and then the gravity torque of the motor to the rotation axis may offset (i.e., balance) at least a part of the gravity torque of the wrist assembly 1120 to the rotation axis. As described herein, the motor and the wrist assembly being located on two sides of the rotation axis means that the motor may be located in a first region of a rotation range corresponding to the rotation axis, and the wrist assembly may be located in a second region of the rotation range corresponding to the rotation axis. A boundary line between the first region and the second region may have an intersection point with the rotation axis.

In some embodiments, for the second rotation axis, the wrist assembly 1120 may be arranged below the second rotation axis, the second motor 201 and the fourth motor 401 may be arranged above the second rotation axis, and the second motor 201 and the fourth motor 401 are arranged on the second rotating shaft. The direction of the gravity torque of the second motor 201 to the second rotation axis and the direction of the gravity torque of the fourth motor 401 to the second rotation axis may be opposite to a direction of the gravity torque of the wrist assembly 200 to the second rotation axis. The gravity torque of the second motor 201 to the second rotation axis and the gravity torque of the fourth motor 401 to the second rotation axis may offset (i.e., balance a part of gravity torque of the wrist assembly 1120) the gravity torque of the wrist assembly 200 to the second rotation axis. In some embodiments, for the third rotation axis, the third motor 301 may be arranged on a right side of the third rotation axis and the wrist assembly 1120 may be arranged on a left side of the third rotation axis through a parallelogram connection rod, so that a part of the gravity torque of the wrist assembly 1120 to the third rotation axis may also be balanced.

In some embodiments, the gravity torque of the wrist assembly 1120 may be balanced by using a balance assembly. The balance assembly may include an elastic member (e.g., an elastic cord, a spring, etc.). One end of the elastic member may be connected with a joint mechanism of the wrist assembly (also referred to as a wrist joint mechanism), or a joint mechanism of the arm assembly (also referred to as an arm joint mechanism) (e.g., the driven member or the rotation axis). An angle between a torque (i.e., a pulling torque) formed by the elastic member to the rotation axis of the arm joint mechanism or the wrist joint mechanism and a gravity torque formed by the gravity of the wrist assembly and/or the arm assembly to the rotation axis may be greater than 90 degrees (e.g., 120 degrees, 150 degrees, or 180 degrees).

Figure 17:
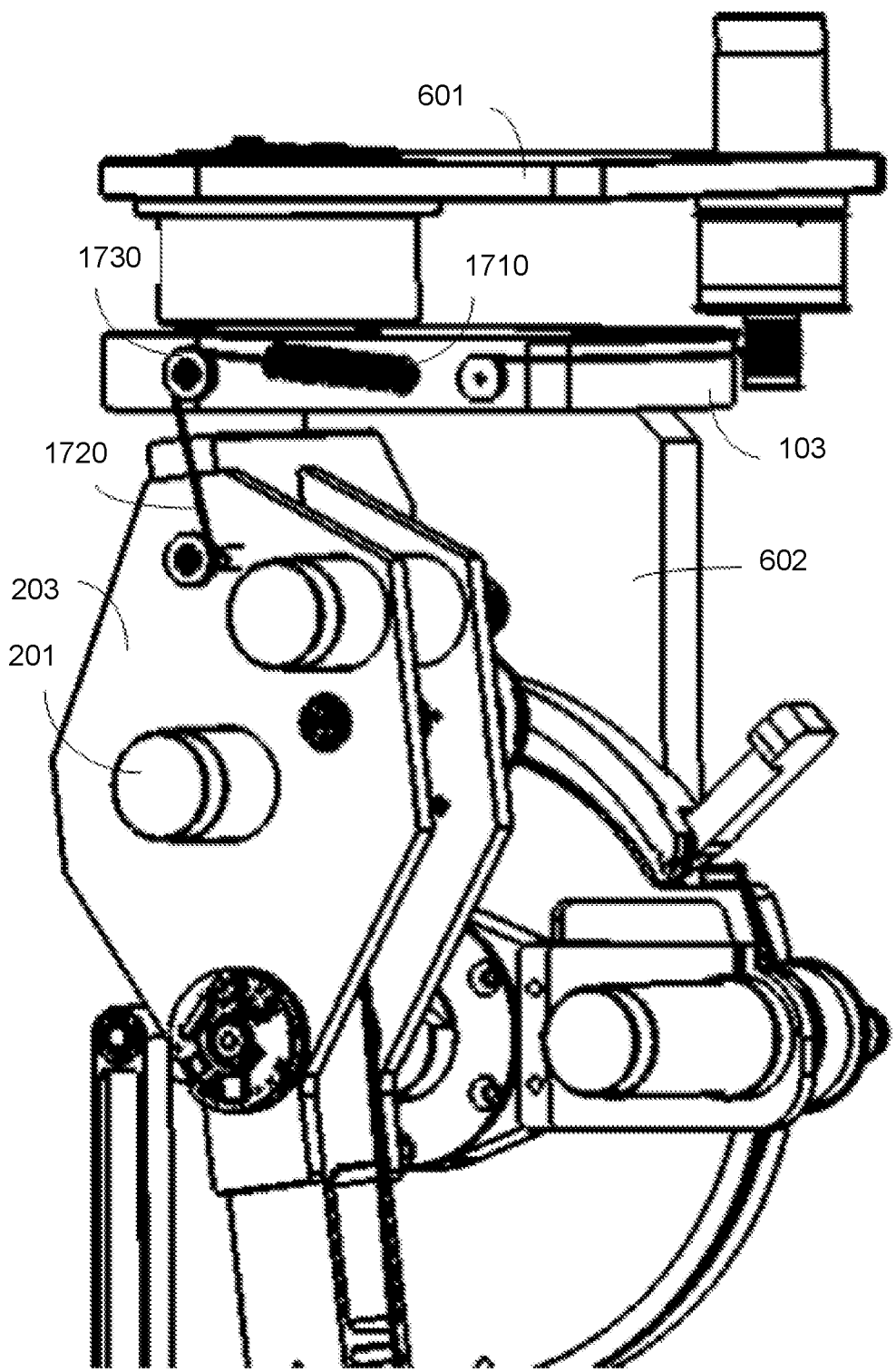
FIGS. 17-18 are schematic diagrams illustrating an exemplary balance assembly of an arm assembly of a master manipulator in FIGS. 11-16 according to some embodiments of the present disclosure.
Figure 18:
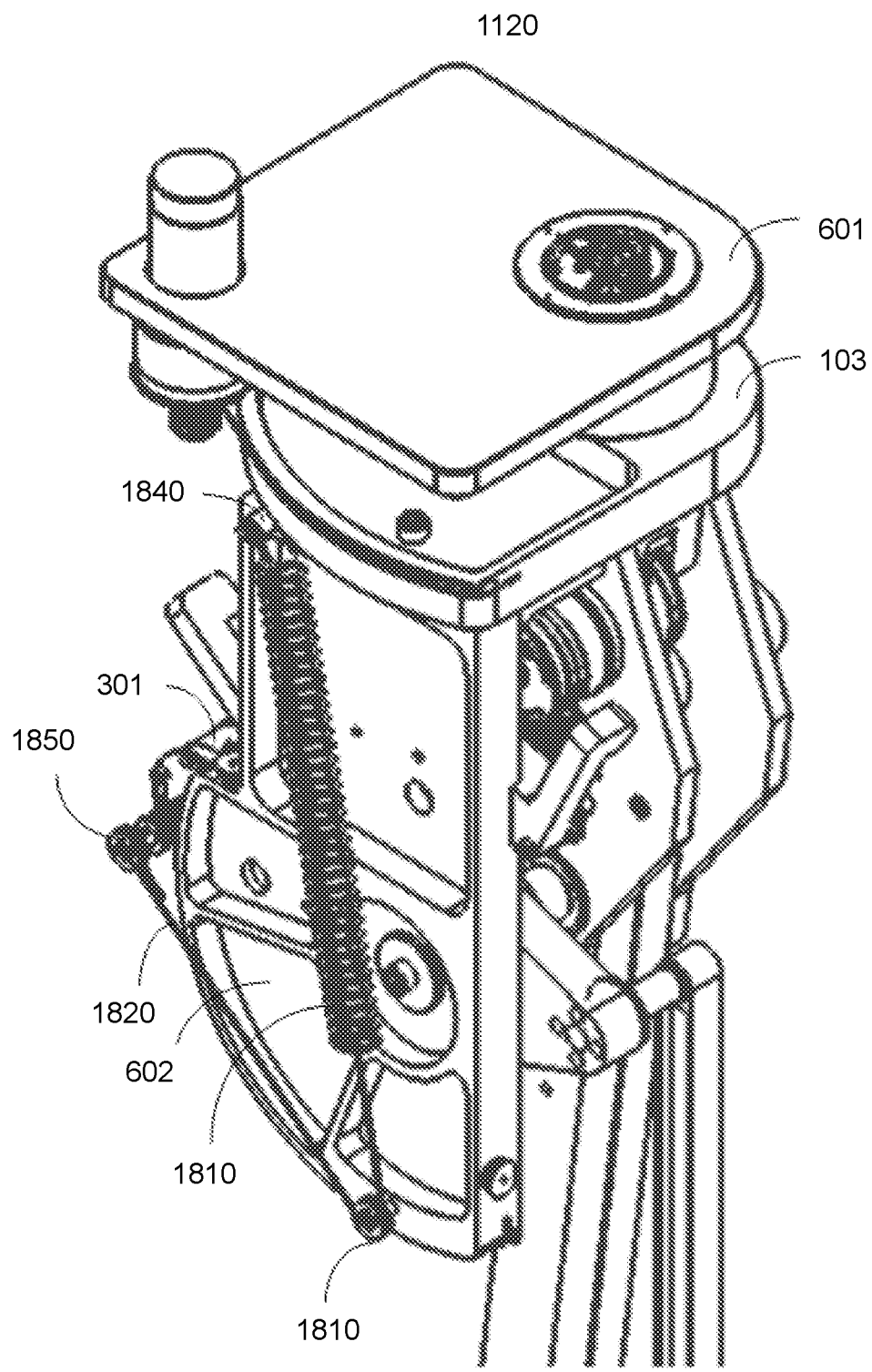

For example, FIGS. 17-18 are schematic diagrams illustrating an exemplary balance assembly of the arm assembly of the master manipulator shown in FIGS. 11-16 according to some embodiments of the present disclosure.

As shown in FIG. 17, for the second rotation axis, the balance assembly (also referred to as a first balance assembly) may be provided to balance a gravity torque of the wrist assembly 1120 to the second rotation axis. The first balance assembly may include an elastic member 1710 (also referred to as a first elastic member), a rope 1720 (also referred to as a first rope), and a reversing wheel 1730 (also referred to as a first reversing wheel). For example, one end of the elastic member 1710 may be fixed on the driven member 103 of the first joint mechanism 10, and another end of the elastic member 1710 may be fixedly connected with a rope 1720 (e.g., a steel wire rope). The rope 1720 may bypass the reversing wheel 1730 to be fixed on the driven member 203 (i.e., the driven member 203) of the second joint mechanism 20, so that an angle may be formed between the rope 1720 and an axial direction of the elastic member 1710. The driven member 203 may rotate around the second rotation axis. A pulling force of the elastic member 1710 may act on the driven member 203. A pulling torque formed by the elastic member 1710 to the second rotation axis may be approximately opposite to a direction of a gravity torque formed by the gravity of the wrist assembly 1120 to the second rotation axis, so as to balance the gravity torque of the wrist assembly 1120. It should be noted that, in some embodiments, the first balance assembly may only include the elastic member 1710. One end of the elastic member 1710 may be fixed on the driven member 103 of the first joint mechanism 10, and another end of the elastic member 1710 may be directly fixed on the driven member 203 of the second joint mechanism.

As shown in FIG. 18, for the third rotation axis, a balance assembly (also referred to as a second balance assembly) may be provided to balance a gravity torque of the wrist assembly 1120 to the third rotation axis. The second balance assembly may include an elastic member 1810 (also referred to as a second elastic member), a rope 1820 (also referred to as a second rope), and a reversing wheel 1830 (also referred to as a second reversing wheel). For example, the second substrate 602 may include a hook 1840, and the output shaft of the third motor 301 (i.e., the extension end of the first connection rod 3031) may further include a stay rod 1850. One end of the elastic member 1810 may be fixed on the hook 1840, and another end of the elastic member 1810 may be fixed on the stay rod 1850 through a rope 430 (e.g., a steel wire rope). The rope 430 may bypass the steering wheel 440 to change a direction, so that the rope 40 may form an angle with an axial direction of the elastic member 1810, and the pulling force of the elastic member 1810 may act on the motor 301. Accordingly, the pulling force of the elastic member 1810 and the gravity of the wrist assembly 1120 may generate a movement tendency in an opposite or approximately opposite direction relative to the third rotation axis, so a part of the gravity torque of the wrist assembly 1120 may be balanced by the pulling force of the first elastic member 1810. It should be noted that, in some embodiments, the second balance assembly may only include the elastic member 1810. One end of the elastic member 1810 may be fixed on the hook 1840, and another end of the elastic member 1810 may be fixed on the stay rod 1850.

Figure 19:
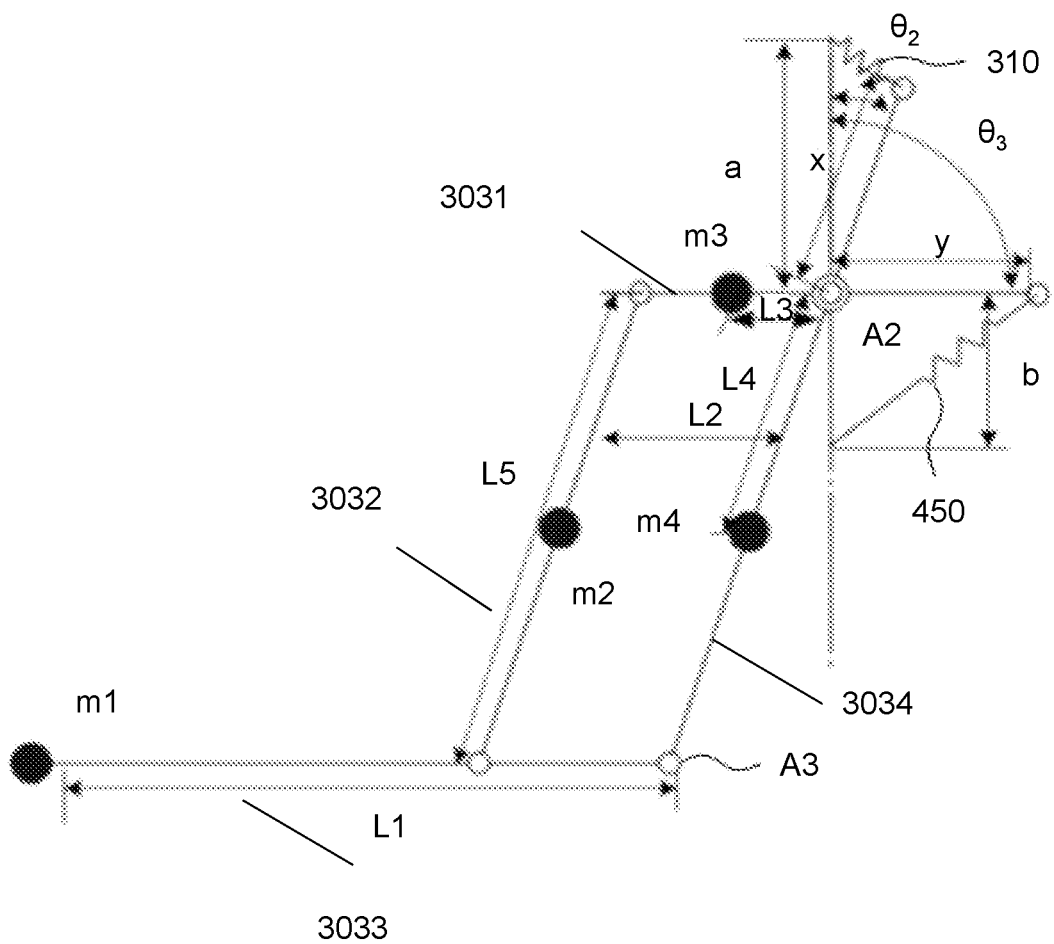
FIG. 19 is a schematic diagram illustrating principles of balance assemblies in FIGS. 17-18 according to some embodiments of the present disclosure.

Installation positions and stiffness coefficients of the first elastic member 1710 and the second elastic member 1810 may be determined by the following process. For example, FIG. 19 is a schematic diagram illustrating a principle of the balance assembly shown in FIGS. 17-18 according to some embodiments of the present disclosure. As shown in FIG. 19, the stiffness coefficient of the first elastic member 1710 is K1, a distance between the second reversing wheel 1730 and the second rotation axis is a, one end of the elastic member 1710 may rotate with the driven member 103 of the first joint mechanism 10, and a distance from one end of the elastic member 1710 to the second rotation axis is x. The stiffness coefficient of the second elastic member 1810 is K2, a distance between the driving member 302 of the third joint mechanism 30 and the second rotation axis is b, one end of the second elastic member 1810 may rotate with the connection rod 3031, and a distance from one end of the second elastic member 1810 to the second rotation axis is y. An angle between the fourth connection rod 3034 and a vertical direction is θ2. An angle between the first connection rod 3031 and the vertical direction is θ3. A center of gravity of the wrist assembly 1120 at a zero position is defined as a position of m1, and centers of gravity of other connection rods (i.e., the second connection rod 3032, the first connection rod 3031, and the fourth connection rod 3034) are defined at positions of m2, m3, and m4 respectively. $L_1$ refers to a distance from the center of gravity m1 to the third rotation axis. L2 refers to a distance between the second connection rod 3032 and the fourth connection rod 3034 (it may also be understood as a distance from the center of gravity m2 to the second rotation axis). L3 refers to a distance from the center of gravity m3 to the second rotation axis. L4 refers to a distance from the center of gravity m4 to the second rotation axis. $L_5$ refers to a length of the second rotation axis 3032, i.e., a distance between the second rotation axis and the third rotation axis (it may also be understood as a distance from the center of gravity m3 to the third rotation axis).

Accordingly, the potential energy of the entire master manipulator 1100 may be represented by the following formula:

$$E = m_3 g l_3 \cos\theta_3 + m_4 g l_4 \cos\theta_2 + m_2 g(l_2 \cos\theta_3 + l_4 \cos\theta_2) + m_1 g(l_1 \cos\theta_3 + l_5 \cos\theta_2) + \tfrac{1}{2} K_1(a^2 + x^2 - 2ax \cos\theta_3) + \tfrac{1}{2} K_2(b^2 + y^2 - 2by \cos\theta_2)$$

If balance is to be ensured, i.e., the potential energy of the entire master manipulator 10 maintains constant, i.e., the potential energy is not affected by θ2 and θ3, a relationship between the stiffness coefficients k1 and k2 and the installation positions x and y of the first elastic member 1710 and the second elastic member 1810 may be represented by the following formula:

$$K_1 = \frac{m_3 g l_3 + m_2 g l_2 + m_1 g l_1}{ax}$$

$$K_2 = \frac{m_4 g l_4 + m_2 g l_4 + m_1 g l_5}{by}$$

The stiffness coefficients and positions of the elastic members may be set by the relationship between the stiffness coefficients k1 and k2 and the installation positions x and y of the first elastic member 1710 and the second elastic member 1810, thereby ensuring the balance of the entire master manipulator 1100. It should be noted that the first balance assembly and the second balance assembly may also be installed on the second joint mechanism 312 and the third joint mechanism 313 of the master manipulator 300 to balance the gravity. Specific structures of the balance assemblies installed on the second joint mechanism 312 and the third joint mechanism 313 of the master manipulator 300 may be approximately similar to or the same as structures of the first balance assembly and the second balance assembly installed on the master manipulator 1100, which are not repeated here.

Figure 20:
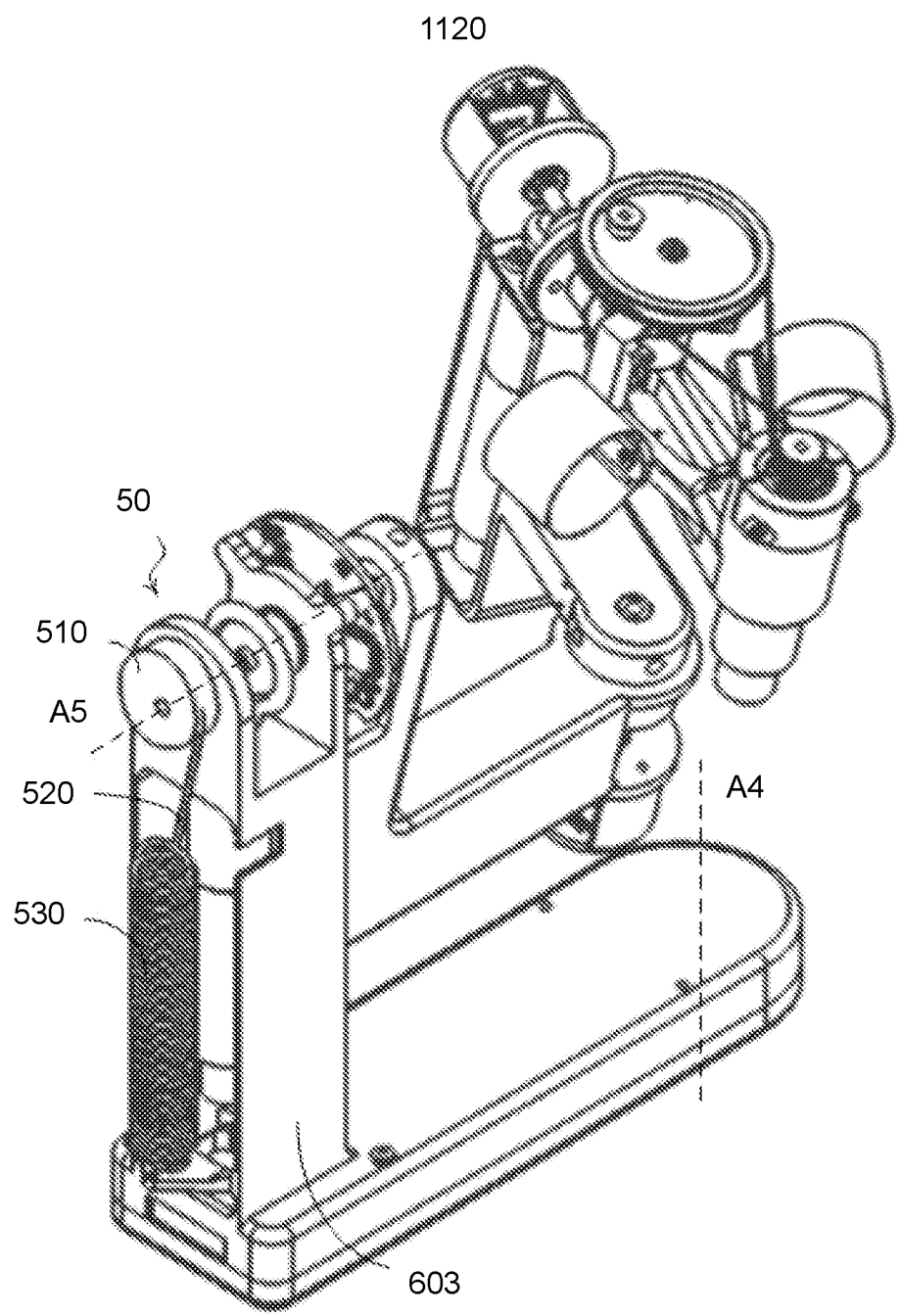
FIGS. 20-21 are schematic diagrams illustrating another exemplary structure of balance assemblies of a wrist assembly of a master manipulator in FIGS. 11-16 according to some embodiments of the present disclosure.
Figure 21:
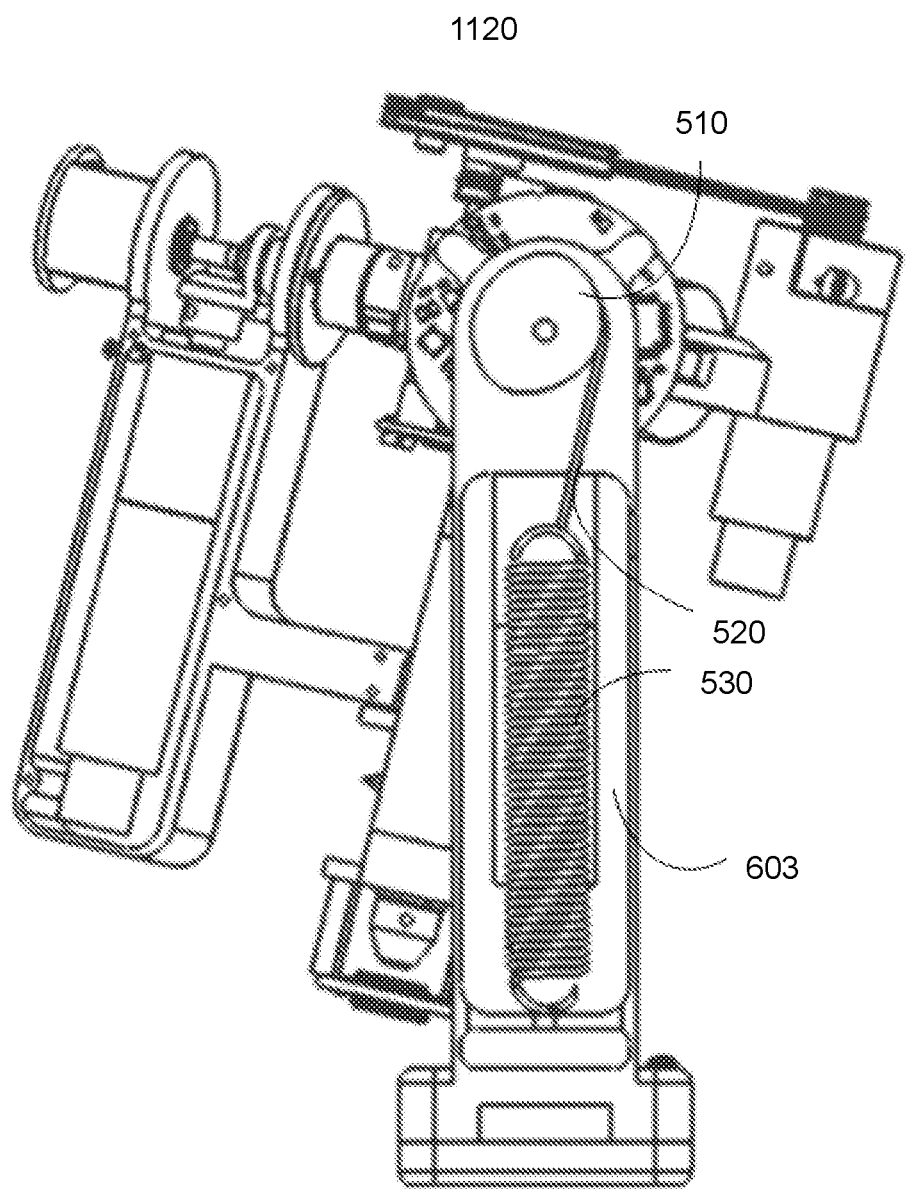

In some embodiments, the gravity of the wrist assembly 1120 may be balanced by using the balance assembly. FIGS. 20-21 are schematic diagrams illustrating exemplary balance assemblies installed on the wrist assembly of the master manipulator shown in FIGS. 11-16 according to some embodiments of the present disclosure. Specifically, as shown in FIGS. 20-21, the wrist assembly 1120 may include a wrist joint mechanism. The wrist joint mechanism may include a wrist rotation axis (i.e., the fifth rotation axis). An axial direction of the wrist rotation axis may be perpendicular to the gravity direction of the wrist assembly 1120. The balance assembly may include a wrist balance assembly (also referred to as a third balance component). The wrist balance assembly may be arranged on the wrist joint mechanism. The wrist balance assembly may include a rope 520 (also referred to as a third rope) and an elastic member 530 (also referred to as a third elastic member). A driven member 510 may be installed at the fifth rotation axis to maintain synchronous rotation with the fifth rotation axis. One end of the elastic member 530 may be connected with the rope 520, and another end of the elastic member 530 may be connected with a support base 603 (also referred to as a third substrate or base) of the wrist joint mechanism. The other end of the rope 520 may be connected with the driven member 510 of the wrist joint mechanism. A balance torque of an elastic force of a wrist balance spring to a wrist rotation axis may at least partially balance a gravity torque of the wrist assembly 1120 to the wrist rotation axis. Optionally, the driven member 510 may be a rotation wheel, e.g., a round wheel or a cam. It should be noted that the third balance assembly may only include the elastic member 530. One end of the elastic member may be directly connected with the fifth rotation axis, and the other end of the elastic member may be fixedly connected with the support base 603. In addition, the third balance assembly may also be installed on the wrist assembly 320 of the master manipulator 300 to balance the gravity. A specific structure of the balance assembly of the wrist assembly 320 of the master manipulator 300 may be approximately similar or the same as a structure of the third balance assembly installed on the master manipulator 1100, which is not repeated here.

Figure 22:
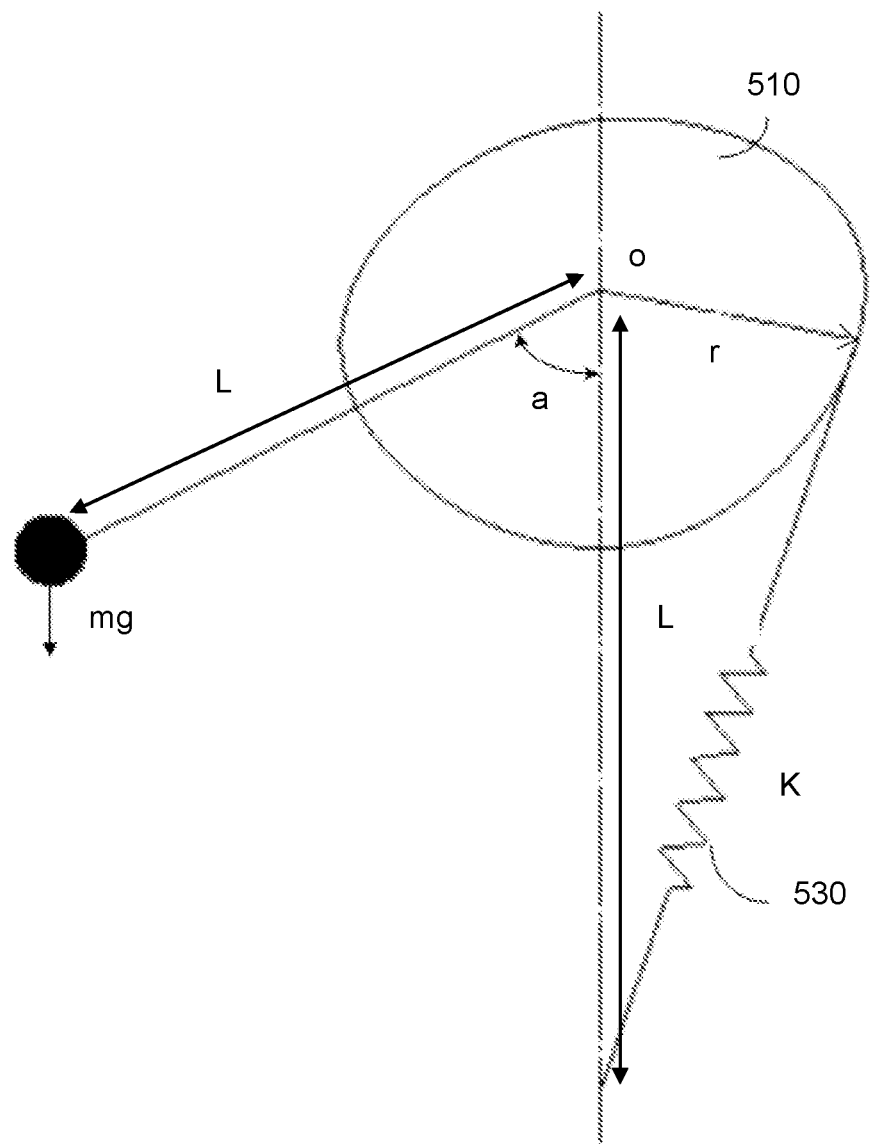
FIG. 22 is a schematic diagram illustrating principles of balance assemblies in FIGS. 20-21 according to some embodiments of the present disclosure.

FIG. 22 is a schematic diagram illustrating a principle of the balance assembly shown in FIGS. 20-21 according to some embodiments of the present disclosure. As shown in FIG. 22, in some embodiments, a profile of the driven member 510 and the stiffness coefficient K of the elastic member 530 may be determined in the following manner.

An equivalent weight of a load on the fifth rotation axis is denoted as mg, L denotes a distance from a center of gravity of the load to the fifth rotation axis, and a denotes a deflection angle of the center of gravity of the load (i.e., an angle between a connecting line between the center of gravity of the load and the fifth rotation axis and a vertical line passing through the fifth rotation axis). Then r represents a radius of the elastic member 530 interacting with the driven member 510 through the rope 520 (i.e., a radius of the driven member 510), h represents a distance from a center of circle of the driven member 510 to a fixed point between the elastic member 530 and the support base 603, s represents a free length of the elastic member 530, and F represents the pulling force of the elastic member.

A condition for complete weight compensation may be represented by the following formula:

$$mgL \sin a = Fr.$$

The pulling force of the elastic member 530 may be represented by the following formula:

$$F = K(\sqrt{h^2 = r^2} - s)$$

Thus a relationship between the radius r of the driven member 510 and other parameters may be obtained:

$$mgL \sin a = rK((\sqrt{h^2 = r^2} - s)$$

By properly setting the stiffness coefficient K and the installation position h of the elastic member 530, an effect of complete compensation may be achieved. The effect of complete compensation means that the pulling torque of the pulling force provided by the elastic member 530 to the fifth rotation axis may be equal to the gravity torque of the gravity of the wrist assembly 1120 to the fifth rotation axis, but opposite in direction. In some embodiments, the pulling torque of the pulling force provided by the elastic member 530 to the fifth rotation axis may be smaller than the gravity torque of the wrist assembly 1120 to the fifth rotation axis. For example, the pulling torque may be 90%, 80%, or 50%, etc., of the gravity torque, so as to achieve a partial compensation effect. In some embodiments, an angle between the pulling torque of the pulling force provided by the elastic member 530 to the fifth rotation axis and the gravity torque of the wrist assembly 1120 to the fifth rotation axis may be less than 180 degrees and greater than 90 degrees, thereby achieving the partial compensation effect.

The deflection angle of the center of gravity of the load may change as the load rotating around or along with the fifth rotation axis, so that a value of sin a in the formula may change within a range of 0 to 1. In some embodiments, a shape change of the profile of the driven member 510 may be similar to a sine function by designing the profile of the driven member 510, so that sin a may be approximately equal to the size r of the profile of the driven member 510, and the stiffness coefficient and the size of h of the elastic member 530 may be determined. In some embodiments, the center of gravity of the load at each rotational position may correspond to a certain deflection angle a, and the deflection angle may correspond to a radius r corresponding to an intersection point between each connecting line between the center of gravity of the load and the fifth rotation axis at each position and the profile of the driven member 510, making sin a be equal to the radius r. In some embodiments, the deflection angle a of the center of gravity of the load may be divided into a plurality of ranges, and the radius r of the driven member 510 corresponding to the deflection angle a of the same range may be the same.

Figure 23:
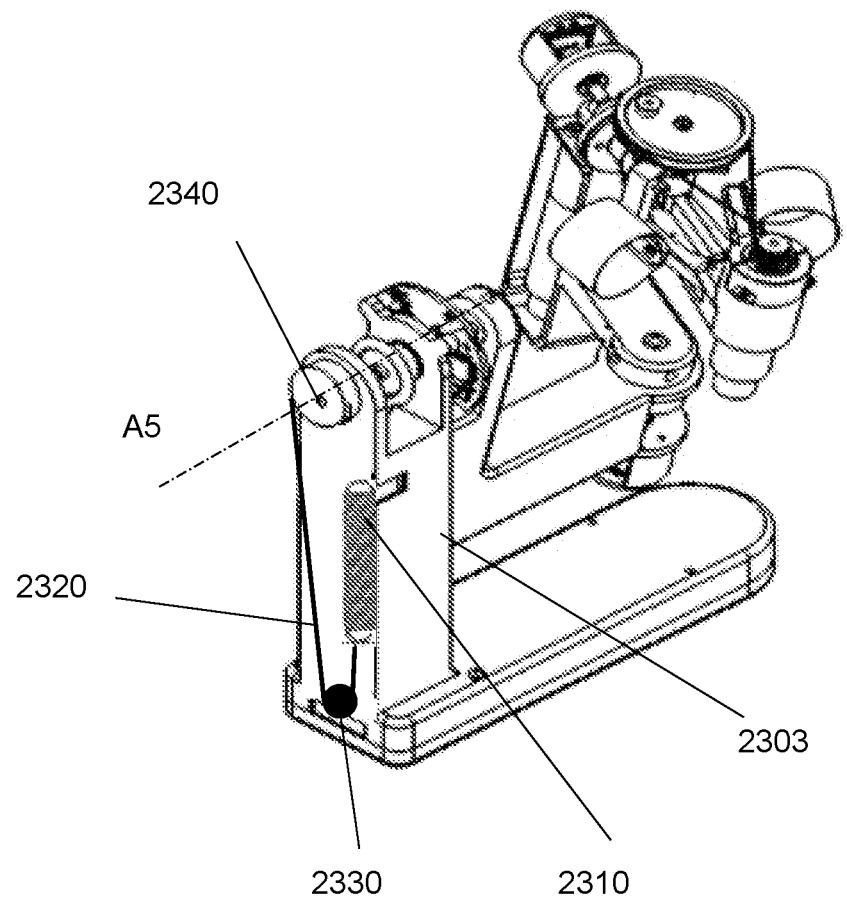
FIG. 23 is structural diagram illustrating another exemplary balance assembly of a wrist assembly of a master manipulator according to some embodiments of the present disclosure.

FIG. 23 is a schematic diagram illustrating an exemplary balance assembly of a wrist assembly of a master manipulator according to some embodiments of the present disclosure. In some embodiments, a zero-free-length elastic member may be used for gravity balancing. The wrist balance assembly may include an elastic member 2310, a rope 2320, and a reversing wheel 2330. One end of the elastic member 2310 may be fixedly installed on a support base 2303 of the support assembly, another end of the elastic member 2310 may be connected with one end of the rope 2320. Another end of the rope 2320 may bypass the reversing wheel 2330 to be connected with a joint mechanism (e.g., the fifth rotation axis or a driven member 2340) of the wrist assembly. A balance torque of the elastic member 2310 to the wrist rotation axis (i.e., the fifth rotation axis) may at least partially balance the gravity torque of the wrist assembly 1120 to the wrist rotation axis. The driven member 2340 may be a rotation wheel, e.g., a round wheel or a cam. More descriptions regarding the joint structure of the wrist assembly and the fifth rotation axis may be found in elsewhere in the present disclosure (e.g., FIGS. 20-21).

Figure 24:
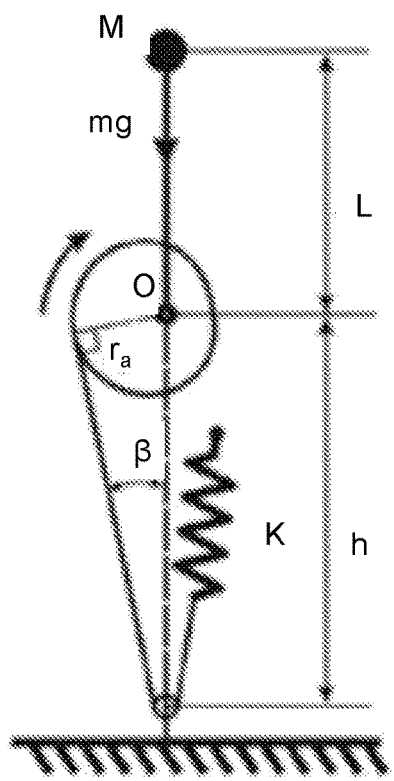
FIGS. 24-25 are schematic diagrams illustrating principles of balance assemblies in FIG. 23 according to some embodiments of the present disclosure.
Figure 25:
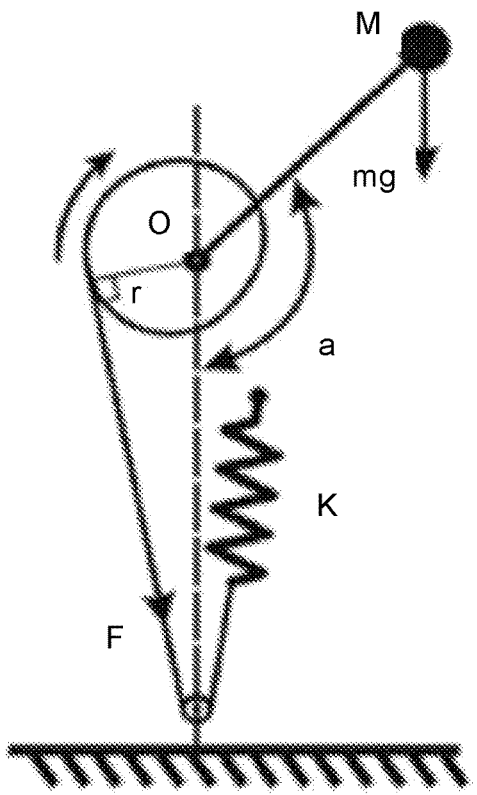

FIGS. 24-25 are schematic diagrams illustrating a principle of the balance assembly shown in FIG. 23 according to some embodiments of the present disclosure. As shown in FIGS. 24-25, the profile (e.g., the radius) of the driven member 2340 and the stiffness coefficient K of the elastic member 2310 may be determined in the following manner using a zero-free-length spring.

An equivalent weight of a load of the fifth rotation axis is denoted as mg, L denotes a distance from a center of gravity of the load to the fifth rotation axis, and a denotes a deflection angle of the center of gravity of the load. Then r represents a radius of action of the elastic member 2310 on the driven member 2340 through the rope 2320, h represents a distance from a center of circle of the driven member 2340 to a fixed point between the elastic member 2310 and the reversing wheel 2330, s represents a free length of the elastic member 2310, and F represents pulling force of the elastic member 2310.

A condition for complete weight compensation may be represented by the following formula:

$$mgL \sin a = Fr.$$

The pulling force of the elastic member 2310 may be represented by the following formula:

$$F = K(\sqrt{h^2 = r^2} - s)$$

Thus a relationship between the radius r of the driven member 2340 and other parameters K may be obtained:

$$mgL \sin a = rK((\sqrt{h^2 = r^2} - s)$$

By properly setting the stiffness coefficient K of the elastic member 2310 and the installation position (h) of the reversing wheel 2330, an effect of complete compensation may be achieved. In some embodiments, the pulling torque of the pulling force provided by the elastic member 2310 to the fifth rotation axis may be smaller than the gravity torque of the wrist assembly to the fifth rotation axis. For example, the pulling torque may be 90%, 80%, or 50%, etc., of the gravity torque, so as to achieve a partial compensation effect. In some embodiments, an angle between the pulling torque of the pulling force provided by the elastic member 2310 to the fifth rotation axis and the gravity torque of the wrist assembly 1120 to the fifth rotation axis may be less than 180 degrees and greater than 90 degrees, thereby achieving the partial compensation effect.

Figure 26:
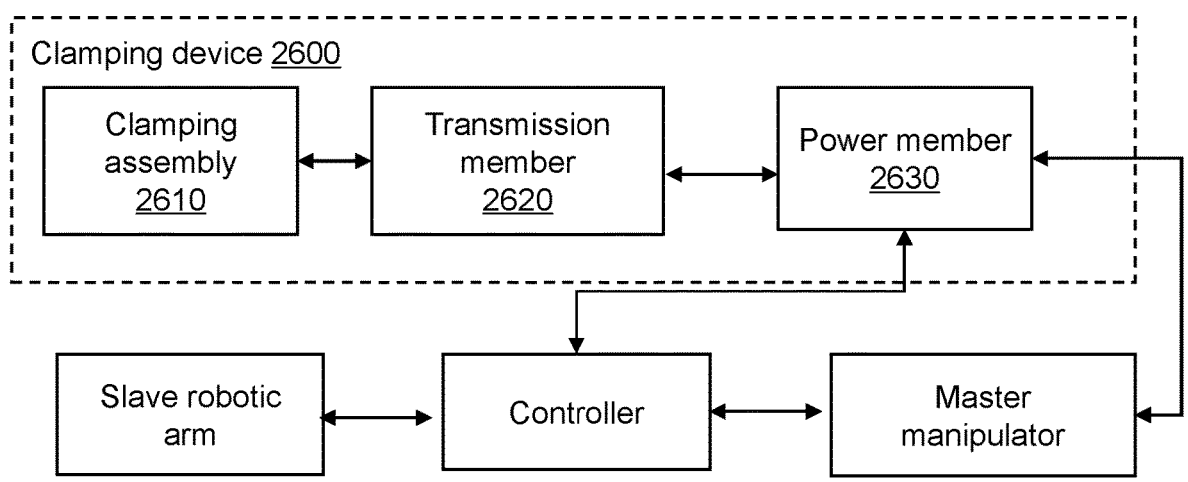
FIG. 26 is a schematic diagram illustrating a workflow of a clamping device of a robot according to some embodiments of the present disclosure.

FIG. 26 is a schematic diagram illustrating a workflow of a clamping device of a robot according to some embodiments of the present disclosure. The robot may include a slave robotic arm, a master manipulator, and a controller. The master manipulator may include an arm assembly, a wrist assembly, and a clamping device 2600 disposed on the wrist assembly. The clamping device 2600 may include a clamping assembly 2610 and a feedback assembly. The feedback assembly may include a transmission member 2620 and a power member 2630. More details regarding the arm assembly, the wrist assembly, and the clamping device 2600 may be found elsewhere in the present disclosure. For example, more descriptions regarding the arm assembly may be found in the detailed descriptions of FIGS. 3-8 or FIGS. 11-25. More descriptions regarding the wrist assembly may be found in the detailed descriptions of FIGS. 9-10. More descriptions regarding the clamping device may be found in the detailed descriptions of FIGS. 27-29.

The clamping assembly 2610 may open and close within a working range. In some embodiments, the feedback assembly may send a control signal to the slave robotic arm and/or feed back a force state of the slave robotic arm through the transmission member 2520 and the power member 2630. The slave robotic arm may be connected with an end effector. The feedback assembly may feed the force state of the end effector back to the clamping assembly 2610, so that an operator may perceive the force state of the end effector. For example, when the clamping assembly 2610 is subjected to an external force (e.g., the force exerted by the operator on the clamping assembly 2610 causes the clamping assembly 2610 to close), the force may be transmitted to the power member 2630 through the transmission member 2620. The power member 2630 may transmit the force (e.g., torque) to a driver of the master manipulator through the wrist assembly and the arm assembly of the master manipulator. The driver (e.g., a motor) of the master manipulator may obtain parameter information of the force and convert the parameter information of the force into an electrical signal and output the electrical signal to the controller. The controller may analyze the corresponding parameter information from the electrical signal and control the slave robotic arm to perform a corresponding operation. In some embodiments, the controller may directly obtain the parameter information of the force from the power member 2630 and control the robotic arm to perform the corresponding operation.

As another example, when the slave robotic arm drives the end effector to perform a certain operation (e.g., suturing), the controller may receive force parameters of the slave robotic arm, and the controller may drive the power member 2630 to rotate according to the received force parameters. In some embodiments, the controller may obtain mechanical parameters such as a clamping force and a lateral torque of the slave robotic arm through a mechanical sensor arranged on the slave robotic arm, and then the controller may control the power member 2630 (e.g., the motor) to perform corresponding rotation. The rotation of the power member 2630 may be transmitted to the clamping assembly 2610 through the transmission member 2620 (e.g., by providing resistance), and then the parameters such as the clamping force of the slave robotic arm may be fed back to the clamping assembly 2610 directly operated by a surgeon. A clamping force signal and a lateral torque signal detected by the slave robotic arm may be processed and transmitted to the controller, and the controller may transmit the analyzed force to the driver of the master manipulator in the form of an instruction or a signal. The driver of the master manipulator may drive the power member 2630 to rotate by a current change.

In some embodiments, the clamping device 2600 may further include other power members and transmission members different from the transmission member 2620 and the power member 2630. The clamping assembly 2610 may transmit the control signal to the slave robotic arm through other power members and transmission members.

Furthermore, a communication connection may be performed between the power member 2630 and the slave robotic arm, which ensures the stable operation of processes such as master-slave control, orientation detection, torque feedback, etc. For example, the power member 2630 may directly transmit the force information of the clamping assembly 2610 to the controller; or the controller may directly return the feedback information to the power member 2630. In some embodiments, the power member 2630 may be in communication connection with the controller. The controller may receive a rotation signal of an encoder of the power member 2630, generate a control instruction after processing the rotation signal, and send the control instruction to the slave robotic arm. The slave robotic arm may perform motion control according to the instruction control.

In some embodiments, the feedback component may generate the feedback information based on the force state of the end effector, and apply resistance to the clamping device 2600 based on the feedback information, so that the operator of the clamping component 2610 may sense the resistance, i.e., the force state of the end effector. The feedback information may include a magnitude, a direction, etc., of the resistance of the end effector. In some embodiments, the end effector may be a scalpel. When the scalpel contacts or squeezes patient's skin, a human tissue may generate a reaction force against the scalpel (i.e., the resistance). In some embodiments, the resistance may be detected by a sensor disposed on the end effector. More descriptions regarding the end clamping device may be found in the detailed descriptions of FIGS. 26-40.

In some embodiments, when the clamping device controls operation of the end effector (e.g., a puncture needle), the end effector may encounter resistance, which may be fed back to the slave robotic arm and/or the master manipulator. The slave robotic arm and/or the master manipulator may control the feedback assembly to apply a resistance comparable to the resistance to the clamping assembly 2610. In this way, when a doctor operates, the doctor may perceive the force state of the end effector through the resistance fed back by the feedback assembly, truly simulating the situation of operating the end effector.

Figure 27:
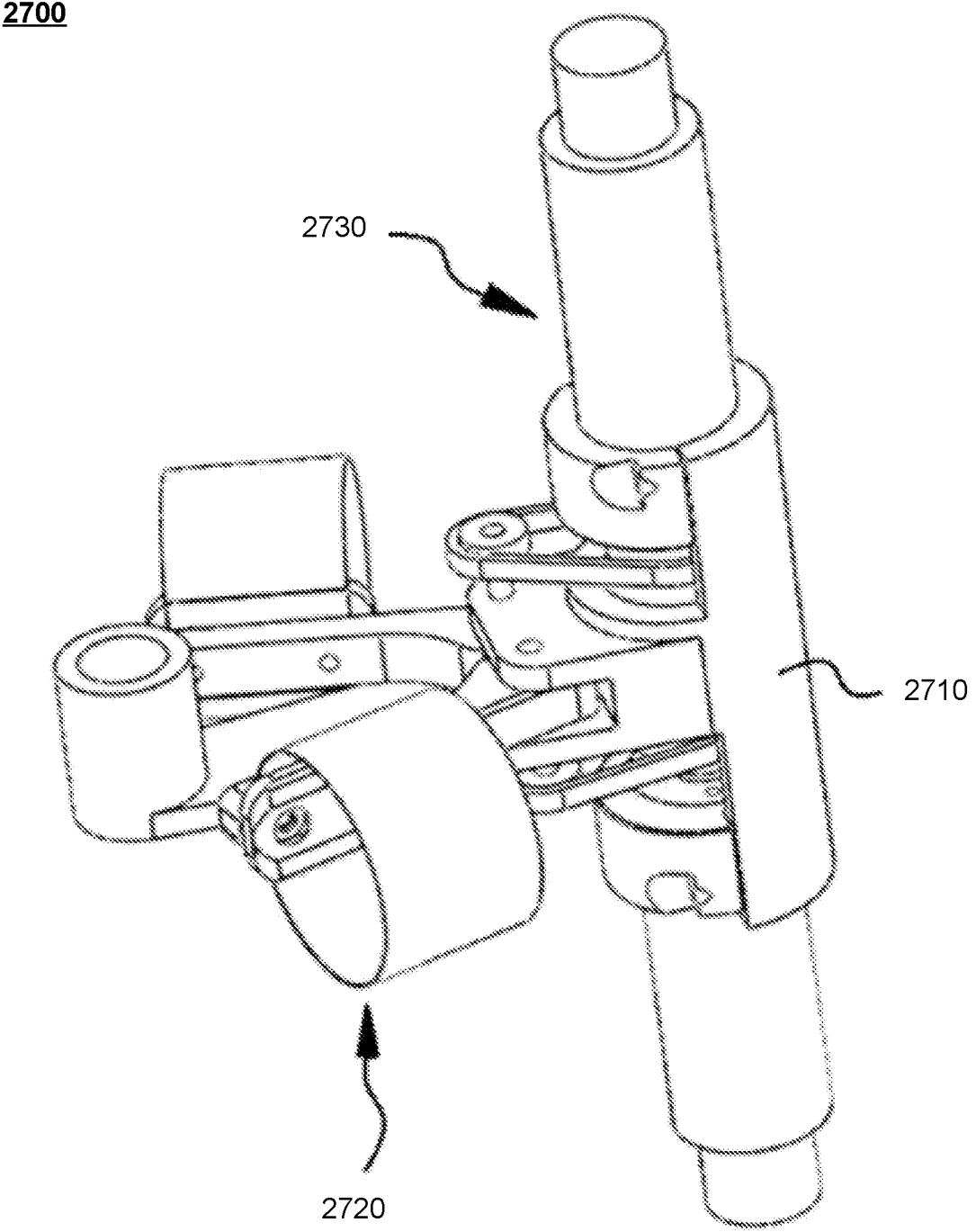
FIGS. 27-29 are schematic diagrams illustrating an exemplary clamping device according to some embodiments of the present disclosure.
Figure 28:
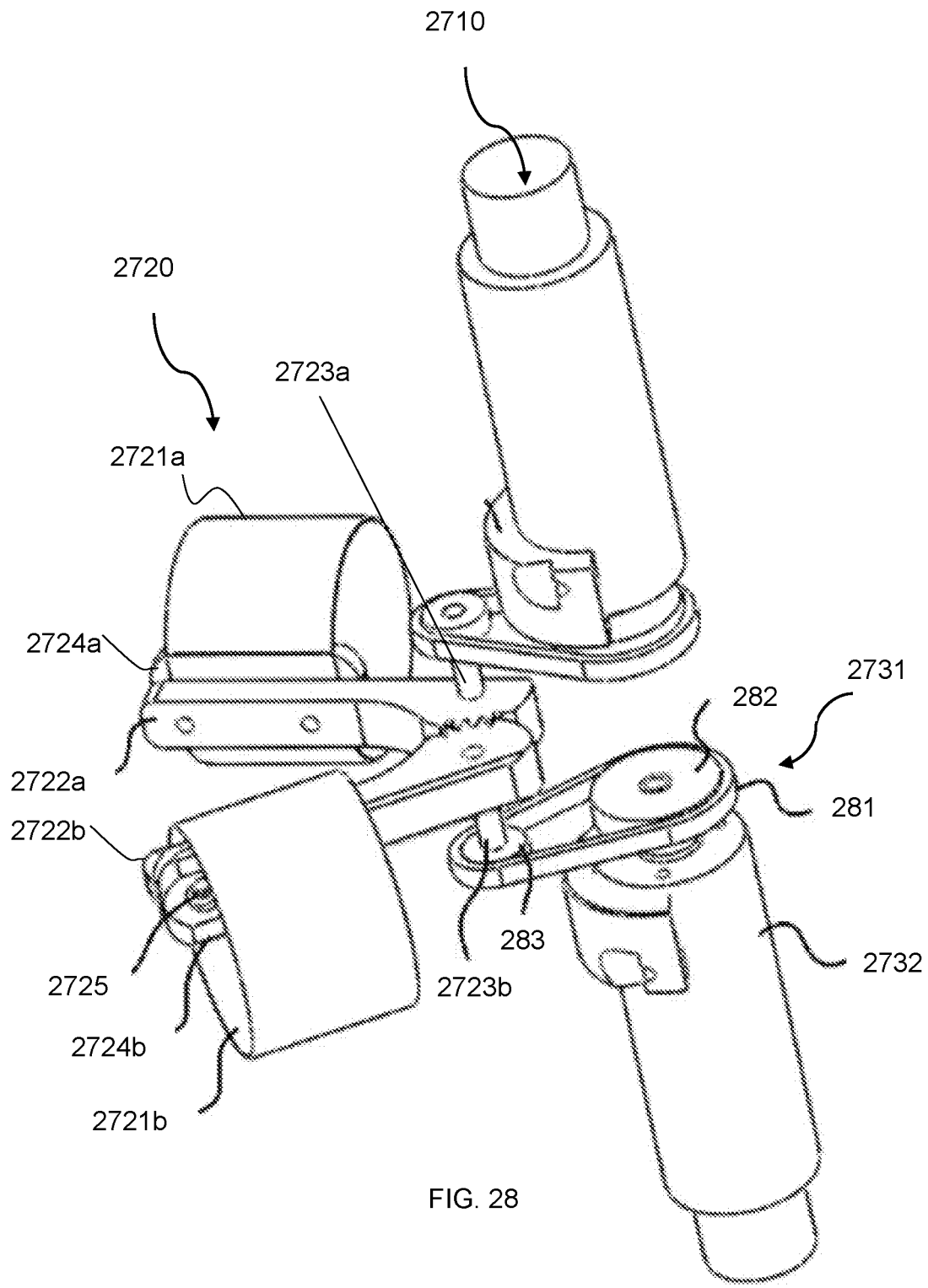
Figure 29:
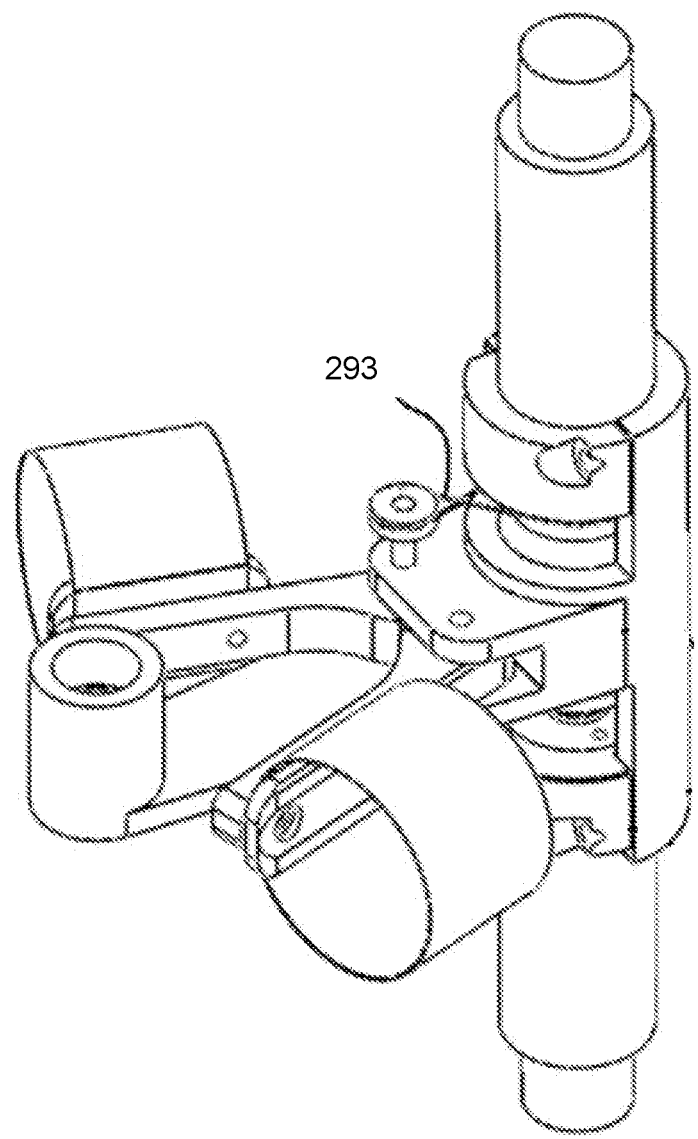

FIGS. 27-29 are schematic diagrams illustrating an exemplary clamping device according to some embodiments of the present disclosure. A clamping device 2700 may be applied to any master manipulator (e.g., the master manipulator 1100, the master manipulator 300, and the master manipulator 200) described in the present disclosure. For example, the clamping device 2700 may be installed on the wrist assembly of the master manipulator (e.g., the master manipulator 1100, the master manipulator 300, and the master manipulator 200).

As shown in FIG. 27, the clamping device 2700 may include a base 2710, a clamping assembly 2720, and a feedback assembly 2730. The base 2710 may be any shape for supporting other elements of the clamping device 2700. In some embodiments, the base 2710 may be cylindrical, and one side of the base 2710 may be provided with a fixing groove. The clamping assembly 2720 may be rotatably disposed on the base 2710 and may open and close within a working range. As described herein, the clamping assembly opening and closing within the working range means that the clamping assembly includes at least one element (e.g., two or three) capable of moving toward and away from a reference object under an external force, thereby realizing opening and closing within a certain range. For example, the clamping assembly may include two elements capable of moving toward and away from each other under the external force, thereby realizing opening and closing within the certain range. The clamping assembly 2720 may be disposed at any position such as an end region or a middle region of the base 2710. As shown in FIG. 27, the clamping assembly 2720 may be disposed in the middle region of the base 2710, but the position of the clamping assembly 2720 may not be limited thereto. The feedback assembly 2730 may be connected with the base 2710 and the clamping assembly 2720. The feedback assembly 2730 may output an adjustable rotational resistance to the clamping assembly 2720. In some embodiments, the feedback assembly 2730 may convert a rotation signal of the clamping assembly 2720 into an electrical signal and output the electrical signal to, for example, the end effector of the slave robotic arm.

As shown in FIG. 28, the clamping assembly 2720 may include two finger cots (e.g., a finger cot 2721*a* and a finger cot 2721*b*) (also referred to as a first finger cot and a second finger cot) and two connection plates (e.g., a connection plate 2722*a* and a connection plate 2722*b*) (also referred to as a first connection plate and a second connection plate). Each of the two finger cots may be provided corresponding to one of the two connection plates. One end of any one of the two connection plates may be rotatably connected with the base 2710, and another end of any one of the two connection plates may be rotatably connected with one of the two finger cots. It should be noted that the two finger cots and the two connection plates of the clamping assembly 2720 shown in FIG. 28 are only an example, and do not limit the scope of protection of the present disclosure. In some embodiments, a count of the finger cots and a count of the connection plates may be greater than 2, for example, 3, 4, or 5. In some embodiments, the count of the finger cots and the count of the connection plates may be 1.

In some embodiments, any one of the two finger cots may be an annular component, or may be cylindrical. In some embodiments, any one of the two finger cots may be strip-shape. As shown in the figure, the finger cot 2721*a* and the finger cot 2721*b* may be cylinders with circular cross sections. The finger cot 2721*a* and the finger cot 2721*b* may be hollow with openings at two ends.

The clamping assembly 2720 may further include rotation shafts (e.g., a rotation shaft 2723*a* and a rotation shaft 2723*b*) (also referred to as a first rotation shaft and a second rotation shaft). Each of the rotation shafts may be provided corresponding to one of the two connection plates. One end of the connection plate 2722*a* and one end of the connection plate 2722*b* may be rotatably connected with the base 2710 through the rotation shaft 2723*a* and the rotation shaft 2723*b*, respectively.

The base 2710 may be provided with installation holes through which the rotation axes pass. The installation holes may communicate with the fixing grooves. For any one of the two connection plates, one end of the connection plate (e.g., the connection plate 2722*a* or the connection plate 2722*b*) may be rotatably inserted into one of the fixing grooves and may be provided with a fixing hole relative to one of the rotation axes (e.g., the rotation shaft 2723*a* or the rotation shaft 2723*b*). Another end of the connection plate (e.g., the connection plate 2722*a* or the connection plate 2722*b*) may be connected with an outer wall of the corresponding finger cot (e.g., the finger cot 2721*a* or the finger cot 2721*b*) along an axial direction of the corresponding finger cot (e.g., the finger cot 2721*a* or the finger cot 2721*b*).

As shown in FIG. 28, there may be two finger cots, two connection plates, and two rotation axes in the clamping assembly 2720, and each of the two finger cots, each of the two connection plates, and each of the two rotation axes may be provided correspondingly. It should be noted that the arrangement of the two connection plates, the two finger cots, and the two rotation axes in FIG. 28 is only for illustration, and does not limit the scope of the present disclosure. In some embodiments, the count of the finger cots and the count of the connection plates can be 2 or more, and the count of the rotation axes may be 1. The plurality of connection plates may be stacked, and one end of each of the plurality of connection plates may sleeve the same rotation axis through the fixing hole.

In some embodiments, rotatable connection ends of the connection plate 2722*a* and the connection plate 2722*b* with the base 2710 may be tooth-shaped, and the two connection plates may be engaged with each other and rotate synchronously.

The two connection plates may be symmetrically arranged on the base 2710.

By arranging the rotatable connection ends of the connection plates and the base 2710 as a toothed structure, and making the two connection plates be engaged with each other, linkage between the connection plates and the finger cots may be realized, the two finger cots may be opened and closed, and rotation of any of the two finger cots alone may be avoided.

In some embodiments, the clamping assembly 2720 may further include pressing plates (e.g., a pressing plate 2724*a* and a pressing plate 2724*b*). The two finger cots may be detachably connected with the connection plates through the pressing plates, respectively.

The connection plates may be detachably connected with the finger cots through the pressing plates, so that each component may be manufactured separately, and the connection between the finger cots, the connection plates, and the pressing plates may be realized through subsequent assembly.

In some embodiments, a groove may be formed on a side of the pressing plate (e.g., the pressing plate 2724*b*) away from an inner wall of the finger cot, and the groove may penetrate through the pressing plate (e.g., the pressing plate 2724*b*) along an axial direction of the finger cot (e.g., the finger cot 2721*b*).

A cross section of the inner wall of the groove may be arc-shaped, "["-shaped, or the like.

The pressing plate (e.g., the pressing plate 2724*b*) and the connection plate (e.g., the connection plate 2722*b*) may be detachably connected with the finger cot (e.g., the finger cot 2721*b*) through a buckle, or may be threadedly connected with the finger cot (e.g., the finger cot 2721*b*) by screws. For example, as shown in FIG. 28, a side of any one of the two finger cots (e.g., the finger cot 2721*b*) close to the other finger cot (e.g., the finger cot 2721*a*) may be provided with two through holes at intervals, and the connection plate (e.g., the connection plate 2722*b*) corresponding to the finger cot may be provided with two threaded holes corresponding to the two through holes. Each of the two threaded holes may be provided corresponding to one of the two through holes.

The pressing plate (e.g., the pressing plate 2724b) corresponding to the finger cot (e.g., the finger cot 2721b) may be provided with two countersunk holes corresponding to the two through holes. Each of the two countersunk holes may be provided corresponding to one of the two through holes. A small diameter section of each of the two countersunk holes may be close to the inner wall of the finger cot (e.g., the finger cot 2721b) relative to a large diameter section. Each of the two finger cots of the clamping assembly 2720 may further correspond to two screws (e.g., screws 2725). Each of the two screws may be provided corresponding to one of the two countersunk holes. A threaded end of each of the two screws may rotatably penetrate through one of the two countersunk holes and each of the two through holes to be threaded to one of the two threaded holes. A head of each of the two screws may be built in the large diameter section of one of the two countersunk holes.

Further, a countersunk hole may be formed by a bottom inner wall of a groove on the inner wall of one of the two pressing plates toward the other finger cot.

By arranging the countersunk holes, human fingers may not touch the connection screws when the fingers insert into the finger cots.

The feedback assembly 2730 may include one or more transmission members and one or more power members. The power members may be fixed on the base 2710 and connected with the two connection plates of the clamping assembly 2720 through the transmission members. In some embodiments, a count of the transmission members and a count of the power members of the feedback assembly 2730 may be equal to the count of the finger cots (or the connection plates). In some embodiments, the count of the transmission members of the feedback assembly 2730 may be equal to the count of the finger cots (or the connection plates), and the count of the power members of the feedback assembly 2730 may be less than the count of the transmission members. For example, When the count of the finger cots is 2, the count of the transmission members may be 2, each of the transmission members may be provided corresponding to one of the two finger cots (or the connection plates), and the count of the power members may be 1. In some embodiments, the count of the transmission members and the count of the power members of the feedback assembly 2730 may be less than the count of the finger cots (or the connection plates). For example, when the count of finger cots is 2, the count of the transmission members may be 1, and the count of the power members may be 1.

As shown in FIG. 28, the count of the transmission members of the feedback assembly 2730 may be 2, the count of the power members may be 2, and each of the transmission members and each of the power members may be provided corresponding to one of the two finger cots (or one of the connection plates). A transmission member and A power member corresponding to the transmission member may be referred to as a set of feedback members. The two sets of feedback members may be arranged symmetrically at two ends of the base 2710, respectively, and output shafts of the power members of the two sets of feedback members may be arranged coaxially.

One of the embodiments is described by one set of feedback members. The set of feedback members may include a transmission member 2731 and a power member 2732 configured to output resistance to the finger cot 2721b or the connection plate 2722b. The transmission member 2731 may include a first pulley 281, a second pulley 282, and a transmission belt 283. The first pulley 281 and the second pulley 282 may be respectively fixed to one end of one of the two connection plates (e.g., the connection plate 2722a) and the output shaft of the power member (e.g., the power member 2732a). The first pulley 281 and the second pulley 282 may be in transmission connection through the transmission belt 283.

The first pulley 281 may be arranged coaxially with the rotation shaft 2723b. The first pulley 281 may fixedly sleeve the rotation shaft 2723b. The second pulley 282 may be arranged coaxially with the output shaft of the power member 2732.

By arranging the first pulley 281, the second pulley 282, and the transmission belt 283, the resistance provided by the power member (e.g., the power member 2732) may be transmitted to the rotation shaft 2723b connected with the first pulley 281 through the second pulley 282, the transmission belt 283, and the first pulley 281. The rotation shaft 2723b may transmit the resistance to the finger cot 2721b. The resistance may be an electromagnetic force between the output shaft of the power member 2732 and a stator. When the stator is energized, the electromagnetic force for rotation may be applied to the output shaft of the power member 2732. As the electromagnetic force and the output shaft of the power member 2732 are opposite in the rotation direction, a resistance that hinders the rotation of the rotation axis may be formed, and a magnitude of the resistance may be changed by adjusting electrification parameters (e.g., current, and voltage). The resistance may also be generated between the second pulley 282 and the transmission belt 283. The output shaft of the power member 2732 may drive the second pulley 282 to rotate, so that the second pulley 282 may slide relative to the transmission belt 283. A relative friction force may be generated during a sliding process, and a magnitude of the friction force may be adjusted by the speed of the power member 2732.

The transmission belt 283 may be a synchronous belt or a steel wire rope. Referring to FIG. 28, the transmission belt 283 may be set as the steel wire rope. When the transmission belt 283 is the steel wire rope, as shown in FIG. 29, the transmission belt 283 may be arranged in an "8" shape similar to the transmission belt 293 in FIG. 29. When the transmission belt 283 is the steel wire rope, the transmission belt 283 may have relative friction between the first pulley 281 or the second pulley 282. When the transmission belt 283 is the synchronous belt, the transmission belt 283 may have no relative sliding between the first pulley 281 or the second pulley 282.

Figure 30:
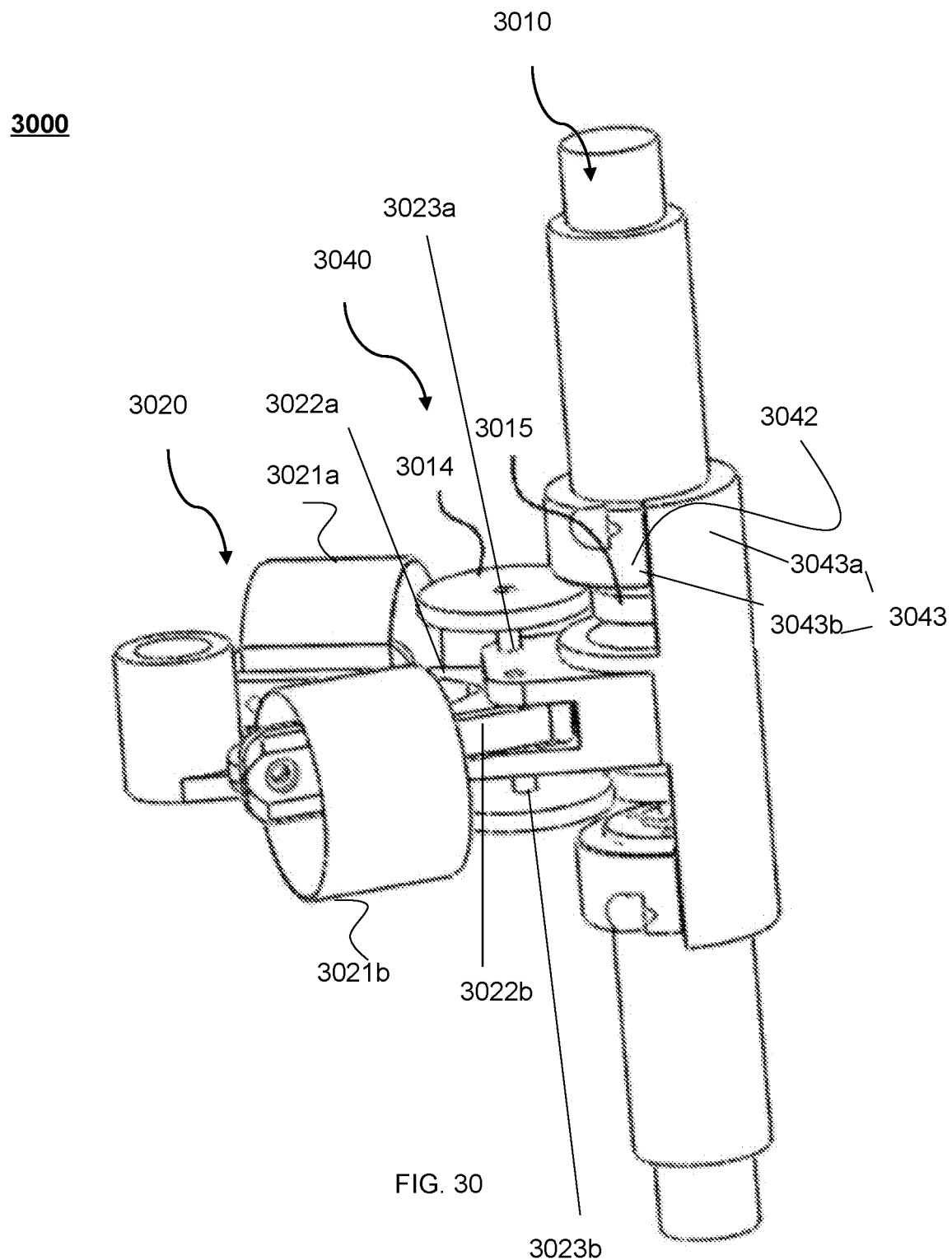
FIG. 30 is schematic diagram illustrating another exemplary clamping device according to some embodiments of the present disclosure.

FIG. 30 is a schematic diagram illustrating another exemplary clamping device according to some embodiments of the present disclosure. A clamping device 3000 may be applied to any master manipulator described in the present disclosure (e.g., the master manipulator 300, and the master manipulator 200). For example, the clamping device 3000 may be installed on the wrist assembly of the master manipulator (e.g., the master manipulator 300, and the master manipulator 200).

As shown in FIG. 30, the clamping device 3000 may include a base 3010, a clamping assembly 3020, and a feedback assembly 3040. The base 3010, the clamping assembly 3020, and the feedback assembly 3040 may be the same as or similar to the base 2710, the clamping assembly 2720, and feedback assembly 2730. For example, the clamping assembly 3020 may include one or more finger cots (e.g., a finger cot 3021a (also referred to as a first finger cot) and a finger cot 3021b (also referred to as a second finger cot)), one or more connection plates (e.g., a connection plate 3022a (also referred to as a first connection plate) and a connection plate 3022b (also referred to as a second connection plate)), one or more rotation axes (e.g., a rotation axis 3023a (also referred to as a first rotation axis), and a rotation axis 3023b (also referred to as a second rotation axis)). As another example, the feedback assembly 3040 may include one or more transmission members and one or more power members. A count of the transmission members and a count of the power members may be the same as a count of the finger cots (e.g., 2). More descriptions regarding the base 3010, the clamping assembly 3020, and the feedback assembly 3040 may be found in the detailed descriptions of FIGS. 27-29.

Taking the transmission member corresponding to the finger cot 3021a as an illustration, the difference from the clamping device 2700 is that, as shown in FIG. 30, the transmission member may include a first gear 3014 and a second gear 3015. The first gear 3014 may be connected with the connection plate 3022a. The second gear 3015 may fixedly sleeve the output shaft of the power member 3042, and the first gear 3014 and the second gear 3015 may be connected via a gear transmission.

The first gear 3014 may fixedly sleeve the rotation axis 3023a and arranged coaxially with the rotation axis 3023a, and the second gear 3015 may be arranged coaxially with the output shaft of the power member 3042.

By arranging the first gear 3014 and the second gear 3015, the connection between the rotation shaft 3023a and the output shaft of the power member 3042 may be realized. The resistance provided by the power member 3042 may be transmitted to the rotation shaft 3023a through the first gear 3014 and the second gear 3015. The resistance may be transmitted to the finger cot 3023a through the rotation shaft 3023a.

The power member 3042 may include a motor, a hydraulic motor, or the like. In some embodiments, the power member 3042 may be a motor with an encoder. The encoder may convert rotation signals of the output shaft of the power member 3042 and the rotation axis 3023a into electrical signals and output the electrical signals. The motor may output an adjustable rotational resistance to the rotation axis 3023a. A structure of the transmission member corresponding to the finger cot 3021b may be the same or similar to that of the transmission member corresponding to the finger cot 3021a, which is not repeated here.

The power element 3042 of the feedback assembly 3040 may be fixedly connected with the base 3010 or detachably connected with the base 3010.

In some embodiments, the feedback assembly 3040 may further include a clamping member 3043 connected with the base 3010 and detachably connected with the power member 3042.

Further, the clamping member 3043 may include a first clamping ring 3043a and a second clamping ring 3043b. Cross sections of the first clamping ring 3043a and the second clamping ring 3043b may be both semicircular and sleeve a housing of the power member 3042. One end of the first clamping ring 3043a may be connected with the base 3010. The second clamping ring 3043b may be arranged opposite to the first clamping ring 3043a and threadedly connected with the first clamping ring 3043a by screws.

In some embodiments, the first clamping ring 3043a and the base 3010 may be is integrally formed.

By arranging the first clamping ring 3043a and the second clamping ring 3043b, the second clamping ring 3043b and the first clamping ring 3043a may clamp the housing of the power member 3042, thereby realizing a detachable connection of the power member 3042 and the base 3010, and making the power member 3042 be effectively fixed on the base 3010.

Figure 31:
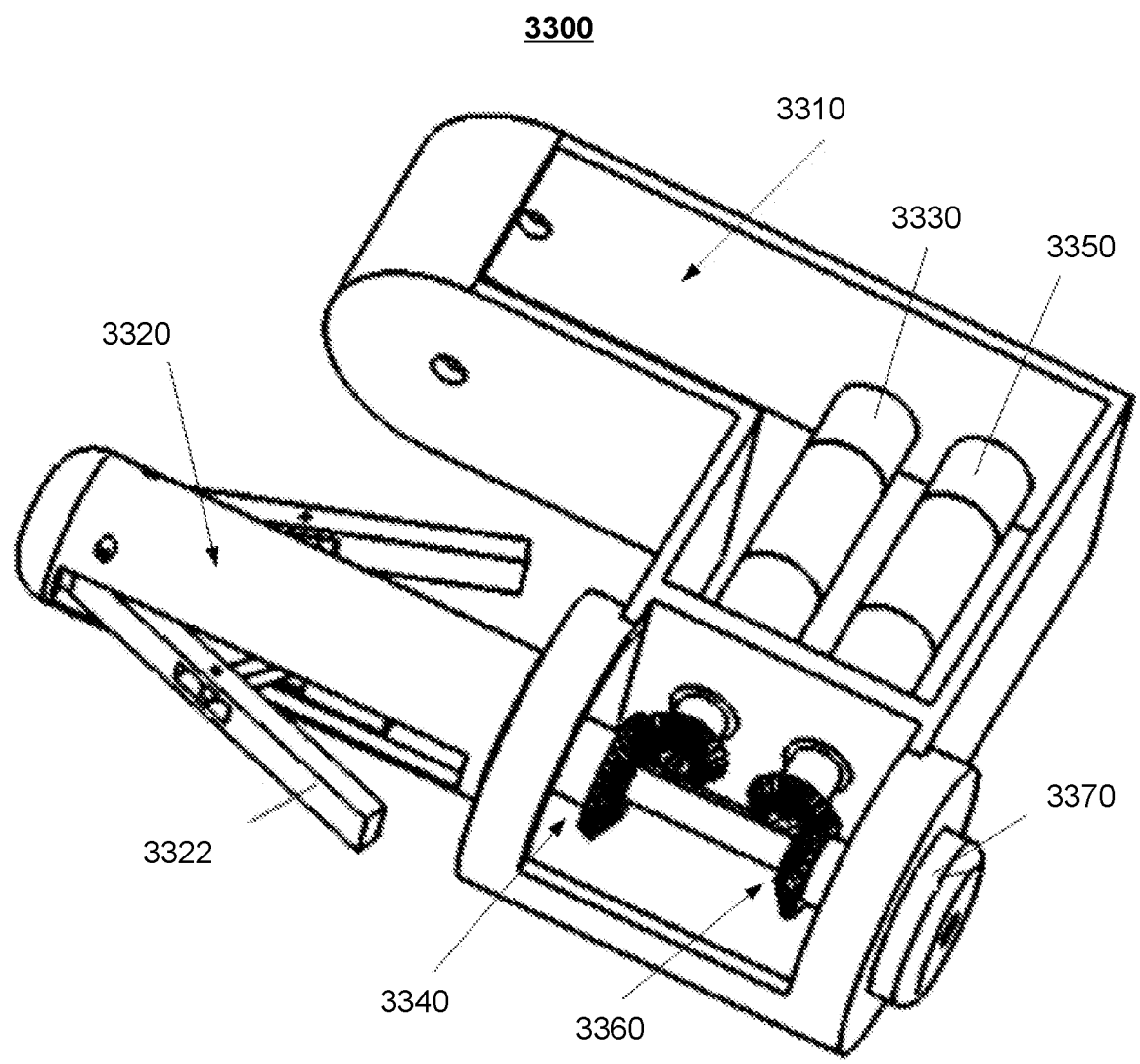
FIGS. 31-33 are schematic diagrams illustrating another a clamping device according to some embodiments of the present disclosure.
Figure 32:
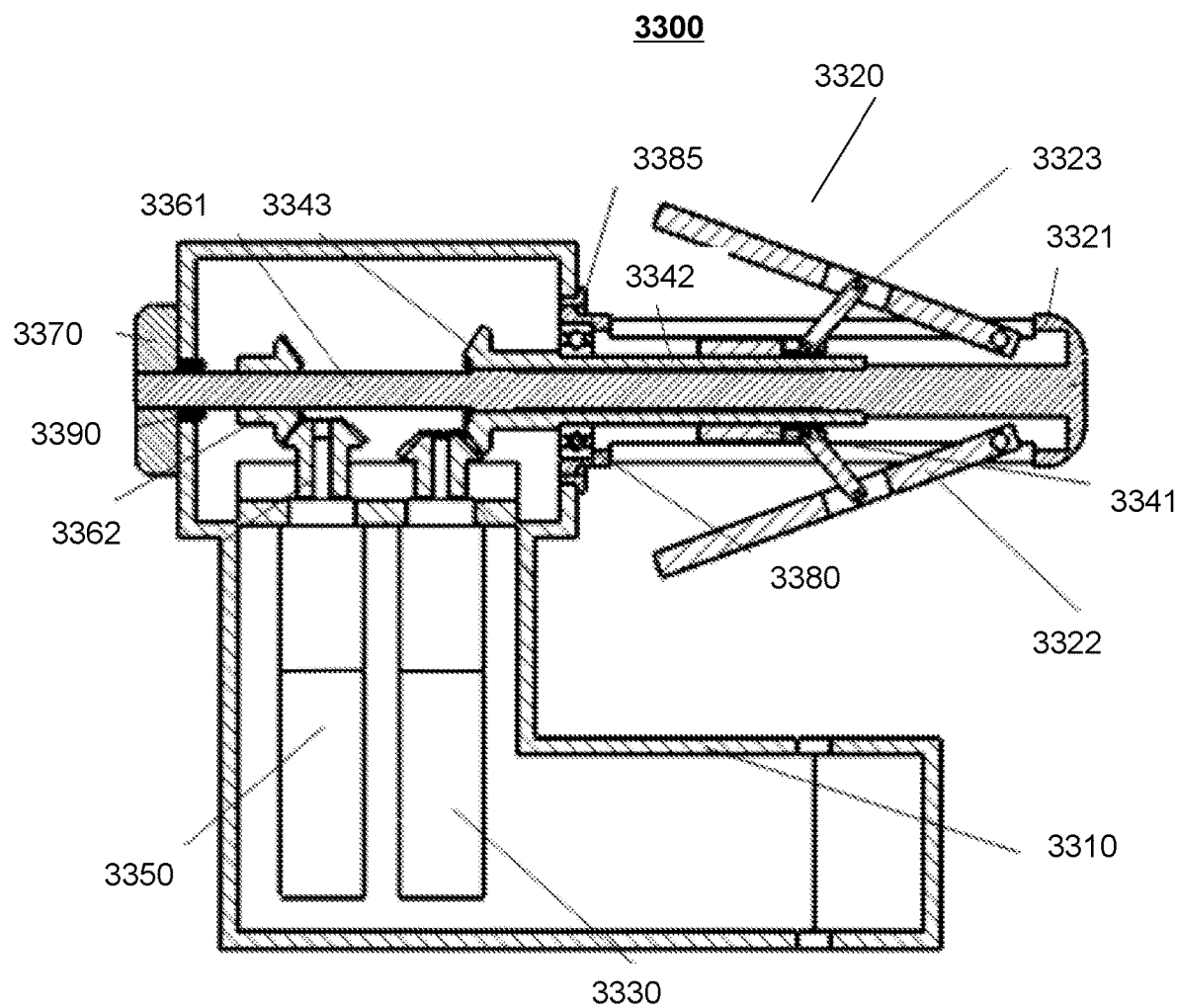
Figure 33:
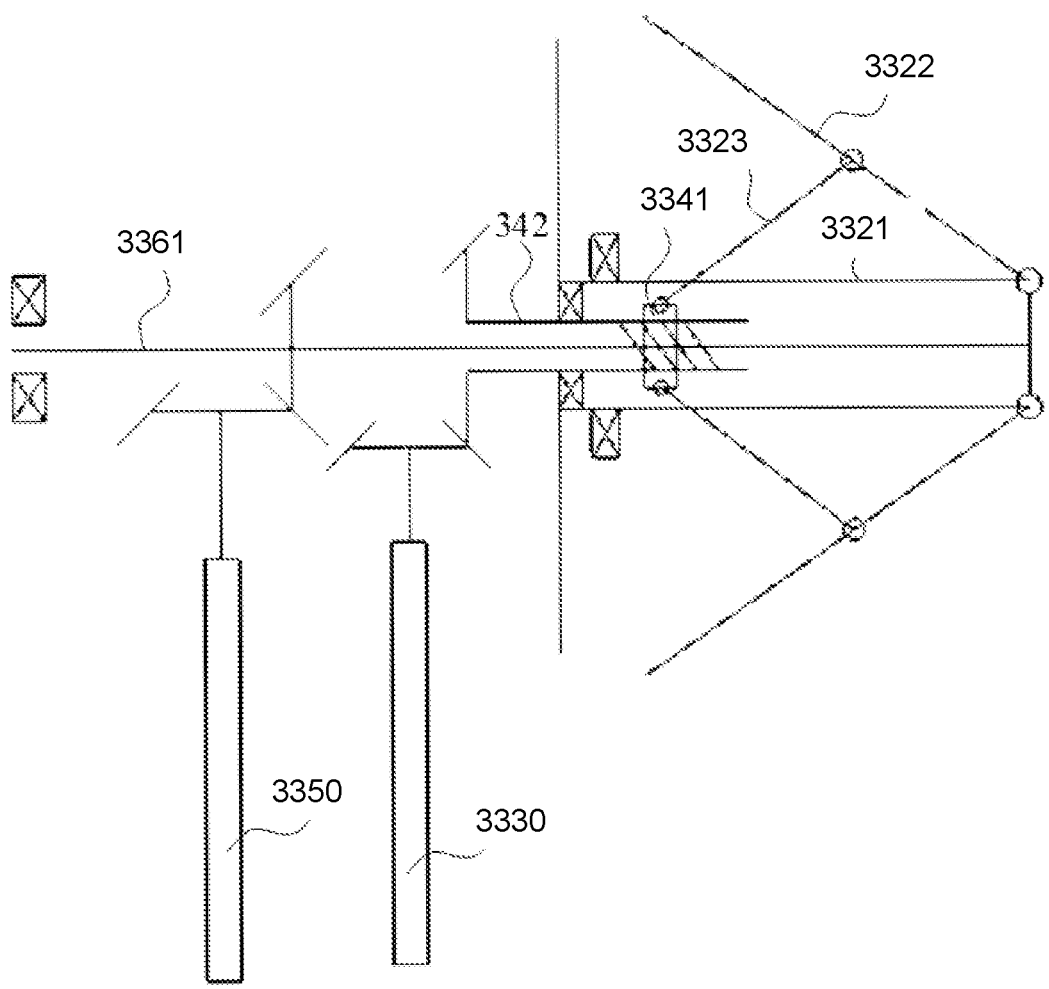

FIGS. 31-33 are schematic diagrams illustrating another exemplary clamping device according to some embodiments of the present disclosure. A clamping device 3300 may be applied to any master manipulator described in the present disclosure (e.g., the master manipulator 300, master manipulator 200, and the master manipulator 1100). For example, the clamping device 3300 may be installed on the wrist assembly of the master manipulator (e.g., the master manipulator 300, master manipulator 200, and the master manipulator 1100).

As shown in FIGS. 31-33, the clamping device 3300 may include a base 3310, a clamping control assembly 3320 (also referred to as a clamping assembly), and a feedback assembly. The feedback assembly may include a transmission member and a power member. The transmission member may be composed of a set of coaxially nested rotation shafts, and opening, closing and rotation of the clamping control assembly 3320 may be coaxially and independently transmitted by the transmission member. The power member may be a motor, and the transmission member may be connected with the motor. The clamping control assembly 3320 may send a control signal to a slave robotic arm and/or feed back a force state of the slave robotic arm through the motor. It can be understood that the base 3310 may be a support base of the entire clamping device 3300, which facilitates the assembly of each component of the clamping device 3300 and the installation of the clamping device 3300 and other mechanisms. A bidirectional transmission of the control signal and the feedback signal between the clamping device 3300 and the slave robotic arm may be realized using the motor and the transmission member as the feedback assembly, thereby achieving the advantages of simple structure and stable performance.

Further, a control action of the clamping control assembly 3320 may include opening, closing, and rotation. Opening and closing means that the elements of the clamping control assembly 3320 can move close to and away from the rotation axis of the transmission member; and rotation means that the elements of the clamping control assembly 3320 may move around or along with the rotation axis of the transmission member. Correspondingly, the transmission member may include a first transmission mechanism 3340 and a second transmission mechanism 3360, and rotation shafts of the first transmission mechanism 3340 and the second transmission mechanism 3360 may be coaxially nested. Coaxial nesting may significantly reduce the volume of the clamping device 3300. Furthermore, the feedback assembly may further include a first motor 3330 and a second motor 3350. Corresponding to the transmission mechanisms, the first motor 3330 may be in transmission connection with the first transmission mechanism 3340, and the second motor 3350 may be in transmission connection with the second transmission mechanism 3360. The clamping control assembly 3320 may be a part directly operated by the doctor during minimally invasive surgery. The clamping control assembly 3320 may be movably arranged on the base 3310. The clamping control assembly 3320 may open and close within a working range. In the process of opening and closing of the clamping control assembly 3320, the corresponding slave robotic arm may be controlled to perform opening and closing actions. It can be understood that the working range of the clamping control assembly 3320 refers to a limit opening and closing degree (i.e., a maximum opening and closing degree) of the clamping control assembly 3320. In some embodiments, the working range of the clamping control assembly 3320 may be within a range of 0° to 90°. In some embodiments, the working range of the clamping control assembly 3320 may be within a range of 0° to 360°.

As shown in FIGS. 31-32, the first motor 3330 may be fixedly arranged on the base 3310. The first motor 3330 and the clamping control assembly 3320 may be in transmission connection through the first transmission mechanism 3340. The first motor 3330 may also be connected with the slave robotic arm. In some embodiments, the first motor 3330 and the first transmission mechanism 3340 may transmit a force acting on the clamping control assembly 3320 (e.g., a force that makes the clamping control assembly 3320 open or close) to the slave robotic arm to control the slave robotic arm to perform the corresponding operation. When the clamping control assembly 3320 opens and closes within the working range, the first transmission mechanism 3340 may drive the first motor 3330 to rotate forward or reversely to control the slave robotic arm to perform the corresponding opening and closing actions. In some embodiments, the first motor 3330 and the first transmission mechanism 3340 may feed back mechanical parameters, such as a clamping force of the slave robotic arm, to the clamping control assembly 3320 directly operated by the surgeon. For example, the first motor 3330 may generate a corresponding clamping torque according to the clamping force of the slave robotic arm. When the first motor 3330 outputs the corresponding clamping torque, the first transmission mechanism 3340 may drive the clamping control assembly 3320 to generate an opening tendency or a closing tendency. When the clamping control assembly 3320 generates the opening tendency or the closing tendency, the surgeon may directly perceive the mechanical parameters, such as the clamping force of the slave robotic arm. In this case, the surgeon may continue to control normal clamping of the slave robotic arm through the master manipulator 3300.

During the operation, the slave robotic arm may not only generate a certain clamping force on the end effector (e.g., a surgical instrument), but also generate a lateral torque in the process of rotating or touching a patient's tissue and organ. The surgeon may accurately perceive the lateral torque that the slave robotic arm bears when the slave robotic arm rotates or touches the tissue and the organ, which helps the surgeon to control the whole process and details of the operation. In some embodiments, the second motor 3350 and the second transmission mechanism 3360 may transmit a force acting on the clamping control assembly 3320 (e.g., a force that makes the clamping control assembly 3320 rotate) to the slave robotic arm to control the slave robotic arm to perform the corresponding operation. Further, the clamping control assembly 3320 may rotate within the working range. The second motor 3350 may be in transmission connection with a clamping sleeve 3321 of the clamping control assembly 3320 through the second transmission mechanism 3360. The second motor 3350 may be connected with the slave robotic arm. When the clamping control assembly 3320 rotates within the working range, the second transmission mechanism 3360 may drive the second motor 3350 to rotate forward or reversely to control the slave robotic arm to perform the corresponding opening and closing actions. In some embodiments, the second motor 3350 and the second transmission mechanism 3360 may be to feed back mechanical parameters, such as the clamping force of the slave robotic arm, to the clamping control assembly 3320 directly operated by the surgeon. For example, the second motor 3350 may output a rotational torque according to the lateral torque received by the slave robotic arm during the operation. The second motor 3350 may drive two clamping pieces 3322 to generate a rotation tendency through the second transmission mechanism 3360 and the clamping sleeve 3321. The surgeon may directly perceive the rotation tendency of the slave robotic arm. The first motor 3330, the first transmission mechanism 3340, the second motor 3350, and the second transmission mechanism 3360 may be integrated on the base 3310, so that the clamping device 3300 may be more compact.

According to the clamping device 3300, the clamping force of the slave robotic arm and the lateral torque may be fed back to the clamping control assembly 3320 through the first motor 3330, the first transmission mechanism 3340, the second motor 3350, and the second transmission mechanism 3360, respectively, and then the surgeon performing the operation may accurately perceive the clamping force of the slave robotic arm and the lateral torque. The surgeon may determine an operation state through a change of the clamping force and a change of the lateral torque, which is convenient for the surgeon to adjust the clamping force and lateral torque applied by the master manipulator 3300 at any time, thereby performing the operation more efficiently. The surgical operation experience may be more realistic, and the components of the slave robotic arm may work within the normal load, which is conducive to prolonging the service life of the minimally invasive surgical robot.

The first transmission mechanism 3340 may be a key structure to realize the transmission connection between the clamping control assembly 3320 and the first motor 3330. The first transmission mechanism 3340 may transmit the opening and closing actions of the clamping control assembly 3320 to the first motor 3330 and then drive the first motor 3330 to make the corresponding rotation, and may also transmit the torque output from the first motor 3330 to the clamping control assembly 3320 according to the mechanical parameters such as the clamping force of the slave robotic arm, thereby causing the clamping control assembly 3320 to generate the open or close tendency, and making the doctor accurately perceive the clamping force of the slave robotic arm. Optionally, the clamping control assembly 3320 may output a linear motion, swing, or rotation during the opening and closing process. Correspondingly, the first transmission mechanism 3340 may convert the linear motion, swing or rotation output by the clamping control assembly 3320 into the rotation of the first motor 3330. Meanwhile, the first transmission mechanism 3340 may convert the rotation of the first motor 3330 into the linear motion, swing, or rotation output by the clamping control assembly 3320.

As shown in FIGS. 31-33, the clamping control assembly 3320 may output the linear motion during the opening and closing process. Correspondingly, the first transmission mechanism 3340 may include a linear part and a rotation part. The linear part may be movably arranged on the base 3310. The linear part may perform the linear motion relative to the base 3310. The rotation part may be rotatably arranged on the base 3310. The linear part may be in transmission connection with the rotation part. When the linear part moves, the linear part may drive the rotation part to rotate, and when the rotation part rotates, the rotation part may drive the linear part to move. The clamping control assembly 3320 may be connected with the linear part, and drive the linear part to move when the clamping control assembly 3320 opens and closes within the working range. The rotation part may be in transmission connection with the first motor 3330. The first transmission mechanism 3340 including the linear part and the rotation part may not only have stable transmission performance, but also allow each part of the clamping device 3300 to be arranged flexibly, thereby optimizing the overall structure of the clamping device 3300. In other embodiments of the present disclosure, the clamping control assembly 3320 may output swing during the opening and closing process. Correspondingly, the linear part in the embodiment may be replaced with a swing part, as long as the transmission connection between the clamping control assembly 3320 and the first motor 3330 is realized.

As shown in FIGS. 31-33, the rotation part of the first transmission mechanism 3340 may include a first shaft 3342. The first shaft 3342 may be rotatably arranged on the base 3310. The first shaft 3342 may be in transmission connection with the first motor 3330. The first shaft 3342 may be provided with a threaded section including threads. The linear part may include a nut 3341. The nut 3341 may sleeve the threaded section of the first shaft 3342. When the nut 3341 moves along an axial direction of the first shaft 3342, the nut 3341 may drive the first shaft 3342 to rotate. When the first shaft 3342 rotates, the first shaft 3342 may drive the nut 3341 to move along the axial direction of the first shaft 3342. The nut 3341 may be connected with the clamping control assembly 3320. The nut 3341 and the first shaft 3342 may be in threaded connection to realize mutual driving, thereby achieving the advantages of stable performance, simple structure, and easy maintenance. As an embodiment, the first shaft 3342 may be rotatably installed on the base 3310 through a first bearing 3380; and the nut 3341 and the clamping control assembly 3320 may be relatively fixed along a rotation of the first shaft 3342. In some embodiments, a type of the first transmission mechanism 3340 may also be cooperation of a gear and a rack. The gear may be in transmission connection with the first motor 3330, the rack may be connected with the clamping control assembly 3320, and the gear and the rack may be engaged with each other.

In some embodiments, the first shaft 3342 and the first motor 3330 may be in the transmission connection through a coupler, a gear set, chain drive, belt drive, etc. In some embodiments, as shown in FIGS. 31-33, the first transmission mechanism 3340 may further include a gear set 3343 (also referred to as a first gear set) (e.g., a bevel gear set). The first shaft 3342 and the first motor 3330 may be in transmission connection through the gear set 3343. An installation shaft of the first motor 3330 may be perpendicular to an extension direction of the first shaft 3342. The gear set 3343 may prevent the clamping device 3300 from being too large in the extension direction of the first shaft 3342, or the gear set 3343 may prevent the clamping device 3300 from being too large in the installation axis of the first motor 3330, so as to balance the overall size of the clamping device 3300. As an embodiment, an encoder (also referred to as a first encoder) may be provided on the first motor 3330. The encoder may detect a rotation angle of the first shaft 3342. The encoder may be electrically connected with the slave robotic arm. The slave robotic arm may perform a corresponding action according to data detected by the encoder.

The clamping control assembly 3320 refers to a part directly operated by the surgeon. For example, the clamping control assembly 3320 may be directly operated by the surgeon's hand or may be operated in cooperation with other parts of the surgeon (e.g., foot stepping). Some embodiments of the present disclosure provide the clamping control assembly 3320 directly operated by the surgeon's hand. As shown in FIGS. 31-33, the clamping control assembly 3320 may include a clamping sleeve 3321, two clamping pieces 3322, and two clamping connection rods 3323. The clamping sleeve 3321 may be arranged on the base 3310. One end of each of the two clamping pieces 3322 may be movably connected (e.g., hinged) with the clamping sleeve 3321. One end of each of the two clamping connection rods 3323 may be movably connected (e.g., hinged) with one clamping piece of the two clamping pieces 3322. Another end of each of the two clamping connection rods 3323 may be hinged with one of the two nuts 3341. When the two clamping pieces 3322 open and close within a working range, the nut 3341 may be driven to perform the linear motion along the axial direction of the first shaft 3342, thereby driving the first motor 3330 to rotate; correspondingly, when the first motor 3330 outputs a corresponding torque according to the mechanical parameters of the slave robotic arm, the two clamping pieces 3322 may also be driven through the first transmission mechanism 3340 to generate an opening tendency or a closing tendency, and then the clamping force of the slave robotic arm may be transmitted to the surgeon operating the clamping pieces 3322.

In some embodiments, the clamping control assembly 3320 may further include at least two clamping finger cots (not shown in the figure). The at least two clamping finger cots may be respectively arranged on the two clamping pieces 3322. The at least two clamping finger cots may allow the surgeon to operate the two clamping pieces 3322 more stably with fingers. In some embodiments, the surgeon's thumb and index finger may insert into the two clamping finger cots to control opening and closing of the two clamping pieces 3322. In some embodiments, one end of the clamping sleeve 3321 may be arranged on the base 3310. One end of each of the two clamping pieces 3322 may be hinged with the other end of the clamping sleeve 3321. The clamping sleeve 3321 may be a hollow structure. An end of the first shaft 3342 matched with the nut 3341 may be threaded inside the clamping sleeve 3321, and another end of the first shaft 3342 may be in transmission connection with the first motor 3330. The hollow clamping sleeve 3321 capable of accommodating the first shaft 3342 and the nut 3341 may effectively reduce the overall size of the clamping device 3300 while ensuring a structural strength of the hollow clamping sleeve 3321.

As shown in FIGS. 31-33, the clamping sleeve 3321 may be rotatably arranged on the base 3310 with an axis of the clamping sleeve 3321 as a center. The two clamping pieces 3322 may drive the clamping sleeve 3321 to rotate under the operation of surgeon (e.g., a chief surgeon). Meanwhile, when the two clamping pieces 3322 rotate under the operation of the surgeon, the two clamping pieces 3322 may also drive the second motor 3350 to rotate accordingly.

For example, the clamping sleeve 3321 may be rotatably installed on the base 3310 through a bushing 3385, and the first shaft 3342 may be installed on a side of the clamping sleeve 3321 away from the bushing 3385 through the first bearing 3380, so that rotation support of the first shaft 3342 may be realized, and the first shaft 3342 may be prevented from being driven to rotate when the clamping sleeve 3321 rotates, thereby ensuring the accuracy of the feedback of the clamping force and the rotational force.

As shown in FIGS. 32-33, the second transmission mechanism 3360 may include a second shaft 3361 and a gear set 3362 (i.e., a second gear set). One end of the second shaft 3361 may be fixed on the clamping sleeve 3321. The second shaft 3361 and the clamping sleeve 3321 may maintain coaxial rotation. Another end of the second shaft 3361 may be rotatably arranged on the base 3310. The second shaft 3361 may be in transmission connection with the second motor 3350 through the gear set 3362. An installation shaft of the second motor 3350 may be perpendicular to an extension direction of the second shaft 3361. The gear set 3362 may prevent the clamping device 3300 from being too large in the extension direction of the second shaft 3361, or the gear set 3343 may prevent the clamping device 3300 from being too large in the installation axis of the second motor 3350, so as to balance the overall size of the clamping device 3300. As an embodiment, the second motor 3350 and the first motor 3330 may be installed side by side. Further, one end of the second shaft 3361 may be fixedly connected with one end of the clamping sleeve 3321. The first shaft 3342 may be a hollow structure. The first shaft 3342 may sleeve the second shaft 3361. The first shaft 3342 may be fixed relative to the base 3310 (e.g., realized by the first bearing 3380) along an axial direction of the first shaft 3342. A structure of the second shaft 3361, the first shaft 3342, the clamping sleeve 3321, and the base 3310 threaded from inside to outside may be more compact. As an embodiment, the clamping sleeve 3321 and the second shaft 3361 may be integrally formed.

As shown in FIG. 32, an encoder 3370 (also referred to as a second encoder) may be installed at one end of the second shaft 3361 rotatably arranged on the base 3310. The encoder 3370 may detect a rotation angle of the second shaft 3361. The encoder 3370 may be connected with the slave robotic arm. The slave robotic arm may perform a corresponding rotation action according to data detected by the encoder 3370. As an embodiment, the encoder 3370 may be arranged on the second motor 3350. It should be noted that when the clamping control assembly 3320 rotates around the axis, the clamping control assembly 3320 may drive the nut 3341 to rotate around the first shaft 3342, and then drive the first shaft 3342 to rotate to change a clamping state of the slave robotic arm. In order to maintain the clamping state of the slave robotic arm constant, as an example the first motor 3330 may compensate the clamping state of the slave robotic arm according to a rotation angle of the clamping control assembly 3320 around the axis. As another example, the nut 3341 may include a nut outer layer and a nut inner layer. The nut inner layer may sleeve the threaded section of the first shaft 3342, and the nut outer layer may be hinged with the clamping pieces 3322. The nut outer layer and the nut inner layer may be relatively fixed along the extension direction of the first shaft 3342. The nut outer layer may move along a circumference of rotation of the first shaft 3342 relative to the nut inner layer (e.g., the nut outer layer and the nut inner layer may form a bearing structure), thereby directly avoiding the rotation of the clamping control assembly 3320 to drive the first shaft 3342 and the first motor 3330, and maintain the clamping state of the slave robotic arm constant.

In some embodiments, the base 3310 may be a hollow shell, and the first motor 3330, the second motor 3350, the gear set 3343, the gear set 3362, a part of the first shaft 3342, and a part of the second shaft 3361 may be accommodated in the base 3310.

As shown in FIGS. 32-33, the transmission connection between the first transmission mechanism 3340 and the first motor 3330, and the transmission connection between the second transmission mechanism 3360 and the second motor 3350, in addition to using the gear set (e.g., the bevel gear set), may also use a worm gear set, and a spur gear set to achieve transmission. The transmission may be realized using different gear sets, installation positions of the first motor 3330 and the second motor 3350 on the base 3310 may be different, and it may only need to adjust the installation positions of the two motors according to the selected transmission mode. The purpose of realizing the transmission using different types of gear sets may be to adjust or rationally arrange the installation positions of the first motor 3330 and the second motor 3350 on the base 3310. Further, as another example, the transmission connection between the first transmission mechanism 3340 and the first motor 3330, and the transmission connection between the second transmission mechanism 3360 and the second motor 3350 may use a flexible transmission shaft, such as a flexible steel wire shaft. In some embodiments, the transmission connection between the first transmission mechanism 3340 and the first motor 3330, and the transmission connection between the second transmission mechanism 3360 and the second motor 3350 may be the same or different.

As shown in FIGS. 32-33, the two clamping pieces 3322 may be hinged on the clamping sleeve 3321 and may rotate around hinged holes. The two clamping pieces 3322 may realize the opening and closing action driven by the operator's fingers. One end of each of the two clamping connection rods 3323 may be hinged to a middle of one of the two clamping pieces 3322, and another end of each of the two clamping connection rods 3323 may be hinged to the nut 3341. The nut 3341 may be coupled with the threaded section of the first shaft 3342 to realize a helicoidal motion. The second shaft 3361 and the clamping sleeve 3321 may be integrally formed. The first shaft 3342 may sleeve the second shaft 3361 and may rotate around the second shaft 3361. In this way, the opening and closing action of the two clamping pieces 3322 may drive the nut 3341 to move back and forth on the first shaft 3342 through the two clamping connection rods 3323, so that the first shaft 3342 may rotate. The first shaft 3342 may be in transmission connection with the output shaft of the first motor 3330 through the gear set 3343, and the first motor 3330 may be fixed on the base 3310. In this way, the first shaft 3342 may rotate to drive the first motor 3330 to rotate through the engagement of the gear set 3343. Similarly, the first motor 3330 may rotate to drive the first shaft 3342 to rotate through the engagement of the gear set 3343, so that the nut 3341 may move back and forth on the first shaft 3342, thereby driving the hinged clamping pieces 3322 to realize the opening and closing movement.

Further, as shown in FIGS. 32-33, an inner ring of one end of the clamping sleeve 3321 may be matched with the first bearing 3380, and an outer ring of one end of the clamping sleeve 3321 may be matched with the bushing 3385. An end of the second shaft 3361 away from the clamping sleeve 3321 may be matched with the second bearing 3390, and an outer ring of the second bearing 3390 may be matched with the base 3310, so that the clamping sleeve 3321 may rotate around the axis of the base 3310 (i.e., the first shaft or the second shaft). The second shaft 3361 may be in transmission connection with the second motor 3350 through the gear set 3362. The rotation around the axis of the clamping sleeve 3321 may be transmitted to the second motor 3350 through the second shaft 3361 and the gear set 3362, and the rotation of the second motor 3350 may also be transmitted to the clamping sleeve 3321 through the gear set 3362 and the second shaft 3361 to make the clamping sleeve 3321 rotate around the axis. The encoder 3370 may be fixed on the base 3310. An inner ring of the encoder 3370 may be fixed to the first shaft 3342, and may detect a rotation angle of the first shaft 3342 (clamping sleeve 3321) on the base 3310. In posture detection mode, the opening and closing movement of the two clamping pieces 3322 may be transmitted to the first motor 3330 to make the first motor 3330 rotate, and the rotation may be detected by the encoder of the first motor

3330. The rotation angle of the rotation of the clamping sleeve 3321 may be detected by the encoder 3370 matched with the first shaft 3342. In a force feedback mode, the first motor 3330 may output a required torque through a torque mode, and feed the required torque back to at least one of the two clamping pieces 3322 through the first transmission mechanism 3340. The second motor 3350 may output the required torque through the torque mode and feed the required torque back to at least one of the two clamping pieces 3322 through the second transmission mechanism 3360.

The above description is only an illustration, and obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements, and corrections are suggested in the present disclosure, so such modifications, improvements, and corrections still belong to the spirit and scope of the exemplary embodiments of the present disclosure. For example, the count of the clamping pieces of the clamping device 3300 may be greater than 2.

Figure 34:
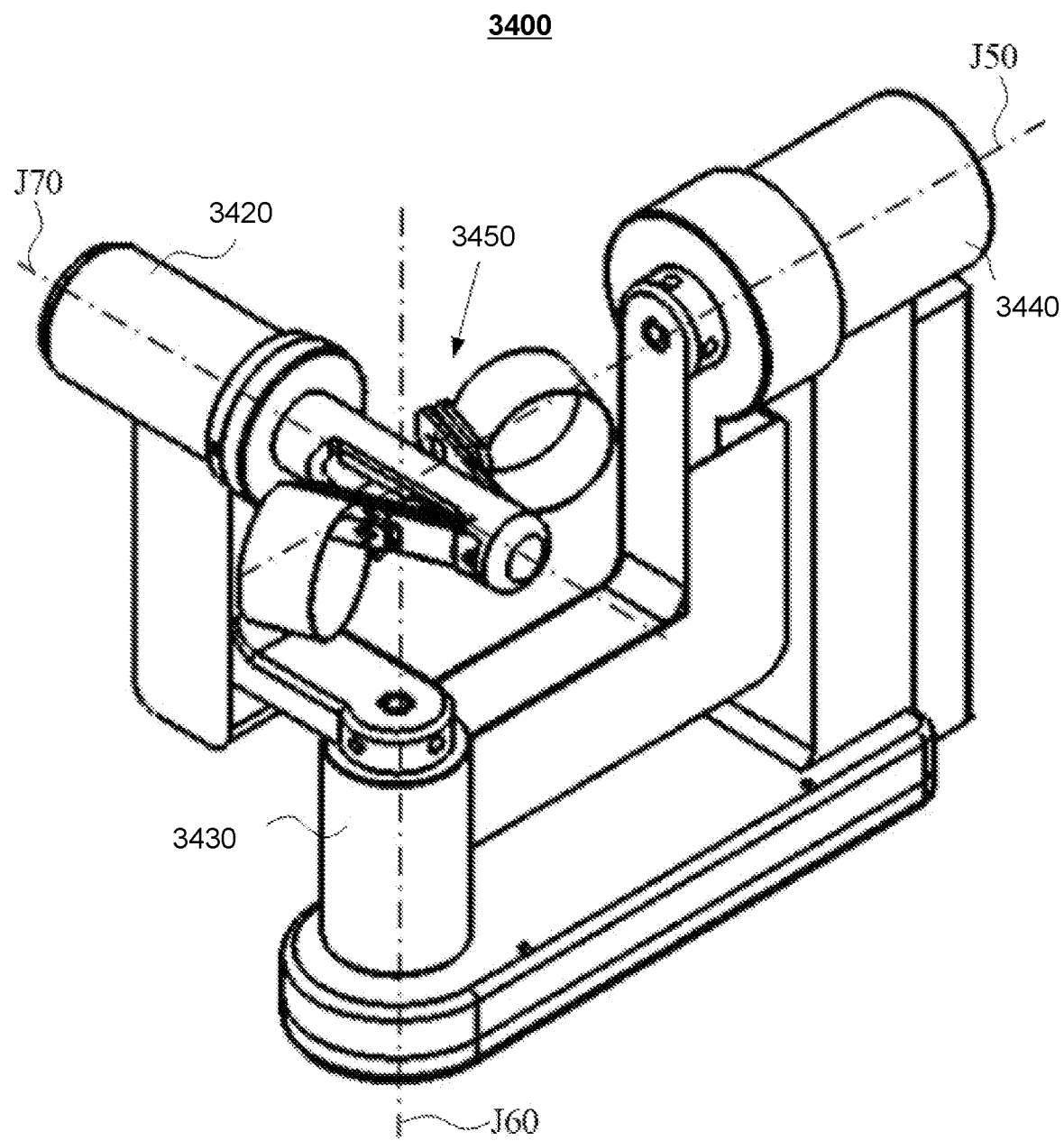
FIG. 34 is a schematic diagram illustrating an exemplary wrist assembly of a clamping device according to some embodiments of the present disclosure.

FIG. 34 is a schematic diagram illustrating an exemplary wrist assembly of a clamping device according to some embodiments of the present disclosure. As shown in FIG. 34, a master manipulator be connected with a slave robotic arm to control the slave robotic arm to perform minimally invasive surgery. As shown in FIG. 34, the master manipulator may include a wrist assembly 3400 and a clamping device 3450. The clamping device 3450 may be the clamping device described elsewhere in the present disclosure (e.g., a clamping device 3600, the clamping device 3300, the clamping device 3000, and the clamping device 2700). The clamping device may be arranged on the wrist assembly 3400. As shown in FIG. 34, the wrist assembly 3400 may include a plurality of rotation axes (as shown by dotted lines in FIG. 34). The plurality of rotation axes may interact at one point. The wrist assembly 3400 may include a plurality of DoFs, e.g., 3-DoFs. As shown in FIG. 34, a first rotation axis J70, a second rotation axis J60, and a third rotation axis J50 may be rotation axes of joint mechanisms or rotation joints (e.g., a first rotation joint 3420, a second rotation joint 3430, and a third rotation joint 3440) intersecting at one point. The clamping device 3300 may be installed on the first rotation joint 3420, and may rotate around the J70 axis.

Figure 35:
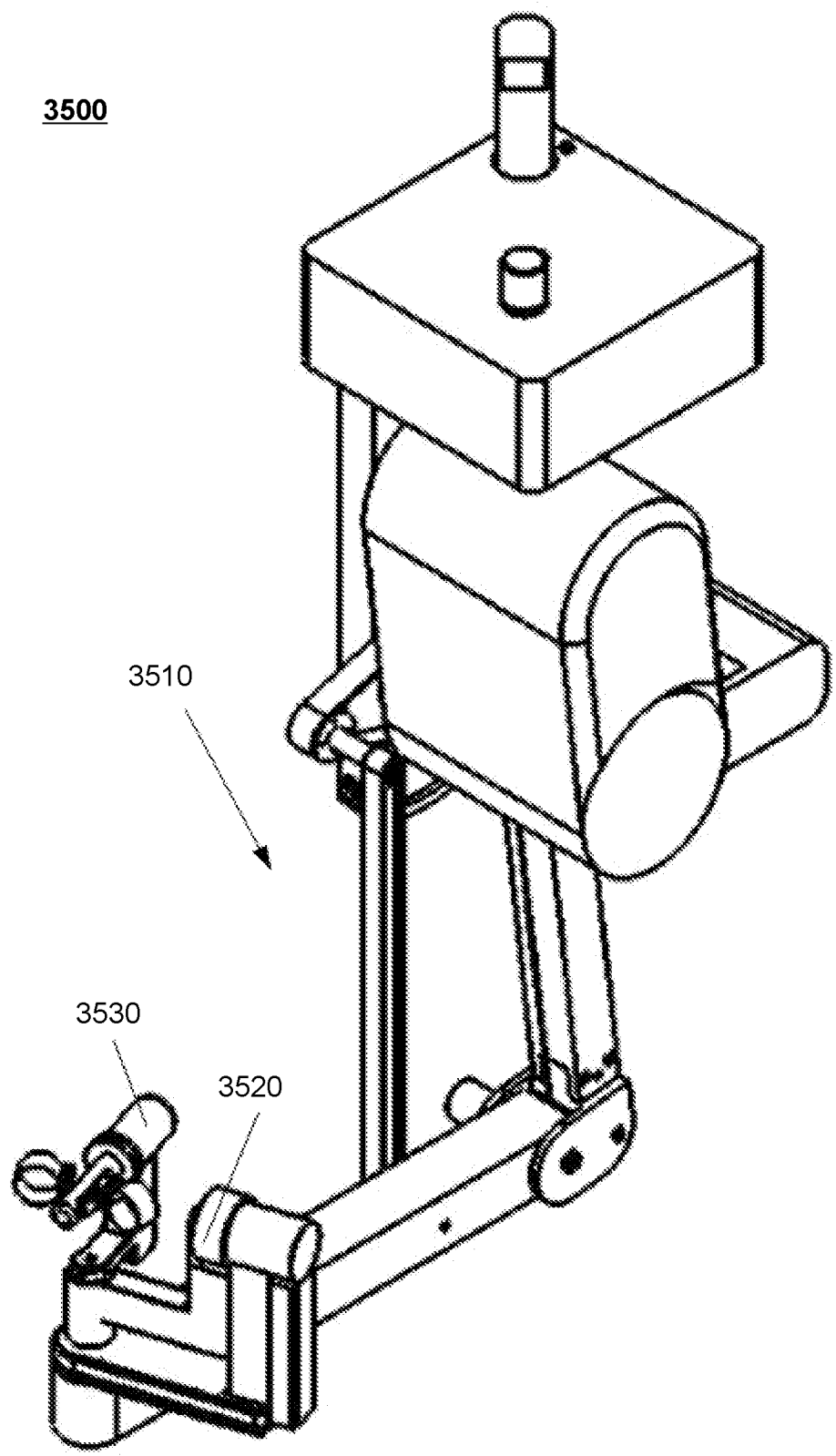
FIG. 35 is a schematic diagram illustrating an exemplary master manipulator according to some embodiments of the present disclosure.

FIG. 35 is a schematic diagram illustrating an exemplary master manipulator according to some embodiments of the present disclosure. FIG. 35 is a typical tandem master manipulator 3500 including a plurality of DoFs. 3-DoFs may be used for position information detection, other 3-DoFs may be used for posture information detection, and 1-DoF may be used for detection of a clamping action. The master manipulator 3500 may include an arm assembly 3510, a wrist assembly 3520, and a clamping device 3530. The clamping device 3530 may be any of the clamping device in the present disclosure (e.g., the clamping device 2700, the clamping device 3000, the clamping device 3300, and the clamping device 3600). The arm assembly 3510 may be any arm assembly in the present disclosure (e.g., the arm assembly 310, the arm assembly 1100, etc.). The wrist assembly 3520 may be any wrist assembly in the present disclosure (e.g., the wrist assembly 320, the wrist assembly 1120, the wrist assembly 900, etc.).

FIGS. 36-40 are schematic diagrams illustrating another exemplary clamping device according to some embodiments of the present disclosure. The clamping device 3600 may receive an interaction force between a slave robotic arm and an end effector (e.g., a surgical instrument) and/or feed a clamping force of the slave robotic arm to the end effector (e.g., the surgical instrument) back to a surgeon. Specifically, as shown in FIGS. 36-40, the clamping device 3600 may include a base 3610, a clamping assembly 3620, and a feedback assembly. The feedback assembly may include a transmission member 3630 and a power member 3640. The base 3610 may be a support structure of the entire clamping device 3600. The clamping assembly 3620, the transmission member 3630, and the power member 3640 may be respectively installed on the base 3610 and form a certain positional relationship. The clamping assembly 3620 may be movably arranged on the base 3610, and the clamping assembly 3620 may open and close within a working range. For example, two fingers of the surgeon may drive the clamping assembly 3620 to open or close. The transmission member 3630 may be rotatably arranged on the base 3610. The transmission member 3630 may be in transmission connection with the clamping assembly 3620. The transmission member 3630 may be a transmission structure between the clamping assembly 3620 and the power member 3640. The power member 3640 may be fixed on the base 3610, and the power member 3640 may be connected with the transmission member 3630. The power member 3640 may also be connected with the slave robotic arm. When the power member 3640 moves, the power member 3640 may drive the slave robotic arm to perform a corresponding releasing or clamping action.

In some embodiments, the clamping assembly 3620 may open and close within the working range and drive the power member 3640 through the transmission member 3630, thereby controlling the slave robotic arm to perform the corresponding opening and closing action. In some embodiments, the power member 3640 may generate a corresponding clamping torque, output a corresponding clamping torque, and drive the clamping assembly 3620 to generate an opening or closing tendency through the transmission member 3630 according to the clamping force of the slave robotic arm, so as to feed the clamping force of the slave robotic arm back to the clamping device 3600, and make the surgeon intuitively perceive the current clamping force of the slave robotic arm to the surgical instrument. The clamping assembly 3620, the transmission member 3630, and the power member 3640 may be sequentially in transmission connection, and the clamping force of the slave robotic arm may be fed back to the clamping assembly 3620 through the power member 3640 and the transmission part 3630, so that the surgeon performing the operation may accurately perceive the clamping force of the slave robotic arm. The surgeon may determine an operation state through a change of the clamping force, which is convenient for the surgeon to adjust the clamping force applied by the master manipulator 3300 at any time, such that the surgeon may perform the surgical operation more efficiently. The surgical operation experience may be more realistic, and the components of the slave robotic arm may work within the normal load, which is conducive to prolonging the service life of the surgical robot.

The sequential transmission connection of the clamping assembly 3620, the transmission member 3630, and the power member 3640 may be the premise to ensure that the clamping device 3600 may control the action of the slave robotic arm, and ensure the feedback of the clamping force of the slave robotic arm to the clamping device 3600. Optionally, the clamping assembly 3620, the transmission member 3630, and the power member 3640 may be designed according to an actual working condition. For example, the clamping assembly 3620, the transmission member 3630, and the power member 3640 may be arranged sequentially along a straight line, or the clamping assembly 3620, the transmission member 3630, and the power member 3640 may be arranged sequentially along a fold line/arc direction, or the transmission member 3630 and the power member 3640 may be respectively disposed at two ends of the clamping assembly 3620. The following embodiments are only described by taking "the transmission member 3630 and the power member 3640 being arranged at intervals on the base 3610, and the clamping assembly 3620 being arranged between the transmission member 3630 and the power member 3640" as an example. It can be understood that other types of arrangements may be obtained through reasonable deformation based on the following embodiments.

The clamping assembly 3620 may be a part directly operated by the surgeon, and also a structure for feeding the clamping force back to the surgeon. As shown in FIGS. 37-40, the clamping assembly 3620 may include a first connection plate 3621, a second connection plate 3622, a first finger cot 3623, and a second finger cot 3624. The first connection plate 3621 and the second connection plate 3622 are rotatably arranged on the base 3610, respectively. The first finger cot 3623 and the second finger cot 3624 may be arranged on the first connection plate 3621 and the second connection plate 3622, respectively. The first finger cot 3623 and the second finger cot 3624 may allow the surgeon's two fingers to be inserted, respectively, e.g., the doctor's thumb and index finger/middle finger. When the surgeon's two fingers open or close, the first connection plate 3621 and the second connection plate 3622 may perform corresponding opening or closing action. Meanwhile, the first connection plate 3621 and the second connection plate 3622 may rotatably open and close to better adapt to an action process of the surgeon's fingers. The first connection plate 3621 of the two connection plates may be in transmission connection with the transmission member 3630. The first connection plate 3621 and the second connection plate 3622 may maintain synchronous rotation at a same angle in an opposite direction, thereby ensuring a stable relative positional relationship between the first connection plate 3621 and the second connection plate 3622. In other embodiments, the clamping assembly 3620 may only include a connection plate rotatably arranged on the base 3610, and a rotation direction and a rotation angle of the connection plate under driving of an external force may correspond to an opening and closing state and an opening and closing degree of the slave robotic arm.

Figure 36:
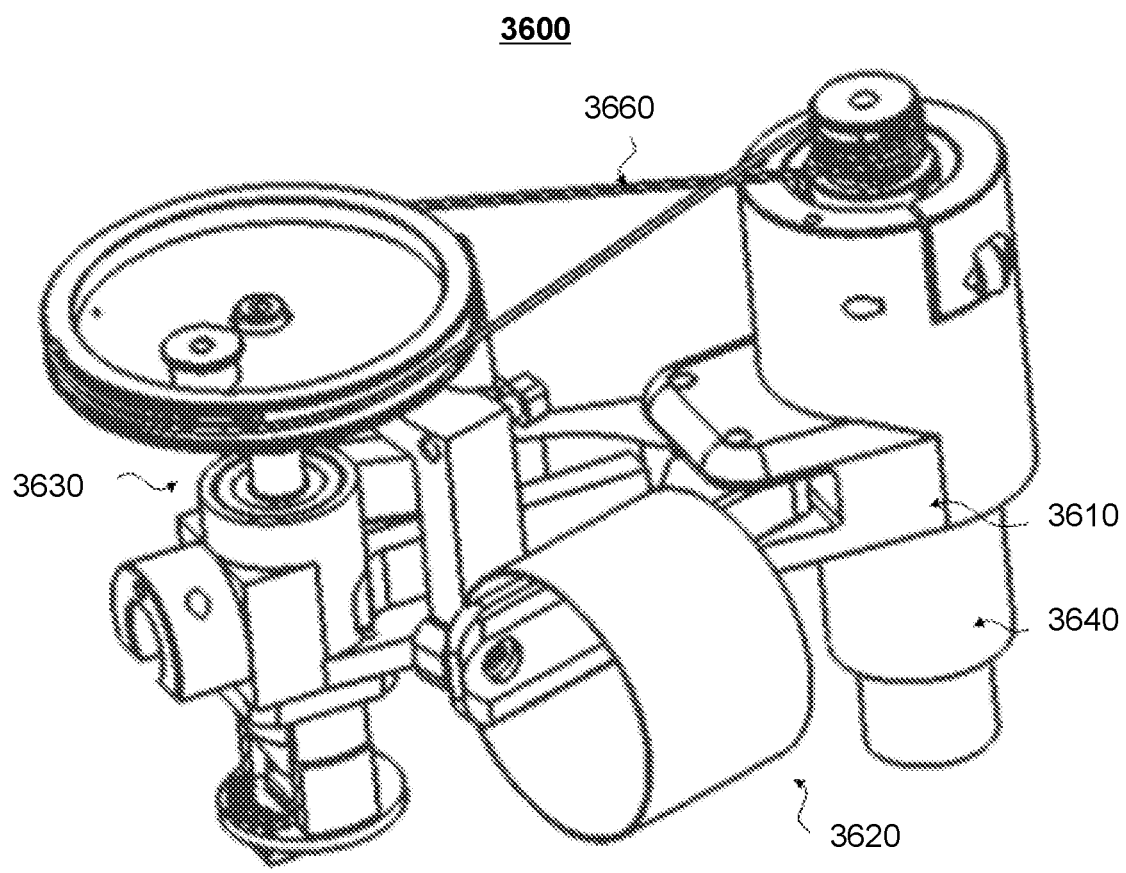
FIGS. 36-40 are schematic diagrams illustrating another exemplary clamping device according to some embodiments of the present disclosure.
Figure 37:
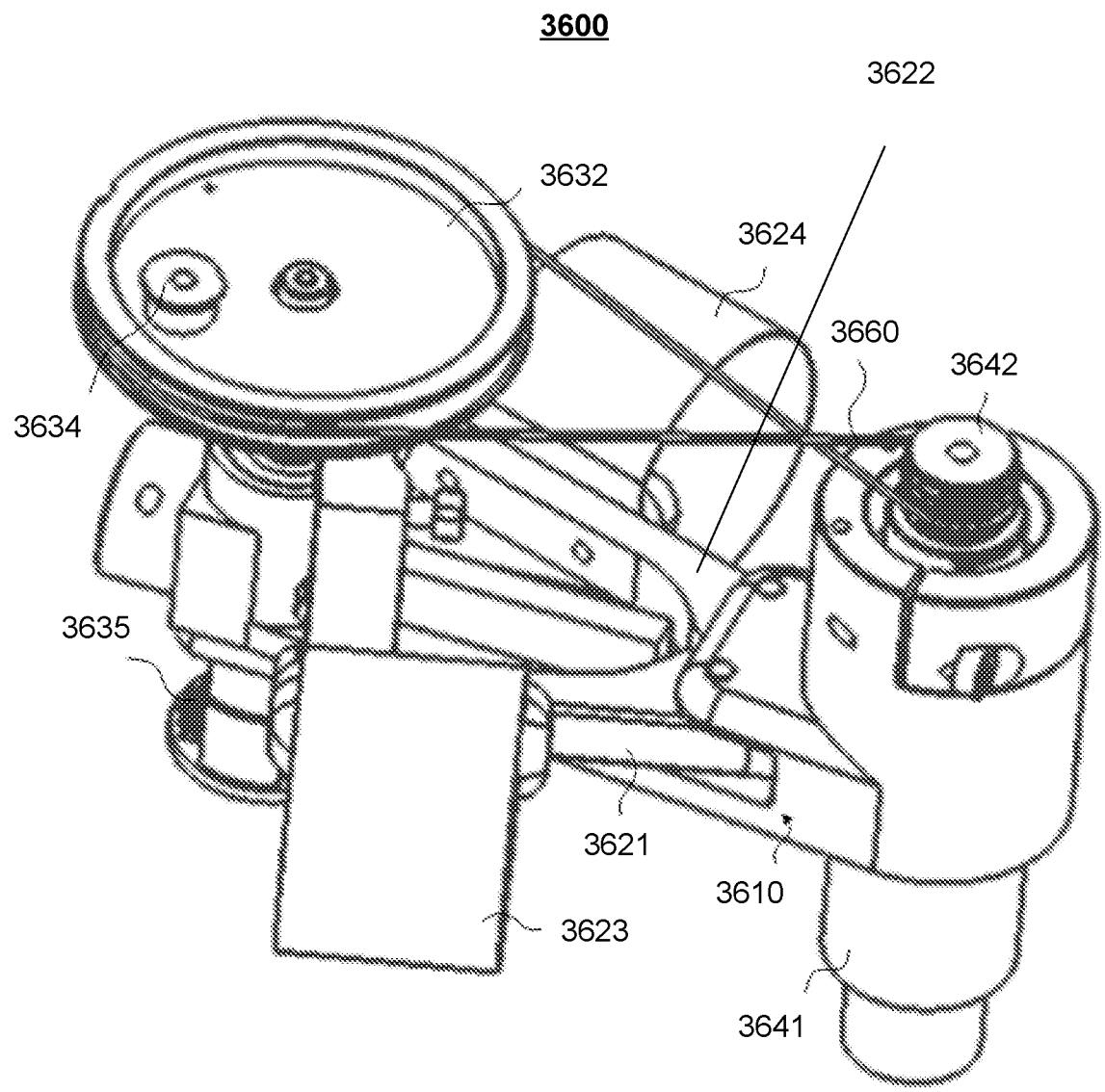
Figure 38:
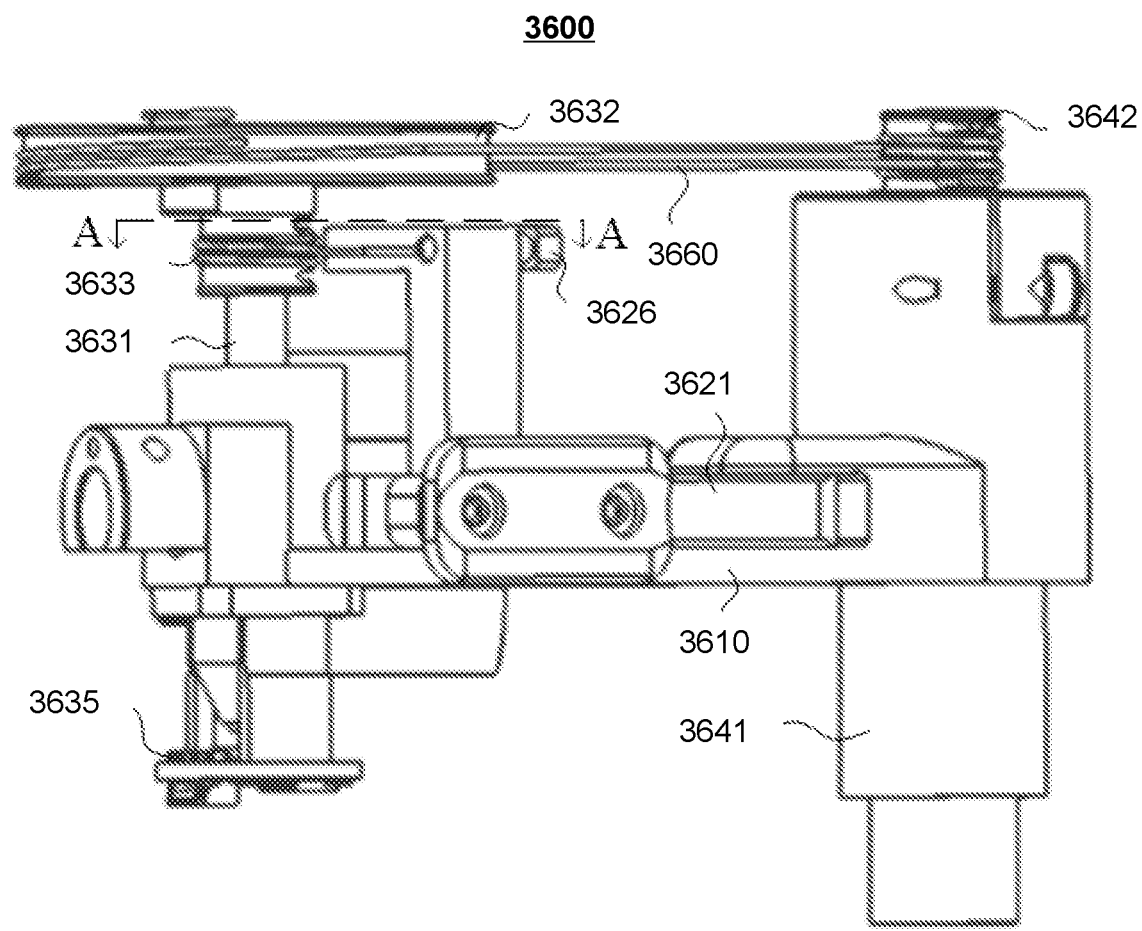
Figure 39:
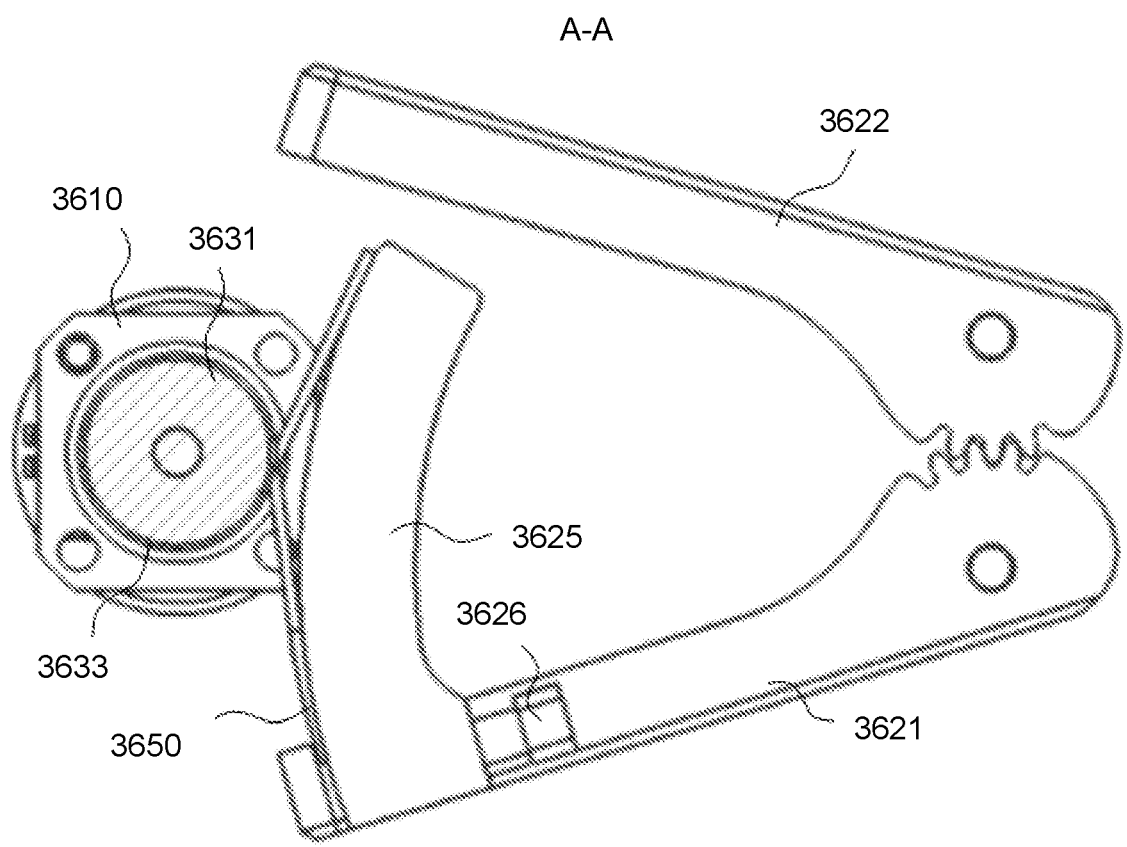
Figure 40:
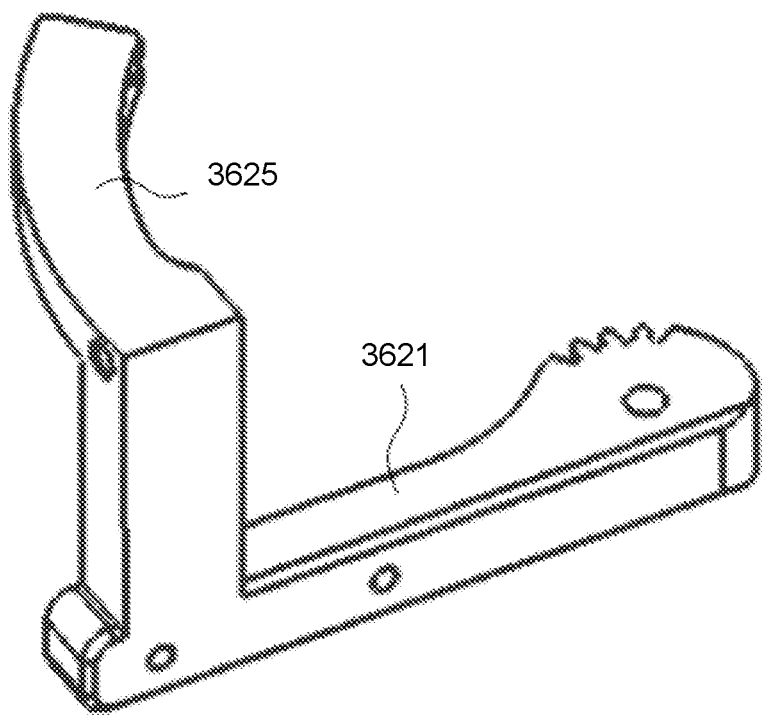

In some embodiments, a transmission structure may be provided between the first connection plate 3621 and the second connection plate 3622 to ensure a relatively stable positional relationship between the first connection plate 3621 and the second connection plate 3622. As shown in FIG. 38 and FIG. 36, one end of the first connection plate 3621 and one end of the second connection plate 3622 may be rotatably arranged on the base 3610, respectively. An end of the first connection plate 3621 close to a rotation center (i.e., positions of the first connection plate 3621 and the second connection plate 3621 located on the base 3610) and an end of the second connection plate 3622 close to the rotation center may be in transmission through a toothed surface coupling transmission mode. In some implementations, a gear modulus ratio of the toothed surface coupling transmission mode between the first connection plate 3621 and the second connection plate 3622 may be 1:1, so that a symmetrical movement may be formed. In some embodiments, a parallel four-rod mechanism may be formed by using the first connection plate 3621 and the second connection plate 3622 as adjacent sides, as long as the relatively stable positional relationship between the first connection plate 3621 and the second connection plate 3622 is ensured.

In some embodiments, the clamping assembly 3620 and the transmission member 3630, and the transmission member 3630 and the power member 3640 may be in transmission connection through a rope transmission mode, a gear transmission mode, a chain transmission mode, a belt transmission mode, or a thread transmission mode. In some embodiments, as shown in FIGS. 37-40, an end of the first connection plate 3621 away from the rotation center may be provided with an arc segment 3625 bent toward the rotation center or the second connection plate 3622, and the arc segment 3625 may be in transmission cooperation with the transmission member 3630 through the rope transmission mode. The arc segment 3625 may ensure that the arc segment 3625 always avoids colliding or contacting with the transmission member 3630 during the rotation of the first connection plate 3621, so as to ensure smooth opening and closing of the first connection plate 3621 and the second connection plate 3622. As an embodiment, a first stud 3626 may be provided on the arc segment 3625 to pre-tighten the transmission rope, thereby ensuring a stable transmission relationship between the first connection plate 3621 and the transmission member 3630.

In some embodiments, as shown in FIGS. 37-40, the transmission member 3630 may include an intermediate wheel 3632 and a driving wheel 3642. The intermediate wheel 3632 may be rotatably arranged on the base 3610. The intermediate wheel 3632 may be in transmission connection with the clamping assembly 3620. The driving wheel 3642 may be fixedly connected with an output shaft of the power member 3640. The intermediate wheel 3632 may be in transmission connection with the driving wheel 3642. In some embodiments, a transmission ratio of the intermediate wheel to the driving wheel may be less than 1, which allows the force feedback to be realized by using a smaller power member 3640 (e.g., a motor). In some embodiments, a radius ratio of the intermediate wheel to the driving wheel may be within a range of 1.5 to 3. Correspondingly, the transmission ratio of the intermediate wheel to the driving wheel may be approximately within a range of 0.3 to 0.7.

In some embodiments, the transmission member 3630 may include a transmission shaft 3631 and the intermediate wheel 3632. The transmission shaft 3631 may be rotatably arranged on the base 3610, and the intermediate wheel 3632 may be fixedly arranged on the transmission shaft 3631. The transmission shaft 3631 may be provided with a threaded groove 3633 which allows the transmission rope to be wound. The transmission shaft 3631 may be in transmission connection with the clamping assembly 3620 through the threaded groove 3633. Specifically, the transmission between the arc segment 3625 of the first connection plate 3621 and the thread groove 3633 of the transmission shaft 3631 may be realized using a first rope 3650. One end of the first rope 3650 may be first fixed on one end of the arc segment 3625, and then another end of the first rope 3650 may bypass the threaded groove 3633 a plurality turns to be fixed to another end of the arc segment 3625, and the first rope 3650 may be pre-tightened using the first stud 3626. The steel wire rope transmission may have the advantages of stability, precision, compact structure, and small volume. It should be noted that the transmission member 3630 may be in transmission connection with the power member 3640 through the intermediate wheel 3632.

The intermediate wheel 3632 may be fixed on one end of the transmission shaft 3631. The transmission member 3630 may further include a first position sensor 3635. The first position sensor 3635 may be arranged on another end of the transmission shaft 3631 away from the intermediate wheel 3632. The first position sensor 3635 may be configured to detect a rotation angle of the transmission shaft 3631. The first position sensor 3635 may be connected with a controller of a surgical robot. For example, a magnetic encoder may be used as the first position sensor 3635, and a magnet may be fixed on the end of the transmission shaft 3631 away from the intermediate wheel 3632 to rotate along with the transmission shaft 3631. An encoder chip may be fixed on an encoder base, and the encoder base may be fixed on the base 3610.

The power member 3640 may be connected with the slave robotic arm. The power member 3640 may drive the slave robotic arm to perform an opening or closing action. The power member 3640 may also feed the clamping force of the slave robotic arm back to the clamping assembly 3620 through the transmission member 3630. Optionally, a type of the power member 3640 can be an electric type, a hydraulic type, or a pneumatic type. The power member 3640 may include a motor 3641 fixedly arranged on the base 3610. The driving wheel 3642 may be fixedly arranged on a rotation axis of the motor 3641. The driving wheel 3642 may be in transmission connection with the transmission member 3630 through the rope transmission mode. The motor 3641 may also be connected with the slave robotic arm. The motor 3641 may have the advantages of precise action and compact structure. As an embodiment, the driving wheel 3642 and the intermediate wheel 3632 may be in transmission connection through a second rope 3660, and a second stud 3634 may be installed on the intermediate wheel 3632 or the driving wheel 3642, thereby ensuring accurate transmission of the second rope 3660.

In some embodiments, a housing of the motor 3641 may be fixedly arranged on the base 3610. The housing of the motor 3641 may be embedded in the base 3610, thereby further making the overall structure of the clamping device 3600 more compact. Further, the power member 3640 may further include a second position sensor. The second position sensor may be arranged on the rotation axis of the motor 3641, and the second position sensor may be connected with the controller of the surgical robot. For example, a relative encoder may be installed at an end of the motor 3641 for better motion control. Combined use of the first position sensor 3635 and the second position sensor may enhance the safety of the clamping device 3600. Under a set transmission relationship, detection data of the first position sensor 3635 and the second position sensor may be in a certain relationship; and when the detection data of the first position sensor 3635 and the second position sensor deviates from the set relationship, it is considered that the transmission between the power member 3640 and the intermediate wheel 3632 may be abnormal. The clamping device 3600 may perform adaptive adjustment, shutdown, or issue an alarm. In some embodiments, the motor 3641 may be installed on the base 3610 through a bracket or a support block.

In the above embodiments, the clamping device 3600 may perform transmission by a two-stage steel wire rope, and the opening and closing movement of the clamping pieces may be transmitted to the intermediate wheel 3632 to make the intermediate wheel 3632 rotate, which may be then transmitted to the driving wheel 3642, and then transmitted to the shaft of the motor 3641. Similarly, in the force feedback mode, the torque generated by the motor 3641 may be transmitted to the driving wheel 3642 through the shaft of the motor, then to the intermediate wheel 3632, and finally to the two clamping pieces. As the two clamping pieces are coupled through gears, the feedback force applied by the motor 3641 may be evenly distributed to the two clamping pieces, so that the two fingers of the operator may perceive the applied feedback force. In a practical operation, the transmission ratio may be adjusted by adjusting the sizes of the intermediate wheel 3632, the driving wheel 3642, a radian of the arc segment 3625, etc., thereby adjusting a force feedback range of the motor 3641. The clamping force and the feedback force may be respectively transmitted through the transmission member 3630, and the feedback assembly may control the motor 3641 to rotate, so as to ensure that the clamping force applied by the fingers and the feedback force may be accurate.

The clamping device described in the above embodiment may be used in the master manipulator. The clamping assembly 3620, the transmission member 3630, and the power member 3640 may be in sequential transmission connection. The clamping force of the slave robotic arm may be fed back to the clamping assembly 3620 through the power member 3640 and the transmission member 3630, so that the surgeon performing the operation may accurately perceive the clamping force of the slave robotic arm. The surgeon may determine an operation state through a change of the clamping force, which is convenient for the surgeon to adjust the clamping force applied by the master manipulator 3300 at any time, thereby performing the operation more efficiently. The surgical operation experience may be more realistic, and the components of the slave robotic arm may work within the normal load, which is conducive to prolonging the service life of the surgical robot.

The basic concept has been described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements, and corrections are suggested in this disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A master manipulator, comprising:
an arm assembly including at least one arm joint mechanism;
a wrist assembly movably connected with the arm assembly, the wrist assembly allowing an operator to perform a corresponding operation, wherein the wrist assembly includes at least one wrist joint mechanism; and
a support assembly configured to support at least one of the arm assembly and the wrist assembly;
a brake assembly including a brake controller and a brake, wherein:
the at least one wrist joint mechanism includes a fourth joint mechanism connected with the arm assembly, and a fourth rotation axis corresponding to the fourth joint mechanism is parallel to a gravity direction of the wrist assembly; and
the brake is connected with the fourth rotation axis, and the brake controller is configured to control operation of the fourth joint mechanism through the brake;
wherein an operation state of the brake includes a disconnected state and a closed state, the disconnected state corresponds to a locked state of the fourth joint mechanism, the closed state corresponds to a released state of the fourth joint mechanism, and the brake controller is configured to:
in response to a determination that the wrist assembly satisfies a first condition, generate a close instruction and send the close instruction to the brake, the close instruction being used to instruct the brake to be in the closed state;
in response to a determination that the wrist assembly satisfies a second condition, generate a disconnecting instruction and send the disconnecting instruction to the brake, the disconnecting instruction being used to instruct the brake to be in the disconnected state;
wherein the wrist assembly further includes a sixth joint mechanism, a sixth rotation axis corresponding to the sixth joint mechanism is parallel to the gravity direction of the wrist assembly, the first condition includes that a distance between the sixth rotation axis and a first limiter or a second limiter is less than a first threshold, the second condition includes that a distance between the sixth rotation axis and the first limiter or the second limiter is greater than a second threshold, and the second threshold is greater than or equal to the first threshold.

2. The master manipulator of claim 1, wherein the wrist assembly further includes a fifth joint mechanism, a fifth rotation axis corresponding to the fifth joint mechanism is perpendicular to the gravity direction of the wrist assembly, the fifth joint mechanism is connected with the fourth joint mechanism through a second base of the support assembly, and the first condition includes that the second base is in a first region or a second region within a rotation range of the fourth rotation axis, wherein the fifth joint mechanism is connected with the sixth joint mechanism, thus the six rotation axis is parallel to the fourth rotation axis,
and the first condition includes:
when the sixth rotation axis rotates in a first direction, the second base is in the first region within the rotation range of the fourth rotation axis; or,
when the sixth rotation axis rotates in a second direction, the second base is in the second region within the rotation range of the fourth rotation axis.

3. The master manipulator of claim 1, wherein the first condition includes that the master manipulator is in a singular position.

4. The master manipulator of claim 1, further comprising:
a connection assembly configured to connect the arm assembly and the wrist assembly, wherein
some elements of the at least one arm joint mechanism are sequentially connected in series to form at least a part of one or more first quadrilateral linkage mechanisms, the connection assembly and some elements of the arm assembly are sequentially connected in series to form at least a part of a second quadrilateral linkage mechanism, elements of the one or more first quadrilateral linkage mechanisms and elements of the second quadrilateral linkage mechanism are arranged in a linkage manner to synchronously rotate around a rotation axis of the at least one joint mechanism, and the rotation axis is perpendicular to a gravity direction of the wrist assembly.

5. The master manipulator of claim 4, wherein a plurality of wrist joint mechanisms of the wrist assembly corresponds to a plurality of rotation axes, and the plurality of rotation axes intersect at one point,
the plurality of wrist joint mechanisms includes a fifth joint mechanism, the fifth joint mechanism corresponds to a fifth rotation axis, the fifth rotation axis is perpendicular to the gravity direction of the wrist assembly, and the fifth joint mechanism includes a balance assembly configured to balance a gravity torque caused by a self-weight of the wrist assembly at the fifth rotation axis.

6. The master manipulator of claim 4, further comprising:
the at least one arm joint mechanism includes a second joint mechanism, a first rotation axis corresponding to the second joint mechanism is perpendicular to the gravity direction of the wrist assembly, the second joint mechanism includes a second power member, a second driving member, and three second driven members sequentially connected in series, and a connecting line of the three second driven members is approximately a parallelogram to form at least a part of one of the one or more first quadrilateral linkage mechanisms.

7. The master manipulator of claim 6, wherein:
the second power member is installed on a first base of the support assembly and configured to drive the second driving member to rotate; and
one of the three second driven members is movably connected with the base, two non-adjacent second driven members of the three second driven members are approximately parallel, and the second driving member is configured to drive the three second driven members to rotate around a second rotation axis.

8. The master manipulator of claim 7, wherein the at least one arm joint mechanism further includes:
a third joint mechanism corresponding to a third rotation axis, wherein the third rotation axis is perpendicular to the gravity direction of the wrist assembly,
the third joint mechanism includes a third power member, a third driving member, and three third driven members sequentially connected in series, and a connecting line of the three third driven members sequentially connected in series is approximately a parallelogram,
the third power member is installed on the first base and configured to drive the third driving member to rotate; and
one of the at least three third driven members is movably connected with the first base, two non-adjacent third driven members of the three third driven members are approximately parallel, and the third driving member is configured to drive the three third driven members to rotate around the third rotation axis.

9. The master manipulator of claim 8, wherein the connection assembly includes:
a first connection member and a second connection member, wherein the first connection member, the second connection member, one of the three second driven members, and one of the three third driven members are sequentially connected in series to form the second quadrilateral linkage mechanism.

10. The master manipulator of claim 9, wherein the second connection member includes a first portion and a second portion, the first portion is parallel to the gravity direction of the wrist assembly and connected with the arm assembly, and the second portion is perpendicular to the gravity direction of the wrist assembly and connected with the wrist assembly.

11. The master manipulator of claim 1, further comprising:
one or more balance assemblies, wherein each of the one or more balance assemblies is configured to balance a torque of a self-weight of the arm assembly and/or the wrist assembly relative to a rotation axis of the arm assembly or a rotation axis of the wrist assembly.

12. The master manipulator of claim 11, wherein:
one of the one or more balance assemblies includes an elastic member, one end of the elastic member is connected with one of the at least one arm joint mechanism or one of the at least one wrist joint mechanism, and an angle between a direction of a torque of the elastic member to the rotation axis of the arm joint mechanism or the wrist joint mechanism and a direction of a gravity torque of gravity formed by the wrist assembly and/or the arm assembly to the rotation axis is greater than 90 degrees,
one of the one or more balance assemblies further includes a rope and a steering wheel, the elastic member is connected with the arm joint mechanism or the wrist joint mechanism through the rope, one end of the rope is connected with the elastic member, and another end of the rope is connected with the arm joint mechanism or the wrist joint mechanism bypassing the steering wheel, so that the rope forms an angle with an axial direction of the elastic member.

13. The master manipulator of claim 11, wherein the balance mechanism assembly includes a wrist balance assembly, the wrist balance assembly is arranged on the wrist joint mechanism, the wrist balance assembly includes an elastic member, both ends of the wrist elastic member are respectively connected with the wrist joint mechanism and a support base of the wrist joint mechanism, and an elastic force of the elastic member at least partially balances a gravity torque of the wrist assembly to a rotation axis corresponding to the wrist joint mechanism.

14. The master manipulator of claim 11, wherein one of the at least one arm joint mechanism includes a power member, a driving member, and a driven member;
the driven member is configured to rotate around the rotation axis of the arm joint mechanism;
the power member and/or the driving member and the wrist assembly are arranged on two sides of the rotation axis of the arm joint mechanism; and
an angle between a direction of a gravity torque formed by the power member and/or the driving member to the rotation axis of the arm joint mechanism and a direction of a gravity torque formed by a gravity of the wrist assembly and/or the arm assembly to the rotation axis of the arm joint mechanism is greater than 90 degrees.

15. The master manipulator of claim 11, wherein the balance mechanism assembly includes a wrist balance assembly, and the wrist balance assembly includes a rotation wheel and a rope, the rotation wheel rotates synchronously with a rotation axis of the wrist joint mechanism, one end of an elastic member is connected with the rope, another end of the elastic member is connected with a support base of the wrist joint mechanism, and another end of the rope is wound around the rotation wheel.

16. The master manipulator of claim 15, wherein the rotation wheel is a cam, and when the wrist joint mechanism rotates to a position forming any angle with the gravity direction, an angle between a direction of a gravity torque formed by the wrist assembly to the rotation axis of the wrist joint mechanism and a direction of torque formed by the cam and the elastic member is greater than 90 degrees.

17. The master manipulator of claim 11, wherein one of the at least one arm joint mechanisms includes a driven member;
   the driven member includes a plurality of connection rods sequentially connected in series to form a parallelogram connection rod mechanism;
   one of the connection rods includes an extension end relative to the parallelogram connection rod mechanism;
   the rotation axis of the arm assembly is arranged on the extension end; and
   at least a part of one of the one or more balance assemblies is arranged on the extension end.

18. The master manipulator of claim 17, wherein the one or more balance assemblies is connected with the rotation axis or the parallelogram mechanism.

19. A robot, comprising a robot body, an end effector, and a master manipulator, wherein the end effector is connected with the robot body, the robot body is electrically connected with a communication device, and the master manipulator is electrically connected with the communication device and the end effector, wherein the master manipulator includes an arm assembly including at least one arm joint mechanism;
   a wrist assembly movably connected with the arm assembly, the wrist assembly allowing an operator to perform a corresponding operation, wherein the wrist assembly includes at least one wrist joint mechanism; and
   a support assembly configured to support at least one of the arm assembly and the wrist assembly;
   a brake assembly including a brake controller and a brake, wherein:
   the at least one wrist joint mechanism includes a fourth joint mechanism connected with the arm assembly, and a fourth rotation axis corresponding to the fourth joint mechanism is parallel to a gravity direction of the wrist assembly; and
   the brake is connected with the fourth rotation axis, and the brake controller is configured to control operation of the fourth joint mechanism through the brake;
   wherein an operation state of the brake includes a disconnected state and a closed state, the disconnected state corresponds to a locked state of the fourth joint mechanism, the closed state corresponds to a released state of the fourth joint mechanism, and the brake controller is configured to:
   in response to a determination that the wrist assembly satisfies a first condition, generate a close instruction and send the close instruction to the brake, the close instruction being used to instruct the brake to be in the closed state;
   in response to a determination that the wrist assembly satisfies a second condition, generate a disconnecting instruction and send the disconnecting instruction to the brake, the disconnecting instruction being used to instruct the brake to be in the disconnected state;
   wherein the wrist assembly further includes a sixth joint mechanism, a sixth rotation axis corresponding to the sixth joint mechanism is parallel to the gravity direction of the wrist assembly, the first condition includes that a distance between the sixth rotation axis and a first limiter or a second limiter is less than a first threshold, the second condition includes that a distance between the sixth rotation axis and the first limiter or the second limiter is greater than a second threshold, and the second threshold is greater than or equal to the first threshold.

* * * * *